(12) United States Patent
Kodama et al.

(10) Patent No.: US 7,471,400 B2
(45) Date of Patent: Dec. 30, 2008

(54) MEASUREMENT METHOD AND DEVICE FOR BEAD CUTTING SHAPE IN ELECTRIC RESISTANCE WELDED PIPES

(75) Inventors: Toshifumi Kodama, Tokyo (JP); Taira Suzuki, Chiba (JP); Akira Torao, Chiba (JP); Yasumasa Tekemura, Chita (JP); Takatoshi Okabe, Chita (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 11/802,133

(22) Filed: May 21, 2007

(65) Prior Publication Data

US 2008/0105731 A1 May 8, 2008

Related U.S. Application Data

(62) Division of application No. 10/507,350, filed as application No. PCT/JP03/05168 on Apr. 23, 2003, now Pat. No. 7,236,255.

(30) Foreign Application Priority Data

| Apr. 30, 2002 | (JP) | ............................ 2002-128497 |
| Aug. 29, 2002 | (JP) | ............................ 2002-251269 |
| Sep. 24, 2002 | (JP) | ............................ 2002-277802 |
| Nov. 29, 2002 | (JP) | ............................ 2002-348649 |

(51) Int. Cl.
*G01B 5/24* (2006.01)
*G23K 26/26* (2006.01)

(52) U.S. Cl. ............. 356/601; 219/121.63; 219/121.64; 228/104; 73/622; 382/8

(58) Field of Classification Search ......... 356/601–625, 356/431–444; 250/560–561; 382/8; 219/121.63, 219/121.64; 228/104
See application file for complete search history.

(56) References Cited

U.S. PATENT DOCUMENTS

| 4,142,713 | A | * | 3/1979 | Nakasugi et al. ............... 266/87 |
| 4,627,289 | A | * | 12/1986 | Fukuda et al. ................ 73/622 |
| 4,645,893 | A | * | 2/1987 | Shimazaki et al. ............ 219/62 |
| 4,734,766 | A | * | 3/1988 | Shiozumi et al. ............ 382/141 |

(Continued)

FOREIGN PATENT DOCUMENTS

EP    0 532 257 A2    9/1992

(Continued)

*Primary Examiner*—Sang Nguyen
(74) *Attorney, Agent, or Firm*—Young & Thompson

(57) ABSTRACT

To precisely measure bead cutting shapes of electric resistance welded pipes without being affected by difference in luminance level between cut and uncut portions in optical cutting images, an image is obtained by overlaying an optical cutting image with the optical cutting image subjected to thinning processing. A profile of the welded pipe is approximated with a quadratic function and a region containing the bead apex coordinates is identified as the bead. Shape data of the pipe surface at the portion corresponding to the bead portion is obtained from the preset left and right boundaries of the bead portion and the apex position of the separately-calculated bead portion, and bead width, height, slope angle, and unevenness at the left and right boundaries between the bead portion and base pipe portion, are each calculated, based on the left and right bead shape approximation functions and base pipe shape approximation function.

11 Claims, 35 Drawing Sheets

U.S. PATENT DOCUMENTS 5,681,490 A * 10/1997 Chang .................. 219/121.64

FOREIGN PATENT DOCUMENTS

| | | | |
|---|---|---|---|
| JP | 03234444 A | * | 10/1991 |
| JP | 3-289505 | | 12/1991 |
| JP | 5-138427 | | 6/1993 |
| JP | 6-241740 | | 9/1994 |
| JP | 7-40049 | | 2/1995 |
| JP | 8-292017 | | 11/1996 |
| JP | 9-89524 | | 4/1997 |
| JP | 11194103 A | * | 7/1999 |
| JP | 11-230721 | | 8/1999 |
| JP | 11-271029 | | 10/1999 |
| JP | 11281343 A | * | 10/1999 |

* cited by examiner

FIG. 1
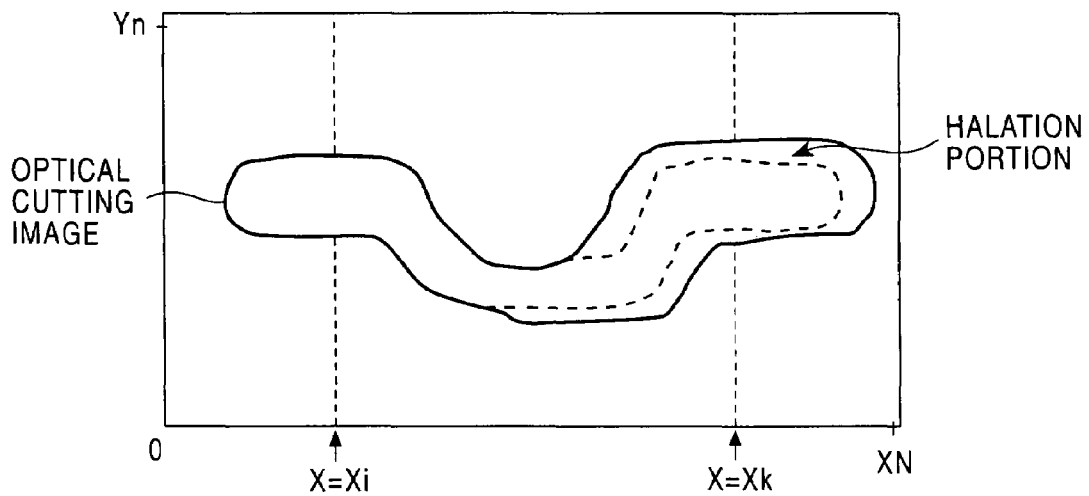
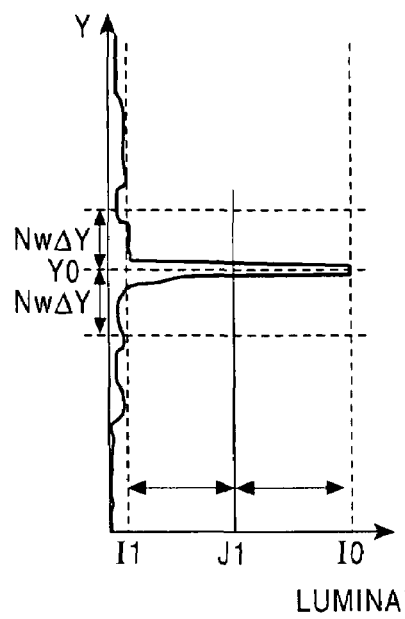
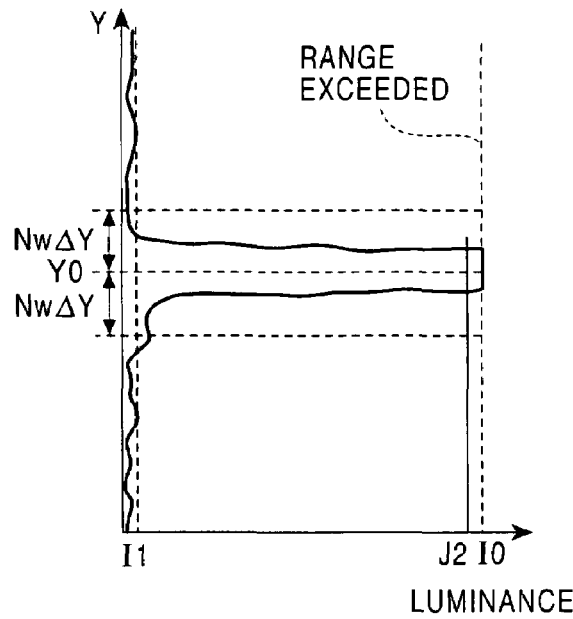

UNCUT PORTION | CUT PORTION | UNCUT PORTION

OPTICAL CUTTING LINE

LUMINANCE OF OPTICAL CUTTING LINE IS LOW

LUMINANCE
Y
X

FIG. 38
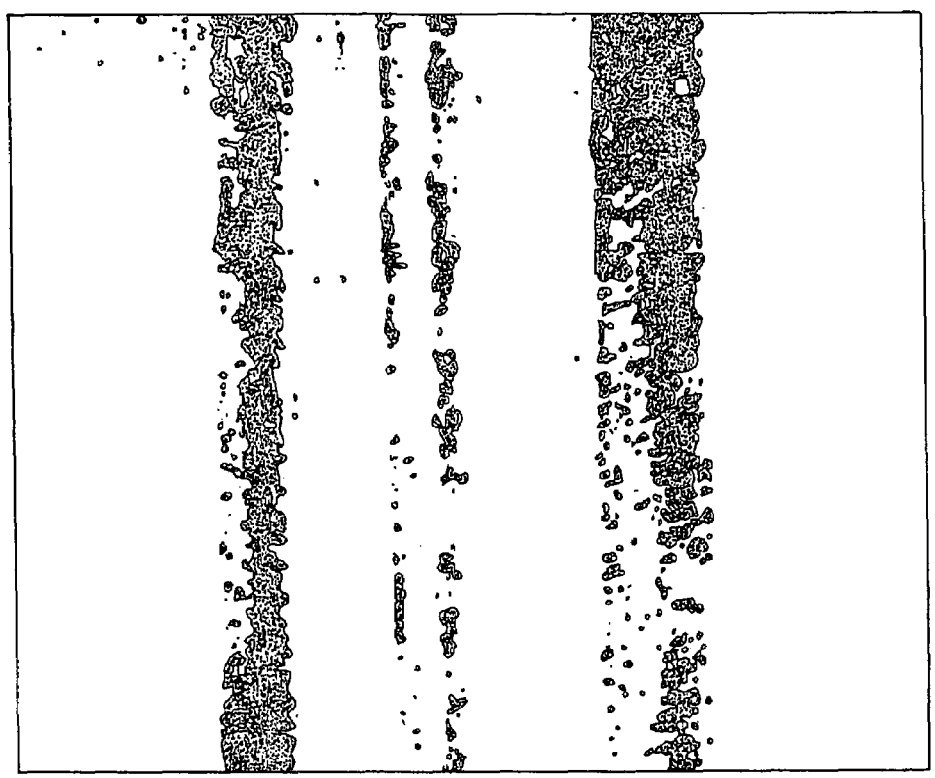
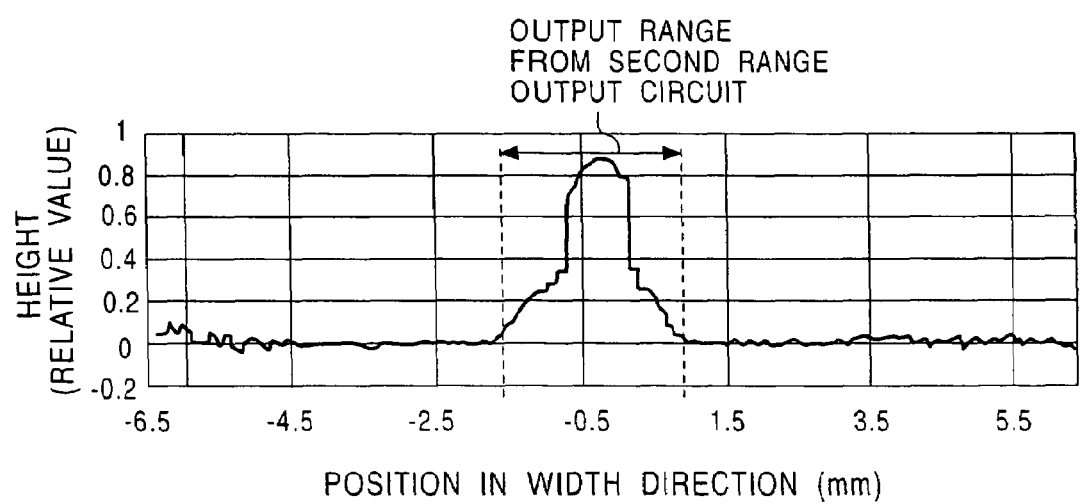

MEASUREMENT METHOD AND DEVICE FOR BEAD CUTTING SHAPE IN ELECTRIC RESISTANCE WELDED PIPES

BACKGROUND OF THE INVENTION

1. Field of the Invention

The present invention relates to a method and device for measuring welded bead cutting shapes in electric resistance welded pipes, including the position of the bead.

2. Description of the Related Art

In general, electric resistance welded pipes, such as electric resistance steel pipes, are manufactured by continuously forming steel plates or steel coils into a tubular form, and continuously performing butt welding both sides of the steel coil in the longitudinal direction by means such as high-frequency induction heat-pressure welding or resistance heat-pressure welding.

A raised portion called a "bead" is formed at the weld portion of the electric resistance welded pipe due to the butt welding, on the inside of the pipe and the outside of the pipe. Generally, the bead is continuously cut in the longitudinal direction of the steel pipe by a cutting tool on the production line further downstream from the welder. The shape of the surface of the pipe after the bead portion has been cut off (hereafter referred to as "bead cutting shape") preferably becomes one with the outline shape of the pipe other than the weld, such that where the bead was cannot be distinguished, ideally. In order to achieve this, the cutting tool tip must be held at an appropriate position on the surface of the electric resistance welded pipe.

Conventionally, a worker has measured the bead cutting shape, visually or using a micrometer or the like, at the time of starting cutting, and adjusted the cutting tool to the optimal position. However, there have been cases wherein, while manufacturing a number of electric resistance welded pipes, the position of the cutting tool shifts due to a variety of reasons, the blade of the cutting tool is nicked, etc., causing defective cutting such as not all of the bead being cut off of the electric resistance welded pipe product or cutting too deep. Such cutting defects not only mar the look of the electric resistance welded pipe product; using electric resistance welded pipes with cutting defects for piping subjected to pressure such as gas lines or the like may place the pipe at risk of rupturing.

Accordingly, there is the need to measure and monitor the bead cutting shape while manufacturing, and suitably correct the cutting tool position or replace the cutting tool with a new one, according to the results thereof.

Even with regard to the outer face of the pipe which is readily observed from the outside, monitoring of the bead cutting shape has to depend on visual observation of workers, so precision and reproducibility thereof is insufficient, and there have been quantitative and reliability problems.

With regard to the inner face of the pipe, the bead cutting portion cannot be directly observed during manufacturing, due to the configuration of the production line. Accordingly, the end portion of the pipe is observed at the process where the pipe is cut at the end position of the line. Alternatively, the line is stopped to cut out a sample of the bead position of the pipe by gas cutting, and the inner face is observed. With the former method, the observation position is several tens of meters downstream from the cutting position, so there has been a problem in that in the event that an abnormality occurs in the cutting, the defective pipe becomes longer until detected, resulting in decrease in yield. Also, with the later method, the cutting tool seizes due to friction heat in the event that the line is stopped, so the cutting tool must be retracted. Resetting the cutting tool and restarting the line creates a step between the previously cut bead cutting shape and the new cutting shape, so that portion is unusable as a product. There has been the problem that productivity decreases due to stopping the line for taking the sample. Only a part in the longitudinal direction of the product can be inspected in both of the above-described methods, so there has been the problem that the quality cannot be guaranteed for the entire length of the product.

In order to solve these problems, a bead cutting shape measurement method using the optical cutting method has been proposed. Examples of the optical cutting method are disclosed in Japanese Unexamined Patent Application Publication No. 57-108705 and Japanese Examined Patent Application Publication No. 60-1138. As shown in FIG. 13, slit light 121 from a light source 120 is cast on a measuring object (electric resistance welded pipe 110), and this is observed from a different angle with a camera 130, thereby observing a slit image (optical cutting image) deformed following the surface shape of the measuring object 110. The shape of the object can be calculated from this optical cutting image and the geometric position of the observation optical system. This is advantageous in that the observation optical system is simple, that the measurement sensitivity can be widely changed according to the geometric placement of the observation optical system, and so forth. The region outside of the irradiation region of the slit light is called "background texture".

Japanese Unexamined Patent Application Publication No. 52-96049 proposes a bead shape observation method wherein an uncut weld bead portion is observed with the optical cutting method, and marks corresponding to an enlargement ratio determined by optical placement on a display monitor 140.

However, these methods only display a measurement image. Judgment of the bead cutting shape is performed by workers visually judging the monitor 140, and automatic measurement is not yet employed.

An example of a determination method for automatic measurement is the technique disclosed in Japanese Patent No. 2618303, for example. According to this, a method is proposed wherein a picture is taken of the steel pipe bead cutting portion using an optical cutting image from slit light and an ITV camera at the time of measuring the shape following cutting the welding bead of the electric resistance welded pipe, and as shown in FIG. 13, the cross-sectional shape is calculated by performing thinning processing (taking a region wherein one pixel is connected in one direction as a thin line) on the cross-sectional shape picture, the cut portion and uncut portion are distinguished by the luminance of the cross-sectional shape, the value for the center of the distinguished cut portion and the value at the right edge of the cut portion and the value at the left edge of the cut portion are obtained, and the cutting depth, and amount of cutting inclination are calculated based on these three calculated values.

However, with the technique disclosed in Japanese Patent No. 2618303, the specific method for thinning processing only involves performing computation for directly substituting luminance to Y-axial coordinates, such as plotting the maximum luminance in a direction parallel to the pipe axis (Y-axial direction) obtained from the optical cutting image onto the coordinates on an X axis extending in the circumferential direction of the pipe (this is equivalent to the width direction for material steel plates and steel coils, and accordingly with hereafter be referred to as the width direction), so there is the problem in that there are cases wherein an accurate cross-sectional shape cannot be obtained.

Describing this in detail, from the experience of the Inventors repeating experiments at the manufacturing site, while the surface of the cut portion of the electric resistance welded pipe immediately following cutting has a specular surface, the surrounding uncut portions are blackish due to an oxide layer adhering thereto, so the degree of diffusion of the slit light thereof differs. Accordingly, the luminance of the optical cutting image of the bead cutting portion is not necessarily around the same degree in the width direction. For example, there are cases such as in FIG. 14 wherein almost all of the slit light of the cut portion exhibits specular reflection (reflection in the opposite direction to the incident direction at the same angle as the incident angle), with the luminance thereof being one-tenth or less than that of the uncut portion. This is due to the fact that in the event that the incident angle and the reception angle differ, such specular reflection light actually appears to have less luminance.

In such cases, the optical cutting image becomes lost in noise, so the bead cutting shape cannot be obtained well. Attempting to raise the luminance of the cut portion by raising the gain or extending the exposure time of the observation optical system of the ITV camera or the like leads to exceeding the range of the maximum luminance of the specifications of the observation optical system such as the aforementioned camera or the like (halation) at the uncut portion as indicated by (c) in FIG. 1, so the shape of the uncut portion cannot be accurately distinguished. The reason is that in the event that such exceeding of the range of luminance occurs, multiple pipe axis direction coordinates (Y-axial coordinates) indicating the maximum luminance appear at the uncut portion on the optical cutting image, and the pipe axis direction coordinates (Y-axial coordinates) indicating the maximum luminance cannot be uniquely determined.

The present invention has been made to solve the problems such as described above, and accordingly, it is an object thereof to provide a method and device for precisely measuring the bead cutting shape of electric resistance welded pipe without being affected by the difference in luminance level between the cut portion and uncut, portion in optical cutting images.

With regard to suppressing the effects of noise in such an optical cutting method, proposals in other fields using the optical cutting method are conventionally known.

Japanese Unexamined Patent Application Publication No. 57-208404 proposes a method wherein an optical cutting image is searched vertically from top to bottom and an optical cutting line is extracted only from within a section wherein a portion greater than a predetermined setting value first occurs, and subsequent extraction of optical cutting lines is terminated at the one scanning line, thereby preventing erroneously detecting abnormal reflections at portions of the optical cutting line on the object other than the slit luminescent line position.

Also, Japanese Unexamined Patent Application Publication No. 2-35306 proposes a shape detecting method wherein the entire region of the acquired optical cutting image is scanned in the direction crossing the optical cutting line, and in the event that there is a peak value due to the noise image on the scanning line, an optical cutting search range is set based on the optical cutting line position detected on the same scanning line over the entire screen, thereby ignoring noise.

Also, Japanese Unexamined Patent Application Publication No. 4-240508 proposes a three-dimensional shape recognition device for calculating coordinates of an object of measurement based on an optical cutting image, and judging the image to be an unreal image in the event that the shape thereof exists in a needle-like shape separated from surrounding images, thereby ignoring that data and recognizing the shape.

However, with the method disclosed in Japanese Unexamined Patent Application Publication No. 57-208404, a fixed threshold VI is used for recognizing the only optical cutting extraction section, so application thereof to measuring bead cutting shapes wherein the luminance of the optical cutting line of the acquired optical cutting image changes greatly between the cut portion and uncut portion is impossible, as already described.

Also, the method disclosed in Japanese Unexamined Patent Application Publication No. 2-35306 assumes that parts having raised shapes with a generally uniform size in the longitudinal direction are arrayed in the direction of the slit light at equal intervals, as with soldered portions of electronic parts, and generation of noise is explained as being secondary light due to reflected slit light off of a neighboring part, so this is clearly inapplicable to the problems of the present invention since a similar noise generation state is not generated at the cut portion of an electric resistance welded pipe.

Also, with the technique disclosed in Japanese Unexamined Patent Application Publication No. 4-240508, in the state that the optical cutting image of the cut bead becomes non-continuous at a step portion, the step portion is erroneously recognized as a non-continuous image (unreal image) and Ignored, so there has been the problem that this could lead to missing cutting defects.

That is to say, no method has yet been found in the Technical Field of the Present Invention or the field of shape recognition techniques by optical cutting in other Technical Fields, for accurately measuring weld bead cutting shapes even in the event that the SN ratio between the optical cutting line image and the surroundings deteriorates.

The present invention has been made to solve the above-described problems, and accordingly it is an object thereof to provide a measurement method and measurement device which can readily recognize image processing abnormality portions due to deterioration in the SN ratio in three-dimensional shape measurement by the optical cutting method as being uneven portions due to cutting.

With conventional inventions relating to steel pipe welding bead detection methods or devices, mechanical methods, methods using eddy current sensors, optical methods, and so forth, have been proposed.

(Patent Document 1)
Japanese Examined Patent Application Publication No. 59-2593
(Patent Document 2)
Japanese Unexamined Patent Application Publication No. 2000-176642
(Patent Document 3)
Japanese Unexamined Patent Application Publication No. 5-133940
(Patent Document 4)
Japanese Unexamined Patent Application Publication No. 5-18904
(Patent Document 5)
Japanese Unexamined Patent Application Publication No. 9-72851
(Patent Document 6)
Japanese Unexamined Patent Application Publication No. 60-135705

As for a mechanical method, Patent Document 1, for example, proposes a method for detecting deviation of the outer face weld portions of the running pipe using contact-type rollers.

Also, as for a method using a eddy current sensor, Patent Document 2 proposes a center position detection method for the welding bead wherein a detecting head comprising a magnetic core, performing uniform circular motion on a concentric axis within a transmission coil and reception coil disposed in a concentric cylindrical fashion, is erected above the welding bead and brought into close proximity, and at the time of the magnetic core passing over the welding bead, passage timing is detected twice per rotation of the magnetic core based on the change in impedance of the reception coil, with the time passing between these passage timings being computed and compared, thereby detecting the center position of the welding bead.

Also, Patent Document 3 proposes a method wherein a plurality of eddy current sensors are disposed in a form generally extending in one direction, and scanning the object of detection by sequentially switching the roles of the eddy current sensors between magnetization, induced-magnetization, and detection, thereby detecting the bead position from the detection waveform.

Also, as for optical methods, methods have been proposed such as the method disclosed in Patent Document 4 wherein an image of the surface of the pipe is taken and signal waveform features inherent to the weld portion and base metal are extracted and checked against features stored beforehand so as to distinguish these, or a steel pipe welding bead detection method such as disclosed in Patent Document 5 wherein a steel pipe is rotated in the circumferential direction and an image is taken of the surface of the pipe with an ITV camera or the like while irradiating sector light on the surface of the pipe or irradiating sector light consisting of a point light being scanned, the picture signals are subjected to noise removal and tilt correction and the like to form an image which is subjected to correction processing, following which circular arc application is used wherein the difference between a circular rare image to which a circular arc has been applied and an actual image is obtained based on the corrected image, and in the event that the difference data exceeds a preset threshold value, judgment is made that to be a welding bead, while also checking against a tolerance range for the welding bead width set beforehand for a width range exceeding the threshold value, thereby determining the bead position.

Also, Patent Document 6 proposes a bead shape automatic measuring device as a common welding bead position and shape automatic measurement technique, wherein an image is taken of the welding bead from above and from the side, analog image information from the image-taking unit is converted into grayscale level digital information, and the width and height and the like of the welding bead is detected based on the digital image information.

However, with the method using the contact-type sensor such as disclosed in Patent Document 1, the height of the bead must be approximately constant in the longitudinal direction with the irregularities in height thereof being relatively steep, so in the event that the irregularities in height of the bead is constantly smooth, in the event that the bead height is Tow, or in the event that the bead height is not constant in the longitudinal direction, accurate detection cannot be made.

Also, with the method using the concentric motion magnetic core within the concentric cylindrical coils disclosed in Patent Document 2, in the event that a twisted portion in the seam passes through the detection device position while transporting the electric resistance welded pipe which is the subject, or in the event that meandering occurs therein, the positional relation between the electric resistance welded pipe which is the subject and the concentric cylindrical coils or the concentric motion magnetic core which make up the detection device is offset, so accurate welding bead position detection cannot be performed.

Also, the method disclosed in Patent Document 3, wherein magnetization, induced-magnetization, and detection coils are disposed generally in one direction, readily responds to foreign material adhering to the surface of the pipe and irregularities and so forth in the height of the surface of the pipe besides the bead, so it is difficult to avoid erroneous detection, and also, in the event of dealing with various sizes such as with electric resistance welded pipes, multiple detecting heads must be prepared to handle the difference in shape thereof, which increases manufacturing costs.

Also, as for a common problem with these eddy current methods, there is the problem that separate shape measurement means must be provided for evaluating the shape of the welding bead regarding which position detection has been performed, increasing the manufacturing costs of the device.

In comparison with the above-described methods, the optical methods such as disclosed in Patent Document 4 and Patent Document 5 allow non-contact detection, and are advantageous in that not only bead position detection but also bead shape evaluation can be made with the same device configuration. However, there have been various problems in the above-described conventional optical methods.

That is, with the method disclosed in Patent Document 4 for weld-portion/base-metal features extraction, primary methods involve detecting the difference in brightness of the bead portion and other portions (base metal hereafter referred to as "base pipe"), but the brightness (luminance) of the bead portion greatly depends on the welding conditions and the thickness of the base pipe, so beside difficulty in obtaining stable detection, there has been the problem of cases wherein bead recognition cannot be performed in the event that the luminance of the bead portion is low, in particular.

Also, with the steel pipe rotation circular arc application method disclosed in Patent Document 5, the steel pipe must be rotated in the circumferential direction, but at the welding stage of the electric resistance welded pipe, the steel pipe is often connected to the steel coil which is the base metal, making rotation impossible, and in addition to this problem, two circular arcs are calculated from four points of data at the image processing stage, so even in the event that noise processing is carried out, this method is readily affected by jagged shapes often observed in image data, so there is the problem that error readily occurs in the bead position that is calculated, and further, the roundness of the electric resistance welded pipe which is the subject is seldom poor, so there has been the problem that there is a limit suppressing occurrence of detection error with this method which uses the geometrical principle of a circle wherein the center of the pipe exists on a perpendicular bisector of two points.

Also, with the camera image-taking method in Patent Document 6, a point where the gradation for one line of image rapidly changes is searched as the method for determining the bead position, so there has been the problem that in the event that the luminance of the bead portion is low, or depending on the surface properties, there are cases wherein the bead position cannot be determined.

Further, besides these detection methods, as described in Patent Document 5, one skilled in the art would readily conceive a method for measuring the profile of the surface of the steel pipe including the bead position, using an optical cutting method or an optical distance measurement method, and detecting the bead position by processing the profile data. However, in this case, some sort of derivation processing assuming that sudden changes occur in the profile at the bead portion would be commonly applied as a method for processing the profile data, but advances in welding technology in recent years have led to smooth slopes on the bead, while such derivation processing accentuates minute noise which readily occurs in optical profile measurements, so detection of the bead position actually becomes more difficult.

The present invention has been made to solve the problems of the conventional art described above, and it is an object thereof to provide a method and device for accurately detecting the bead shape from the shape data of electric resistance welded pipes with the so-called optical cutting method detected by slit light or point light scanning, without effects of luminance or profile data noise.

Also, as for an optical method, as disclosed in Patent Document 7, a metal flow angle measurement method for electric resistance welded pipes has been proposed, wherein slit light is irradiated before bead cutting on a base pipe which is moving and the optical cutting profile obtained thereby is optically received as image, the width and height of the bead at the welded portion is detected from the obtained optical cutting profile reception signals, and the metal flow angle of the welded portion is computed based on the detection values of the width and height of the bead thus obtained.

(Patent Document 7)
Japanese Examined Patent Application Publication No. 60-7586

Also, Patent Document 8 proposes a metal flow angle measurement method for the welded portion of electric resistance welded pipes, wherein slit light is irradiated before bead cutting on a base pipe which is moving and optical cutting profiles each obtained thereby are optically, received as an image, the surface position of the bead corresponding to a predetermined height within the range of ¾ to ⅓ of the maximum height of the bead based on the rising position of the beard at the welded portion is detected from the obtained optical cutting profile image reception signals, and the metal flow angle of the welded portion is computed based on the horizontal distance from the slope of the bead on the surface and the predetermined height thereof, corresponding to the predetermined height thus obtained.

(Patent Document 8)
Japanese Examined Patent Application Publication No. 60-25234

However, in the event of using a contact-type roller such as disclosed in Patent Document 1 and a speedometer together, the height of the bead must be approximately constant in the longitudinal direction with the irregularities in height thereof being relatively steep, so in the event that the irregularities in height of the bead is constantly smooth, in the event that the bead height is low, or in the event that the head height is not constant in the longitudinal direction, there has been the problem that accurate detection cannot be made.

Also, with Patent Document 7, the shape of the welding bead is taken as being a trapezoid in form, with the relation between the width and height ratio thereof and the metal flow angle being calculated by a shape index computation circuit based on experiment expressions, but advances in welding technology in recent years have led to smooth slopes on the bead, and the optimal slope angle changes depending on the thickness of the plate or the usage, so there has been the problem that operating while experimentally switching over the calibration curve for each case becomes extremely troublesome.

Also, with the Patent Document 8, bead width information is used at ¾ and ⅓ of the bead height, so in addition to the aforementioned problems, there has been the problem that in the event that the bead shape is off of a triangular shape or trapezoid shape, e.g., in the event that the portion of ⅓ through ¾ of the height is vertical, the denominator of the metal flow computation is zero, the computation results are abnormal.

Also, a method may be conceived wherein the cross-sectional-direction shape (in the direction perpendicular to the axis) of the pipe including the weld bead portion is detected and the bead position and slope angle is calculated by derivative values thereof, but in the event that there is noise on the detected shape data, this is accentuated by the derivation computations of such a method, leading to the problems of erroneous bead shape detection or increased error in the slope angle calculations.

The present invention has been made to solve the problems in the conventional art as described above, and it is an object thereof to detect bead shapes with precision from the shape data of electric resistance welded pipes detected by the optical cutting method.

SUMMARY OF THE INVENTION

Accordingly, it is an object of the present invention to provide a measurement method and device for bead cutting shapes which enable highly precise measurement and detection in manufacturing of electric resistance welded pipes.

According to a first aspect of the present invention, a measurement method for a bead cutting shape of an electric resistance welded pipe, for measuring the shape following cutting a bead generated on the inner face or outer face of an electric resistance welded pipe at a welding portion, comprises a step for obtaining an optical cutting image by taking an image of slit light irradiated on the bead portion with image-taking means, from an angle different to the Irradiation direction of the slit light; a step for obtaining each of maximum luminance in the pipe axial direction at a given width-direction coordinate on the optical cutting image, and maximum luminance in background texture region outside of the irradiation range of the slit light; a step for performing interior division of the maximum luminance of the pipe axial direction and the maximum luminance of the background texture region by a ratio determined beforehand, and setting the obtained luminance as a threshold value; a step for taking a luminance greater than the threshold value and a weighted mean of pipe axial direction coordinates indicating the luminance as pseudo-cross-sectional direction coordinates for the width-direction coordinates and pipe axial direction coordinates; and a step for calculating the bead cutting shape of the electric resistance welded pipe based, on a pseudo-cross-sectional shape obtained by stringing pseudo-cross-sectional direction coordinates in the width direction, and a predetermined conversion expression determined from a geometric positional relation of the light source of the slit light, the image-taking means, and the electric resistance welded pipe.

According to a second aspect of the present invention, a measurement method for a bead cutting shape of an electric resistance welded pipe, for measuring the shape following cutting a bead generated on the inner face or outer face of an electric resistance welded pipe at a welding portion, comprises a step for obtaining an optical cutting image, by taking an image of slit light irradiated on the bead portion with image-taking means, from an angle different to the irradiation direction of the slit light; a step for taking, in the event that the maximum luminance in the pipe axial direction at a given width-direction coordinate on the optical cutting image is equal to or exceeds a predetermined fixed threshold value, a weighted mean of pipe axial direction coordinates indicating the luminance as pseudo-cross-sectional direction coordi-nates for the width-direction coordinate and pipe axial direction coordinate; a step for obtaining, in the event that the maximum luminance is less than the predetermined fixed threshold value, each of maximum luminance in the pipe axial direction at a given width-direction coordinate on the optical cutting image, and maximum luminance in background texture region outside of the irradiation range of the slit light; a step for performing interior division of the maximum luminance of the pipe axial direction and the maximum luminance of the background texture region by a ratio determined beforehand, and setting the obtained luminance as a threshold value; a step for taking a luminance greater than the threshold value and a weighted mean of pipe axial direction coordinates indicating the luminance as pseudo-cross-sectional direction coordinates for the width-direction coordinates and pipe axial direction coordinates; and a step for calculating the bead cutting shape of the electric resistance welded pipe based on a pseudo-cross-sectional shape obtained by stringing pseudo-cross-sectional direction coordinates in the width direction, and a predetermined conversion expression determined from a geometric positional relation of the light source of the slit light, the image-taking means, and the electric resistance welded pipe.

According to a third aspect of the present invention, a measurement device for a bead cutting shape of an electric resistance welded pipe, comprises: a slit light source for irradiating slit light at a given incident angle on a bead portion of an electric resistance welded pipe following cutting; image-taking means for taking an irradiation image of the slit light at a different receiving angle; a first computation circuit for calculating, with regard to the optical cutting image output from the image-taking means, the maximum luminance in the pipe axial direction at a given width-direction coordinate on the optical cutting image, and the pipe axial direction coordinate where the maximum luminance occurs; a second computation circuit for calculating the maximum luminance in background texture region, at a position removed by a predetermined number of pixels or more from a pipe axial direction coordinate where the maximum luminance in the pipe axial direction occurs rat a given width-direction coordinate; an accumulation circuit for calculating a luminance which is greater than a threshold calculated following a predetermined computation expression from the first computation circuit and the second output computation circuit, and the weighted mean of pipe axial direction coordinates indicating the luminance; an image reconfiguring circuit for stringing the weighted mean of pipe axial direction coordinates thus calculated to generate a pseudo-cross-sectional shape in the width direction; and a coordinates computation circuit for calculating and displaying the bead cutting shape of the electric resistance welded pipe based on a predetermined conversion expression determined from a geometric positional relation of the slit light source, the image-taking means, and the electric resistance welded pipe.

According to a fourth aspect of the present invention, a measurement device for a bead cutting shape of an electric resistance welded pipe, the device comprising a slit light source for irradiating slit light at a given incident angle on a bead portion of an electric resistance welded pipe following cutting; image-taking means for taking an irradiation image of the slit light at a different receiving angle; a first computation circuit for calculating, with regard to the optical cutting image output from the image-taking means, the maximum luminance in the pipe axial direction at a given width-direction coordinate on the optical cutting image, and the pipe axial direction coordinate where the maximum luminance occurs; a branch circuit for judging whether or not the maximum luminance in the pipe axial direction at the certain width direction is equal to or greater than a predetermined fixed threshold value; a second computation circuit for calculating the maximum luminance in background texture region, at a position removed by a predetermined number of pixels or more from a pipe axial direction coordinate where the maximum luminance in the pipe axial direction occurs at a given width-direction coordinate; a first accumulation circuit for calculating the weighted mean of pipe axial direction coordinates greater than a threshold obtained by interior division of the maximum luminance in the pipe axial direction at the certain width direction, and the maximum luminance at background texture region, by a predetermined ratio; a second accumulation circuit for calculating the luminance equal to or greater than the predetermined fixed threshold value and the weighted mean of pipe axial direction coordinates indicating the luminance; an image reconfiguring circuit for selecting the output of the first accumulation circuit and the second accumulation circuit thus calculated following output from the branch circuit and stringing the output in the width direction so as to generate a pseudo-cross-sectional shape; and a coordinates computation circuit for calculating and displaying the bead cutting shape of the electric resistance welded pipe based on a predetermined conversion expression determined from a geometric positional relation of the slit light source, the image-taking means, and the electric resistance welded pipe.

According to a fifth aspect of the present invention, with a measurement method for a bead cutting shape of an electric resistance welded pipe, for calculating the head shape of an electric resistance welded pipe by subjecting to predetermined image processing an optical cutting image obtained by taking an image of slit light irradiated on a bead generated on the inner face or cuter face of an electric resistance welded pipe at a welding portion with image-taking means from an angle different to the irradiation direction of the slit light, an image obtained by overlaying the optical cutting image and an optical cutting image following thinning processing of the optical cutting image by predetermined processing means is displayed.

The color of each pixel in the optical cutting image following thinning may be colored with a color corresponding to an SN ratio determined by a ratio between the luminance of the optical cutting image on an optical cutting image corresponding to the pixel, and the maximum luminance in a region outside of the slit light, and be displayed.

The color of each pixel in the optical cutting image following thinning by predetermined image processing means of an optical cutting image obtained by taking an image of irradiated slit light with image-taking means from an angle different to the irradiation direction of the slit light, may be categorized and colored with a color corresponding to an SN ratio determined by a ratio between the luminance of the optical cutting image on the optical cutting image corresponding to the pixel, and the maximum luminance in a region outside of the slit light, and be overlaid with the optical cutting image and displayed.

According to a sixth aspect of the present invention, a measurement device for a bead cutting shape of an electric resistance welded pipe comprises: a slit light source for irradiating slit light at a given incident angle on a bead portion of an electric resistance welded pipe following cutting; image-taking means for taking an irradiation image of the slit light at a different receiving angle; a thinning processing circuit for processing the optical cutting image output from the image-taking means so as to display the image of the slit light with one pixel; and an image synthesizing circuit for overlaying the optical cutting image, and the results of the thinning, on the same image.

According to a seventh aspect of the present invention, a measurement device for a bead cutting shape of an electric resistance welded pipe comprises: a slit light source for irradiating slit light at a given incident angle on a bead portion of an electric resistance welded pipe following cutting; image-taking means for taking an irradiation image of the slit light at a different receiving angle; a thinning processing circuit for processing the optical cutting image output from the image-taking means so as to display the image of the slit light with one pixel; and a thinning circuit for coloring the color of each pixel in the thinned optical cutting line corresponding to an SN ratio determined by a ratio between the luminance of the slit light image on the optical cutting image corresponding to the pixel, and the maximum luminance in a region outside of the slit light.

The measurement device may further comprise an image synthesizing circuit for overlaying the optical cutting image and the colored results of the thinning output by the thinning circuit on the same image.

According to an eighth aspect of the present invention, an electric resistance welded pipe bead shape detecting method, for detecting the head shape of an electric resistance welded pipe by the optical cutting method, wherein an image, obtained by a slit light being irradiated or a point light being scanned on a welding portion of an electric resistance welded pipe and an image of the slit light irradiated on the surface of the welding portion or an image of the track of the point light scanned thereupon being taken with image-taking means from an angle different to the irradiation direction of the slit light, is subjected to predetermined image processing, comprises: a step for calculating coordinates for a temporary bead apex by a predetermined calculation expression from a profile of an electric resistance welded pipe; a step for obtaining a first approximation curve by approximating the profile of the electric resistance welded pipe with a quadratic function; a step for calculating the coordinates for two intersecting points on either side of the temporary bead apex from the profile of the electric resistance welded pipe and the first approximation curve; a step for calculating a temporary existence range of the bead by a predetermined calculation expression from the coordinates of the temporary bead apex, and the coordinates of two intersection points on either side of the temporary bead apex; a step for obtaining a second approximation curve by approximating a base pipe shape excluding the temporary existence range of the bead from the profile of the electric resistance welded pipe with an polynomial expression of a degree which is even and quadratic or higher; and a step for determining, of regions wherein the deviation between the profile of the electric resistance welded pipe and the second approximation curve is greater than a predetermined threshold value, a region containing the coordinates of the temporary bead apex as being the bead.

According to a ninth aspect of the present invention, an electric resistance welded pipe bead shape detecting device comprises: light projecting means for irradiating a slit light or scanning a point light on a welding portion of an electric resistance welded pipe at a given angle; image-taking means for taking an image of the projected light irradiated on the welding portion by the light projecting means, from an angle different to the given angle; profile calculating means for calculating a profile of the electric resistance welded pipe by subjecting the image obtained from the image-taking means to predetermined image processing; temporary head apex detecting means for calculating coordinates for a temporary bead apex by a predetermined calculation expression from the profile of the electric resistance welded pipe; first regression computation means for approximating with a predetermined regression expression, with the profile of the electric resistance welded pipe as a quadratic function; intersecting point calculating means for calculating the coordinates for two intersecting points on either side of the temporary bead apex from the output of the first regression computation means and the output of the profile calculating means; first range calculating means for calculating a temporary existence range of the bead by a predetermined calculation expression from the coordinates of the intersection points and the coordinates of the temporary bead apex; second regression computation means for approximating the profile of the electric resistance welded pipe excluding the temporary existence range of the bead thus calculated, with an polynomial expression of a degree which is even and quadratic or higher; and second range calculating means for outputting, of regions wherein the deviation between output from the second egression computation means is greater than a predetermined threshold value and the profile of the electric resistance welded pipe, a region containing the coordinates of the temporary bead apex as being the bead range.

According to a tenth aspect of the present invention, an electric resistance welded pipe bead shape detecting method, for detecting the bead shape of an electric resistance welded pipe, wherein an image, obtained by a slit light being irradiated or a point light being scanned on a pipe surface including a bead portion due to welding of an electric resistance welded pipe, and an image of the slit light irradiated on the pipe surface including the bead portion or an image of the track of the point light scanned thereupon being taken with image-taking means from an angle different to the irradiation direction of slit light, is subjected to predetermined image processing, comprises: a step for obtaining shape data of a portion of the pipe surface equivalent to the bead portion from shape data of the pipe surface including the bead portion calculated in the Image processing, from preset boundaries at the left and right edges of the head portion, and an apex position of the head portion calculated separately; a step for dividing the shape data of the portion of the pipe surface equivalent to the head portion into two regions, left and right; a step for performing approximation with a function with regard to each of the left and right shape data, so as to obtain approximation functions for the left and right bead shapes; a step for performing further approximation with a function, with regard to base pipe shape data excluding the pipe surface shape data of the portion equivalent to the head portion from the shape data of the pipe surface including the bead portion, so as to obtain base pipe shape approximation functions; and a step for calculating at least one of the width, height, slope angle, and step at the left and right boundaries between the bead portion and base pipe, based on each of the left and right bead shape approximation functions, and the base pipe shape approximation function.

Calculations may be performed to minimize the error between the left and right bead shape approximation functions and the shape data of the pipe surface including the bead portion, with approximation functions for the left and right bead shapes as functions wherein two or more straight lines with different inclinations are linked, and with the position of the linking points, the inclination of the straight lines, and intercept, as parameters.

The intersecting points between the left and right bead shape approximation functions and the base pipe shape approximation function may be calculated as the boundaries of both edges of the bead portion; with at least one of the bead width, height, slope angle, and step at the left and right boundaries between the bead portion and base pipe, being calculated, based thereupon.

The deviation in the bead shape approximation function values and the base pipe shape approximation function values at the electric resistance welded pipe cross-sectional direction position on the apex of the head portion may be calculated as the bead height.

The intersecting points between the left and right bead shape approximation functions and the base pipe shape approximation function may be calculated as the boundaries of both edges of the bead portion, with respective differential coefficients being calculated for the intersecting points between the left and right bead shape approximation functions and the base pipe shape approximation function at the electric resistance welded pipe cross-sectional direction position, and the left and right bead slope angles being each calculated, based thereupon.

According to an eleventh aspect of the present invention, an electric resistance welded pipe bead shape detecting device comprises: light projecting means for irradiating a slit light or scanning a point light on a pipe surface including a welding portion of an electric resistance welded pipe; image-taking means for taking an image of the projected light irradiated on the pipe surface including the welding portion, from an angle different to that of the light projecting means; bead shape calculating means for calculating the bead shape of the electric resistance welded pipe by subjecting the image obtained from the image-taking means to predetermined image processing; an apex position setting circuit and a bead range setting circuit, for calculating the bead apex, position and each of the boundary positions between the bead portion and the base pipe excluding the bead portion, based on the bead shape data calculated by the bead shape calculating means; a bead shape approximation circuit for calculating approximation functions for the left and right bead shapes, based on the apex position output from the apex position setting circuit and bead range setting circuit and the left and right boundary positions on either side of the bead apex position; a base pipe shape approximation circuit for calculating a base pipe shape approximation function, based on base pipe shape data further outwards from the left and right boundary positions which the head range setting circuit outputs; a bead range re-setting circuit for re-setting the intersections between the left and right head shape approximation functions output by the head shape approximation circuit, and the base pipe shape approximation function output from the base pipe shape approximation circuit as left and right boundary positions; and a features calculating circuit for calculating at least one of the head width, height, slope angle, and step at the left and right boundaries between the bead portion and base pipe, based on the output of each of the bead range setting circuit, bead shape approximation circuit, and base pipe shape approximation circuit.

According to the present invention, the bead cutting shape of electric resistance welded pipe can be precisely measured without being affected by the difference in luminance level between the cut portion and uncut portion in optical cutting images. The features of the electric resistance welded pipe bead shape are calculated based on the shape data of the pipe surface, so the bead shape can be detected without being affected by changes in the magnetic permeability of the welded portions. The bead shape can be accurately detected even in cases wherein the bead slopes are extremely smooth or the bead height is low, in cases wherein the height of the bead is irregular in the longitudinal direction, or in cases wherein the bead shape is not a triangle or trapezoid, or in cases wherein the bead shape is steep. Also, the bead cutting shape data can be automatically computed and recorded, so not only is the optical cutting image visually monitored; rather, combining this with quantitative judgement and understanding inclinations, and further cutting position control, enables advanced electric resistance welded pipe manufacturing operations to be carried out.

BRIEF DESCRIPTION OF THE DRAWINGS

FIGS. 1A through 1C are diagrams illustrating the operations of the present invention;

FIG. 38 is a diagram comparing this embodiment with a photograph of an actual welding bead taken in the same optical system displacement;

DESCRIPTION OF THE PREFERRED EMBODIMENTS

Figure 2:
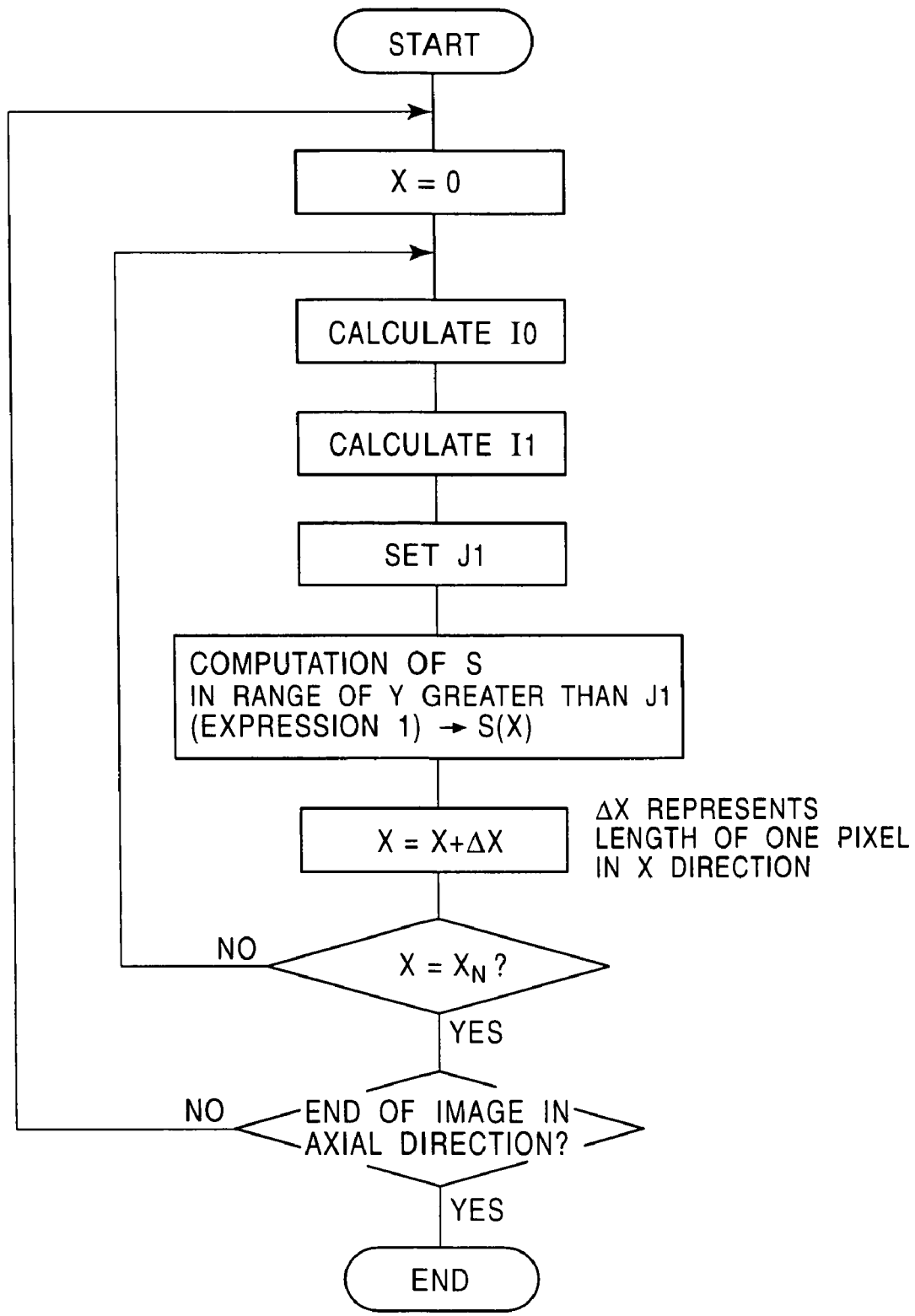
FIG. 2 is a flowchart illustrating a calculating method for an optical cutting line according to a first explanatory arrangement of the present invention.

The following is a detailed description of embodiments of the present invention, with reference to the drawings.

First, two explanatory arrangements will be given as examples of embodiments of the present invention, for the purpose of explaining the principle of the present Invention, following which the First Embodiment and subsequent embodiments will be described.

In a case of taking an optical cutting image with two-dimensional image-staking means such as a CCD camera, a region having both background texture and a slit light irradiation region can be expected to be displayed on a display screen. This will hereafter be referred to as an "optical cutting image". In an optical cutting image, the optical cutting image of the slit light irradiation region is captured as a two-dimensional mesh display image such as shown in FIG. 1A. In FIG. 1A, with the corner further to the bottom left of a bottom left corner pixel sectioned by the two-dimensional mesh as the origin, and with the X axis in the width direction and the Y axis in the pipe axial direction, a diagonal line center can be taken for a representative point for the pixel at the lower left corner, with the coordinates thereof as X=X1, and Y=Y1. Accordingly, each pixel can be determined by coordinates X=Xi, Y=Yj.

Let us say that the aforementioned optical cutting image displays an optical cutting image of the slit light irradiation region. Including the background texture, and for a given pixel represented by the X coordinate X=Xi and the Y coordinate Y=Yj in the optical cutting image, the luminance at that pixel is I(Xi, Yj).

Let us further take the weighted mean S(Xi) of the Y coordinate Yj and luminance I(Xi, Yj) as defined in the following expression as the Y coordinates on the optical cutting line at X=Xi.

$$S(Xi)=\Sigma Yj\, I(Xi,Yj)/\Sigma I(Xi,Yj)$$

Now, in the event that there is a disturbance component such as indirect reflection light or background light in the portion outside of the irradiation region of the slit Tight, such as the background texture portion shown in FIG. 1B, this component will also be added, resulting in error, but the maximum luminance in the Y-axial direction in the optical cutting image is the slit light irradiation region, with little expansion in the Y-axial direction, the extent of which can be described beforehand. The range of Y coordinates in the portion outside of the slit light irradiation region can be taken as noise.

Accordingly, the Y coordinates of the optical cutting line at each X coordinate is obtained by the following procedures (1) through (3).

(1) The Y coordinate Y0 where the Y-axial direction luminance is the greatest (in the event that multiple coordinates exist, the average thereof), and the luminance I0 at that point, are obtained.

(2) The maximum luminance I1 in the range of $$0\leq Y\leq Y0-N_W\Delta Y,\ Y0+N_W\Delta Y\leq Y\leq Yn$$

wherein Yn is a representative Y coordinate of a pixel at the Y-directional edge of the optical cutting image, and $\Delta Y$ represents the Y-directional length of one pixel, is obtained, using a predetermined number of pixels, denoted by $N_W$.

(3) An appropriate value between I0 and I1 (e.g., an average value (I0+I1)/2) is set as a threshold value J1, and S(Xi) is calculated in the range of Y wherein the pixel luminance in the Y direction is greater than J1.

(4) The above procedures (1) through (3) are repeated with the relative movement of the slit light irradiation region in the pipe axial direction.

The procedures for the Y coordinate calculation method for the optical cutting line according to this first explanatory arrangement are shown as a flowchart in FIG. 2, and such computation allows the optical cutting image of the bead cutting shape of the electric resistance welded pipe to be precisely measured without being affected by difference in the luminance level at the cut portion and uncut portion of the optical cutting image.

Also, in the event that the intensity of the reflected light at the uncut portion further causes halation such as indicated by the whited-out portion in FIG. 1A, that is to say, in the event that the intensity of the reflected light at the uncut portion is high enough to exceed the luminance measurement range as shown in FIG. 1C, or, in the event that the noise from the background texture portion is low enough to be negligible, cross-section line calculation of regions with such high reflection light intensity may be substituted with a predetermined fixed threshold value J2. That is to say, the following procedures may be followed instead of the above-described procedures.

(1) The Y coordinate Y0 where the Y-axial direction luminance is the greatest (in the event that multiple coordinates exist, the average thereof), and the luminance I0 at that point, are obtained.

(2) The maximum luminance I1 in the range of $$0\leq Y\leq Y0-N_W\Delta Y,\ Y0+N_W\Delta Y\leq Y\leq Yn$$

wherein Yn is a representative Y coordinate of a pixel at the Y-directional edge, and $\Delta Y$ represents the Y-directional length of one pixel, is obtained, using a predetermined number of pixels, denoted by $N_W$.

(3) In the event that I0 is equal to or exceeds the fixed threshold value J2, S(Xi) is calculated in the range of Y wherein the pixel luminance in the Y direction at X=Xi is equal to or greater than J2.

In this case, J2 may be set to be the maximum value of the luminance range, or may be set somewhat lower than the maximum value of the luminance range, in the range shown by experience not to be equal to or lower than the maximum luminance of the background texture portion.

(4) In the event that I0 is less than the fixed threshold value J2, an appropriate value between I0 and I1 (e.g., an average value (I0+I1)/2) is set as a threshold value J3 (equivalent to J1 in the first explanatory arrangement), and S(Xi) is calculated in the range wherein the pixel luminance in the Y direction is greater than J3.

(5) The above procedures (1) through (4) are repeated with the relative movement of the slit light irradiation region in the pipe axial direction.

Figure 3:
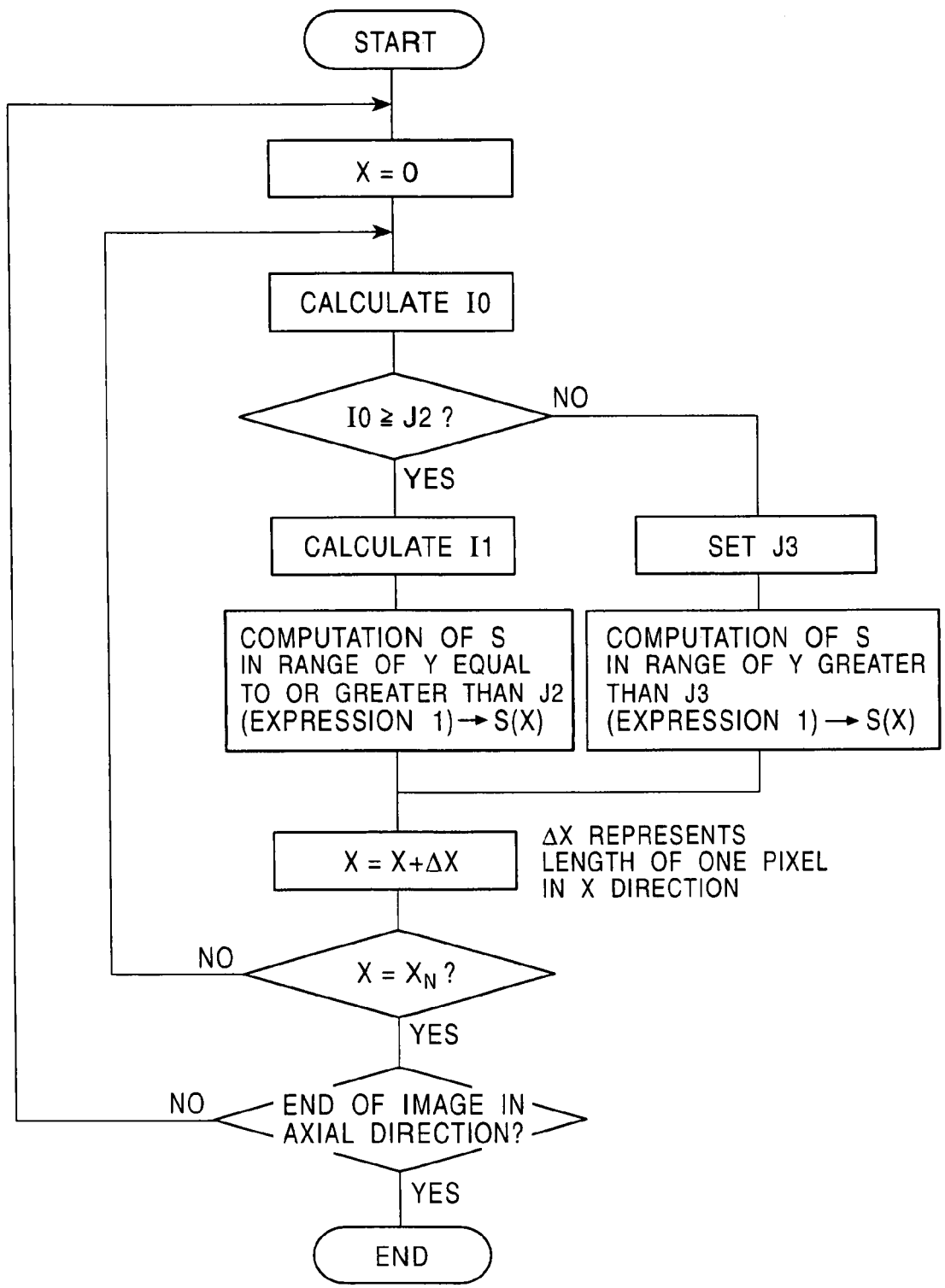
FIG. 3 is a flowchart illustrating a calculating method for an optical cutting line according to a second explanatory arrangement of the present invention.

The procedures for the Y position calculation method for the optical cutting line according this second explanatory arrangement are shown as a flowchart in FIG. 3, and such computation allows the optical cutting image of the bead cutting shape of the electric resistance welded pipe to be precisely measured without being affected by difference in the luminance level at the cut portion and uncut portion of the optical cutting image.

The slit light Irradiation image, which is a pseudo-cross-sectional shape image so as to say, on the electric resistance welded pipe is thus calculated using the optical cutting method. Now, the X coordinate and Y coordinate of the optical cutting line representing the slit light irradiation image with a weighted mean in the skit width direction are the pixel address of the optical cutting image, and in the example of the two explanatory arrangements described above, this is a set of two values with the lower left corner of the optical cutting image as the origin (0, 0), which can be readily converted into a full-scale true cross-sectional shape of the electric resistance welded pipe bead cutting shape.

That is to say, defining the direction perpendicular to both the pipe, axis and the width direction as having a 0° directional angle, with the incident angle of the light source as α and the receiving angle of the image-taking means as β, and further with slit light for the light source and with a camera serving as the image-taking means, in a case wherein a plane formed by the optical axis of the slit light and the optical axis of the camera is disposed perpendicular to the tangential plane of the electric resistance welded pipe at the image-taking position, the cross-sectional position (xi, yj) on the image can be converted by geometric formula into coordinates (xi, yj) for the full-scale true cross-sectional shape of the electric resistance welded pipe bead cutting shape by the expressions $$xi = Xi$$

$$yj = \Delta Y \times Yj \times \cos\alpha / \sin(\alpha+\beta) \quad (3)$$

wherein ΔY represents the length of one pixel in the y direction.

Or, an arrangement may be used wherein a sample wherein dimensions are already known is taken, and conversion coefficients are adjusted from (Xi, Yj) to (xi, yj), instead of the above expression.

In electric resistance welded pipe manufacturing, the width of the welding beard before cutting is around 1/10 to 1/5 of the outer diameter of the pipe, and the position where the welding bead is can be generally known beforehand. The treason is that with general electric resistance welded pipe manufacturing lines, the metal strip which is the material uninterruptedly continues from uncoiling of the metal strip coil of base material, through the formation and welding stages of the pipe, and the position and direction thereof is restricted by the formation rolls and so forth, so even in the event that horizontal movement of the pipe (change in path line), twisting, etc., does occur, the maximum extent thereof is around the width of the bead or so. Here, the bead portion may be anywhere on the circumference of the pipe, but the following descriptions will be made with the bead portion at around the top of the pipe, to facilitate description. Of course, this assumption does not diminish the generality thereof in any way.

Now, detecting the pipe shape including the bead portion over a range sufficiently wider than the head width (hereafter referred to as "profile of electric resistance welded pipe") with an appropriate method and approximating the detected profile of the electric resistance welded pipe with a quadratic function, the approximation curve attempts to approximate not only the base pipe portion but also the protruding shape of the bead portion thereupon at the same time, so the curve is a curve which passes above the profile of the base pipe portion and below the apex of the head portion. This curve is a first approximation curve. Now, the general apex position Xc of the head portion can be obtained with separate means, and points X1 and Xr where the first approximation curve and the profile of the electric resistance welded pipe intersect can be obtained by searching to the left and right from the general apex position, thereby obtaining a general bead range R(X1' to Xr') from the coordinates of X1, Xr, and Xc.

Now, the first approximation curve is restricted to a quadratic function. The reason is that, while the shape of the pipe is essentially horizontally symmetrical with regard to the apex of the bead portion, so approximation with an even function such as a polynomial of an even degree should suffice, approximation with a quartic polynomial or higher showed that inflection points are generated on the approximation curve which accentuate the bead portion, causing adverse effects with regard to calculation of the intersecting points with the base pipe portion. Accordingly, using only a quadratic function avoids this problem.

Next, performing approximation of the profile of the range excluding R at the width-direction coordinate (X coordinate) with a polynomial of an even degree, quadratic or higher, the shape of the base pipe portion can be approximately quite precisely. This is a second approximation curve.

Figure 39:
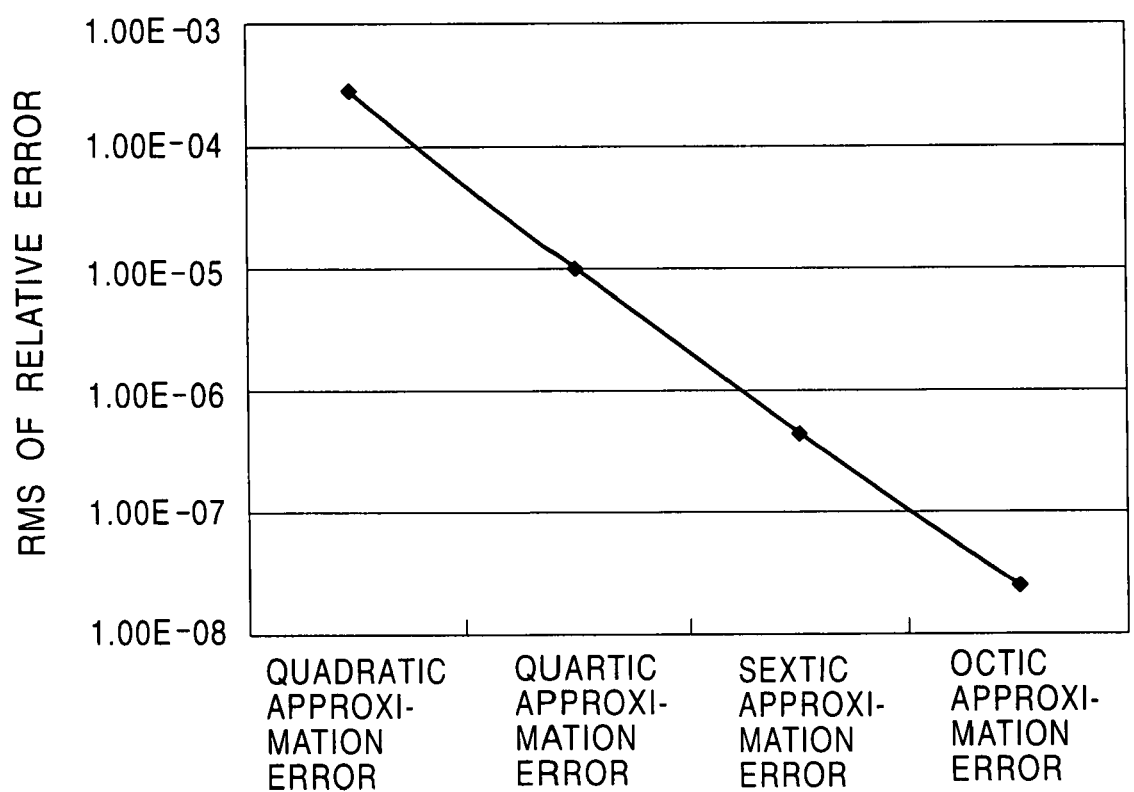
FIG. 39 is a diagram illustrating the relation between the degree of a polynomial and the RMS (root-mean-square) of approximation error, in a case of regression of the upper half curve portion of the ellipse with quadratic, quartic, sextic, and octic polynomials.

The basis for this is shown in the graph in FIG. 39, which indicates the relation between the degree of the polynomial and the RMS (root-mean-square) of the approximation error in the event that the curve at the upper half of an ellipse is subjected to regression with quadratic, quartic, sextic, and octic polynomials. This indicates that regression of the shape of the ellipse can be made with sufficient precision by a polynomial of an even degree, quadratic or higher, and preferably with a polynomial of an even degree, guartic or higher.

This nature can be used to compare the profile of the base pipe portion approximately with sufficient precision with the profile of the electric resistance welded pipe including the bead portion, so as to determine the region containing the coordinates of the bead apex in the range wherein the deviation of the profiles is greater than a predetermined threshold to be the bead.

The above computation uses a polynomial as the approximation curve, so using the least-square method allows regression computation to be performed simply with addition, multiplication, and matrix computation. That is to say, none of the assumptions of circularity and differential computations and the like which have been problematic with the conventional art are used, so there are no effects of noise, and also complicated procedures such as moving averages for noise removal or noise data removal operations per coordinate are unnecessary.

Embodiments

The following is a description of embodiments of the present invention, with reference to the drawings.

First Embodiment

Figure 4:
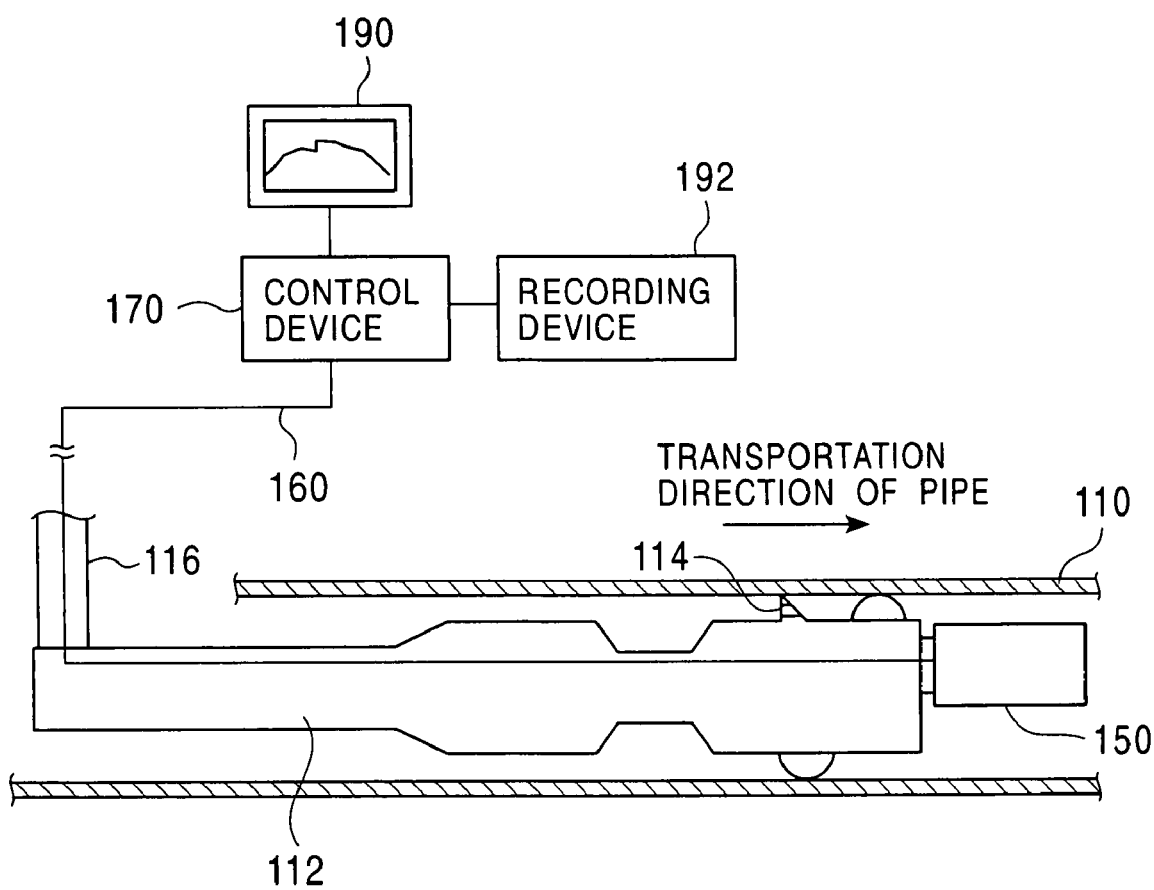
FIG. 4 is a schematic diagram illustrating an inner face bead trimmer comprising a bead cutting shape measurement device for an electric resistance welded pipe according to the present invention.

FIG. 4 illustrates around a bead trimmer 112 on the inner face of the electric resistance welded pipe 110, with reference numeral 114 denoting a cutting tool, 116 denoting a supporting arm, 150 denoting a measurement head Of ahead cutting shape measurement device according to the present invention, 170 denoting a control device, 190 denoting a display device, and 192 denoting a recording device.

The measurement head 150 is placed downstream in the pipe transportation direction, of the cutting tool 114, preferably at a position 500 to 2000 mm therefrom, preferably has a mechanism for protecting the measurement equipment from radiant heat and welding sparks from the welding seam, and scattering of cooling water, and preferably has a gas purging mechanism handling both cleansing and cooling, in order to prevent overheating of the optical system and soiling thereof by water, oil, fumes, and so forth.

Also, the control device 170, display device 190, and recording device 192 are preferably positioned at a working position away form the manufacturing line, for example, near an operating board not shown in the drawings to be operated by an operator, and connected to the measurement head 150 by a cable 160 through a supporting arm 116 or the like, with a shielded configuration to prevent intrusion of electric noise or the like along the way.

Now, while the description of the following embodiment will be made regarding a configuration for measuring the bead cutting shape on the inner side of the pipe, it is needless to say that the measurement method and device for the electric resistance welded pipe bead cutting shape according to the present invention may be equally applied to the outer face or the inner face of the pipe.

Figure 5:
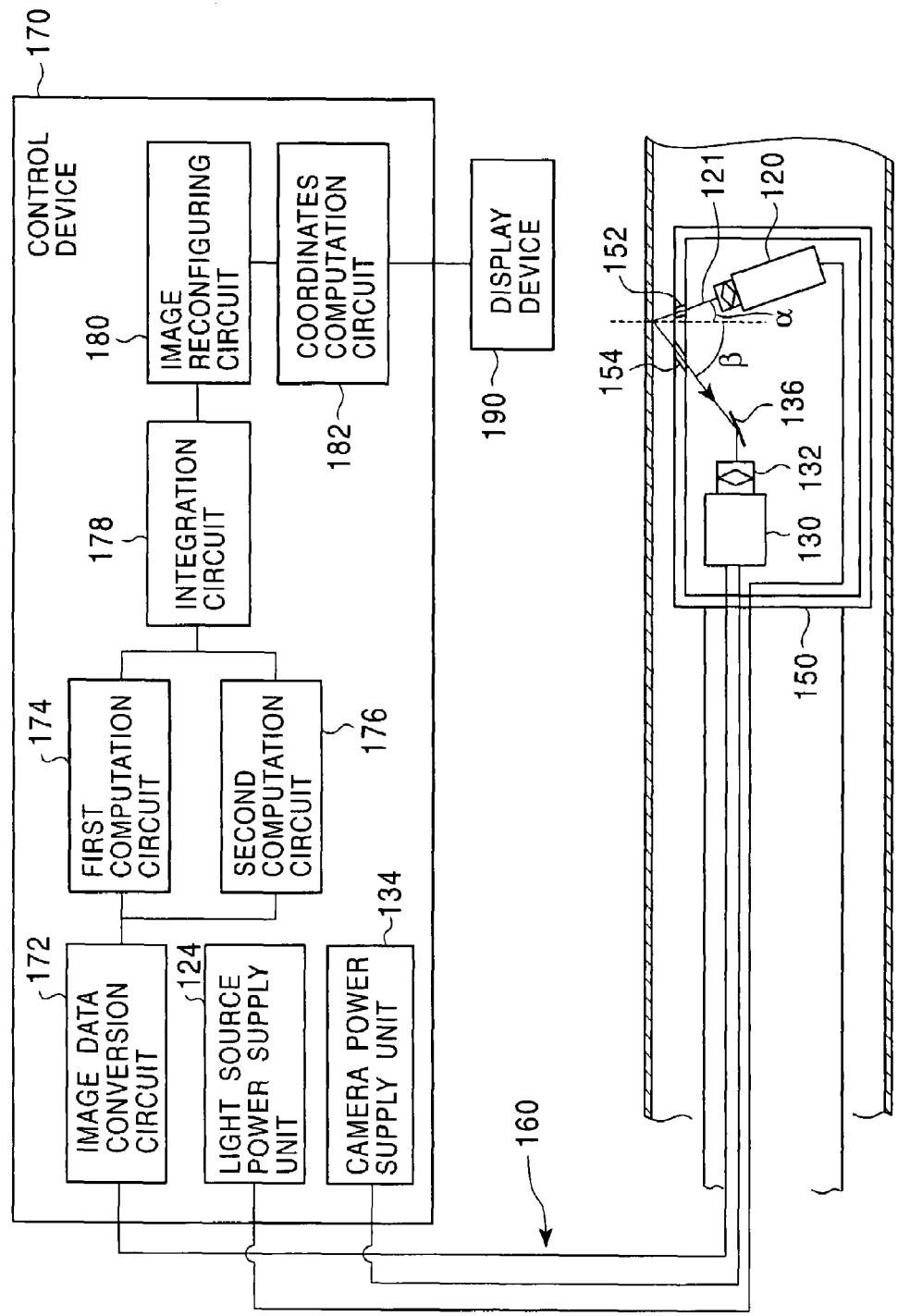
FIG. 5 is a block diagram illustrating the configuration of principal components of the bead cutting shape measurement device according to the present invention.

Next, the configuration of the measurement head 150 and the control device 170 will be described with reference to FIG. 5. In FIG. 5, reference numeral 120 denotes a slit light source, 130 denotes a CCD camera, 132 denotes a lens, 124 denotes light source power source, 134 denotes camera power source, and 172 denotes an image data conversion circuit.

Here, the light source power source 124, camera power source 134, image data conversion circuit 172, and the later-described computation circuit group are preferably stored in one case as a control device 170. The computation circuit group is a first computation circuit 174, a second computation circuit 176, a integration circuit 178, an image reconfiguring circuit 180, and a coordinates computation circuit 182.

The slit light source 120 is within the measurement head 150 and irradiates a slit light 121 which has an angle $\alpha$ as to the cross-section of the electric resistance welded pipe 110, has a predetermined irradiation width in the pipe circumferential direction (width direction), and forms the irradiation weight of a rectangular irradiated image as narrow as possible in the pipe axial direction, preferably 0.05 mm or less, and in this aspect, the present embodiment has the same arrangement as with conventional art.

Now, arrangements using a semiconductor laser device of the light-emitting unit are widely used for the slit light, and arrangements using a combination of knife-edge screens and cylindrical lenses or the like to make the irradiated image rectangular are commercially available.

Also, the closer this angle $\alpha$ is to 90°, the more the bead cutting shape observed with the later-described camera 130 is expanded in the pipe axial direction, but at the same time increases the effects of distance fluctuations between the measurement head 150 and the inner face of the pipe, so the present embodiment uses $\alpha=70°$ as a suitable value taking the balance of both into consideration, based on prior experiments.

The camera 130 observes, the irradiation image of the slit light irradiated onto the bead cutting portion from an angle $\beta$ as to the cross-section of the electric resistance welded pipe 110, and ITVs or cameras using semiconductor devices such as CCD or CMOS which are widely used in industrial fields can be used. Also, a commercially-available camera lens may be used for the lens 132 for image formation by the camera, but a band-pass filter having a passage wavelength band matching the wavelength of the light source in order to eliminate unnecessary light such as background light or the like from the optical cutting image, and a heat-ray cut filter or the like for preventing damage to the image-taking surface of the camera and the lens from radiant heat, should be provided as necessary.

The measurement head 150 is preferably a sealed structure for protecting the optical equipment such as the camera 130, light source 120, lens 132, etc., within from heat and water and the like, and in this case, a preferably configuration has windows 152 and 154 for only the slit light and camera field of view portions, respectively.

The position angle of the camera 130 is preferably such that $(\alpha+\beta)$ is generally 90°, with the number of pixels of the camera and the field of view being determined based on the width of the bead portion and the necessary resolution. With the present invention, the slit light irradiation angle from the light source 120 is $\alpha=70°$, the image-taking angle is $\beta=30°$, the range of the field of view is 25 mm wide and 20 mm high, and the number of pixels is 1300 horizontally by 1000 vertically, as a suitable value. Thus, the height-wise resolution is $20/1000 * \cos(70°)/\sin(70°+30°) = 0.0069$ mm. Also, the width-wise resolution is $25/1300 = 0.0192$ mm, so the bead cutting state can be monitored with a resolution of 20 μm in the width direction (circumferential direction) and 7 μm in the height direction (pipe axial direction).

Also, it is needless to say that the light source 120 and camera 130 should be positioned such that the optical axes thereof. Intersect precisely over the bead cutting portion, and further, the plane formed by the axial axes of the light source 120 and camera 130 even more preferably contains the direction of progression of the electric resistance welded pipe 110, i.e., the center axis of the pipe. The reason is that this arrangement of the light source and the camera allows the optical cutting image on the inner face of the pipe to be horizontally symmetrically taken with regard to a virtual center line extending in the Y-axial direction on the optical cutting image.

Further, the light source 120 and the camera 130 may be fixed to the measurement head 150 in an inclined state as shown in FIG. 5, or may be disposed so that their optical axes are both parallel to the central axis within the electric resistance welded pipe to reduce the size of the device, with the angle of the optical axis being changed by the reflection mirror 136.

Next, the configuration of the components of the control device 170 will be described. The image data conversion circuit 172 converts each pixel of image signals output form the camera 130 into luminance data and outputs, and an image board (frame-grabber) widely commercially available in recent years, which is compatible with the camera 130, can be used.

The first computation circuit 174 is for calculating the maximum luminance I0 in the Y-axial direction and the Y coordinate Y0 showing the maximum luminance, for each X coordinate Xi (i=0 through N) in the acquired image, and the second computation circuit 176 is for calculating the maximum luminance I1 of the background texture in the pixel data in the Y-axial direction ($0 \leq Y \leq Y0-N_W\Delta Y, Y0+N_W\Delta Y \leq Y \times Y_n$), using Y0 and the number of offset pixels set beforehand $N_W$ and the Y-directional length of one pixel $\Delta Y$. The second computation circuit 176 may have the same configuration as the first computation circuit 174, except for the computation range being different.

The integration circuit 178 calculates a threshold value J1 by a predetermined internal division ratio from the I0 and I1 thus calculated, and calculates the weighted mean S(Xi) only in the range wherein, of one line pixel in the Y direction wherein X=Xi, the pixel luminance is greater than J1. With the present embodiment, the internal division ratio is 1:1, so this is calculated by $J1=(I0+I1)/2$.

The image reconfiguring circuit 180 reconfigures the weighted mean S(Xi) output for each X coordinate as described above into an image picture Q(Xi, Yj) as optical cutting shapes at each X=Xi.

The coordinates computation circuit 182 converts a string of optical cutting line coordinates (a set of an X coordinate and a Y coordinate indicating the position of the optical cutting line at each X coordinate) output by the image reconfiguring circuit 180 based on a predetermined conversion expression determined by the placement of the optical system and the resolution of the camera, into the full-scale data of a true cross-sectional shape, and can be realized with a circuit which performs computation of (xi, yj), described in the section on operations, for example.

Next, the results of implementing the present embodiment will be described.

Figure 6:
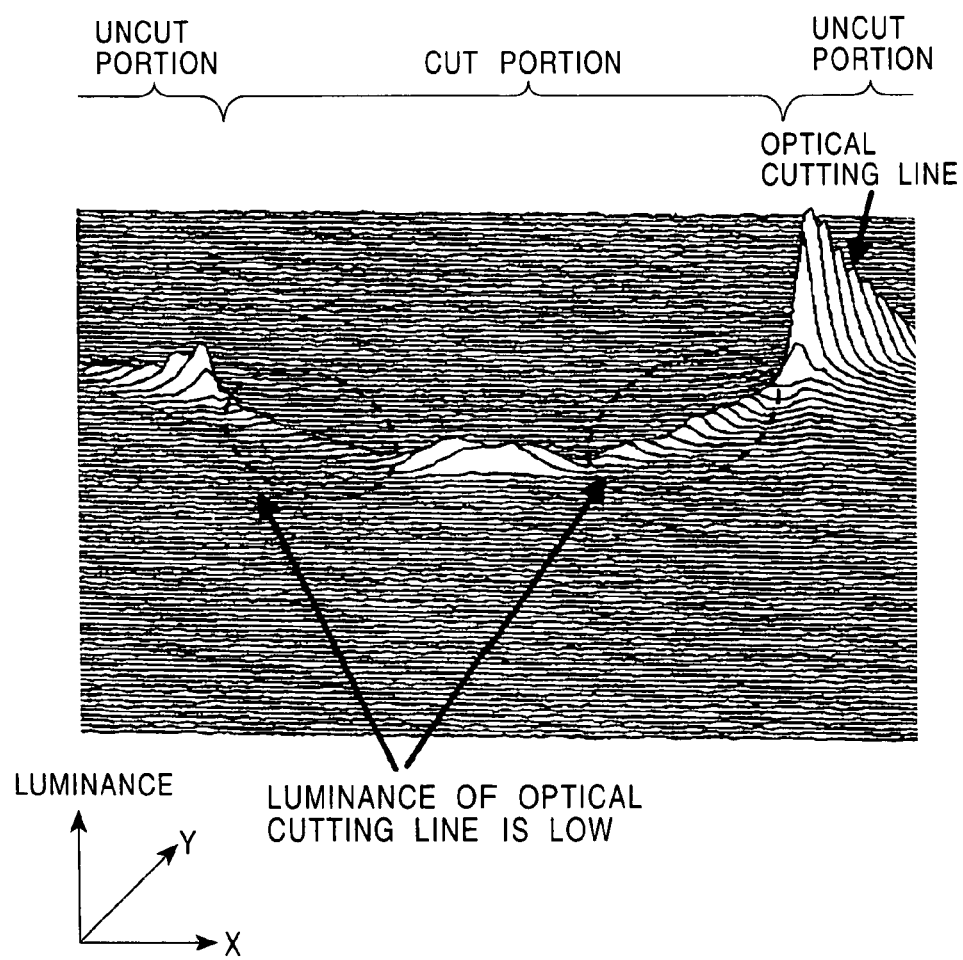
FIG. 6 is a diagram illustrating an optical cutting image measurement example of a bead cutting portion of an electric resistance welded pipe according to a first embodiment of the present invention.

An optical cutting image, observed with the camera 130 through the lens 132 from the slit light 121 irradiated from the light source 120 of this device onto the bead cutting portion 111 while manufacturing the electric resistance welded pipe 110, was as shown in FIG. 6, with the slit light irradiation image being bright and heavy at the uncut portion, and the slit light irradiation image at the cut portion being difficult to visually recognize.

Figure 7:
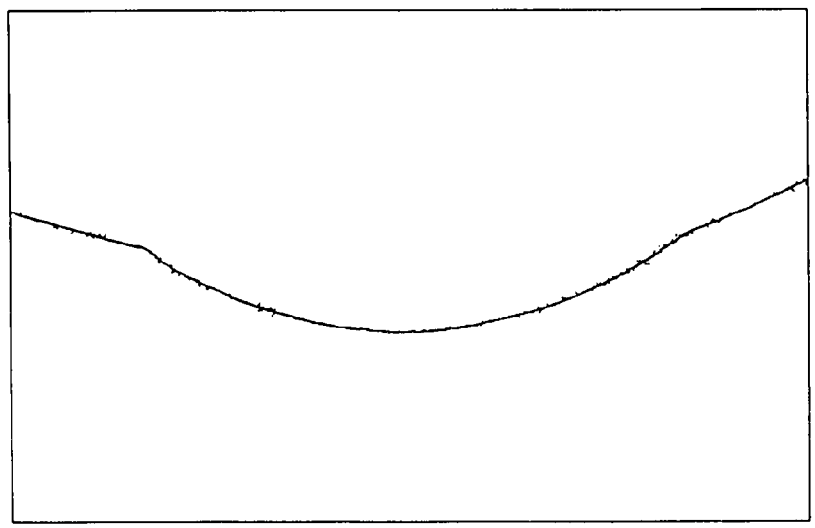
FIG. 7 is a diagram illustrating the bead cutting shape of the electric resistance welded pipe output by an image reconfiguring circuit of the first embodiment with regard to the measured image shown in FIG. 6.
Figure 8:
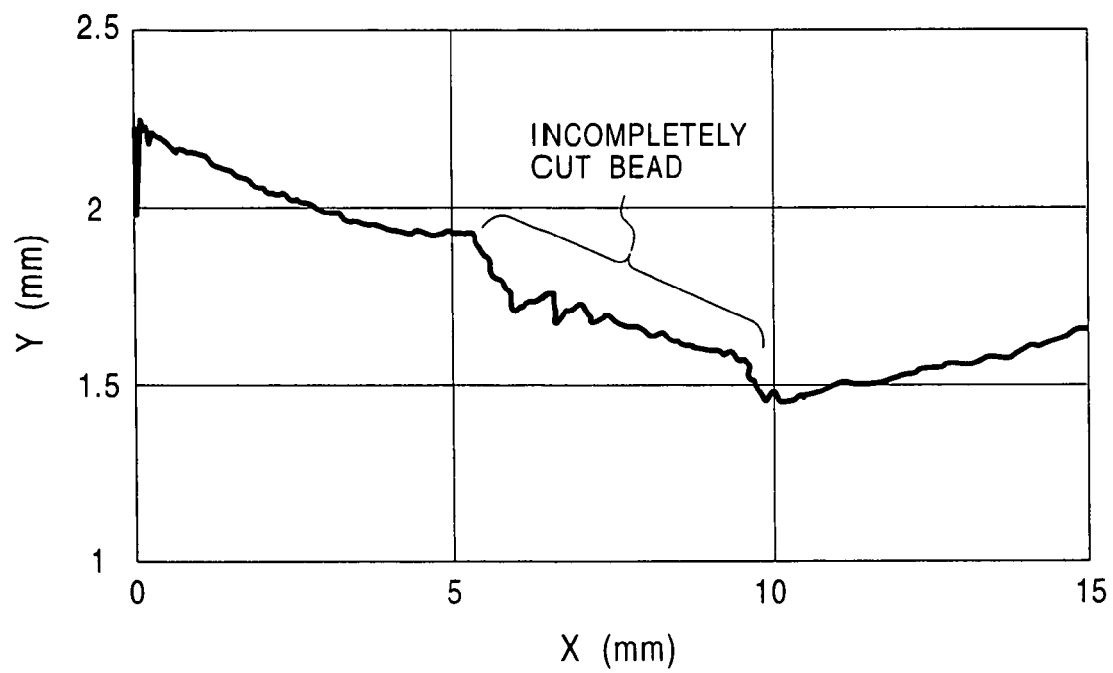
FIG. 8 is a diagram illustrating an example wherein a shape abnormality has been observed in the output of the first embodiment at the time of manufacturing a different electric resistance welded pipe.
Figure 9:
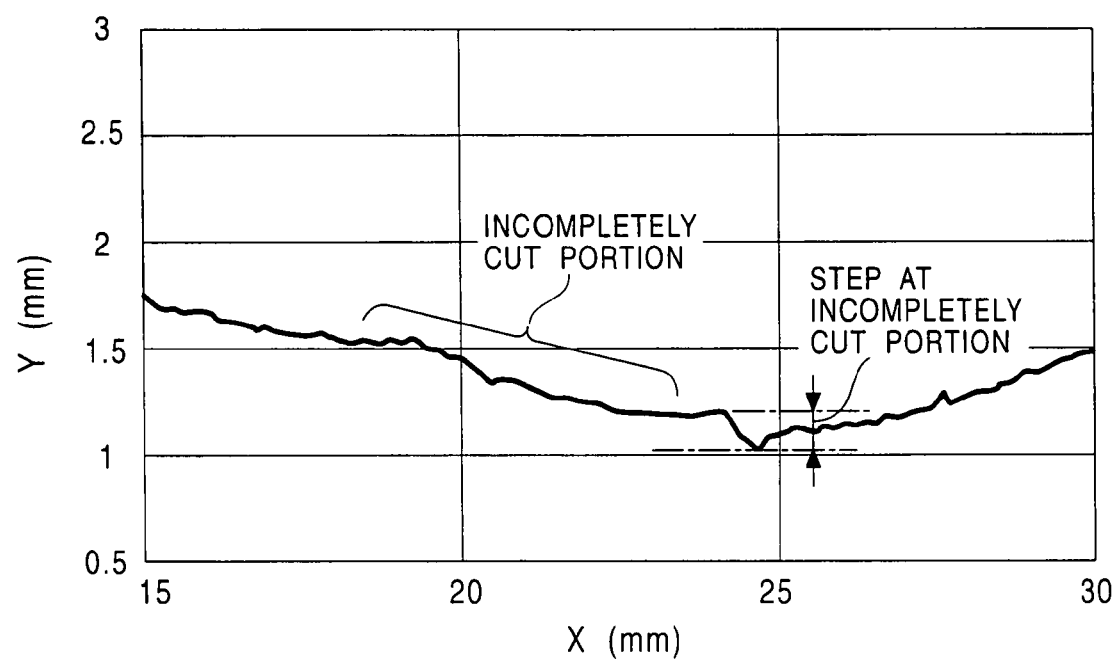
FIG. 9 is a diagram Illustrating the results of collecting a sample of the bead cutting portion on the inner side of the pipe equivalent to FIG. 8; and performing off-the-line measurements of the bead cutting shape.

On the other hand, the image output from the image reconfiguring circuit 180 is as shown in FIG. 7, and even though the contrast of the optical cutting image was extremely low at the cut portion, the fact that the cut was normal, and the manner in which the cut portion and uncut portion differ in curvature, could be observed. Also, the output image of the image reconfiguring circuit 180 while manufacturing a different electric resistance welded pipe 110 was as shown in FIG. 8, wherein it could be configured that the head cutting was incomplete, due to some sort of cutting abnormality. A sample was collected of the bead cutting portion on the inner side of the pipe equivalent to FIG. 8, and off-the-line measurements were performed using a non-contact distance meter, which showed that the height of the step at the incompletely cut portion was 0.15 mm as shown in FIG. 9, thereby confirming that the head cutting shape is being measured accurately even in cases wherein there are abnormalities in the cutting.

Second Embodiment

Figure 10:
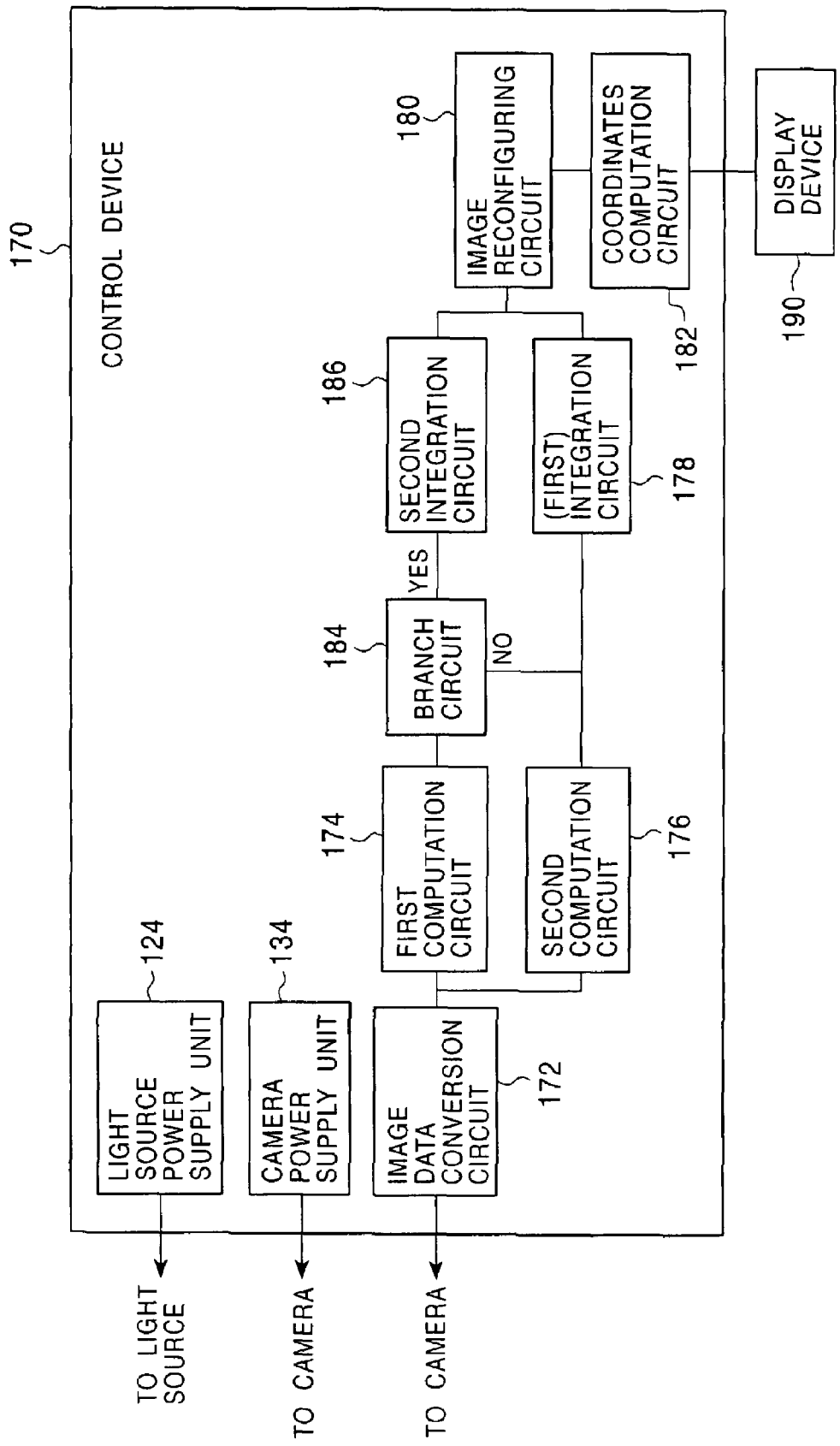
FIG. 10 is a block diagram Illustrating the configuration of principal components of the bead cutting shape measurement device according to a second embodiment of the present invention.

FIG. 10 is a block diagram illustrating the configuration of the computation circuit group within the measurement head according to another embodiment of the present invention. The unshown bead trimmer 112 and measurement head 150 to be mounted thereupon are of the same configuration as those in the first embodiment, so description thereof will be emitted.

Also, in FIG. 10, with regard to the first computation circuit 174, second computation circuit 176, integration circuit 178 (hereafter referred to as "first integration circuit"), and image reconfiguring circuit 180, the same articles as those used in the above first embodiment may be employed here. Reference numeral 184 in the present embodiment denotes a branch circuit and 186 denotes a second integration circuit.

The branch circuit 184 is a circuit for judging which of the maximum luminance I0 on the optical cutting line calculated by the first computation circuit 174, and the fixed threshold value J2 set beforehand, is greater, and causing one or the other of the first integration circuit 178 and the second integration circuit 186 to operate. This can be configured with a commercially-available comparator circuit.

The first computation circuit 174 is for calculating the maximum luminance I0 in the Y axial direction and the Y coordinate Y0 showing the maximum luminance, for each X coordinate Xi (i=0 through N) in the acquired image, the branch circuit 184 is a circuit for judging whether or not the maximum luminance I0 is greater than the predetermined fixed threshold value J2, and the second integration circuit 186 calculates the weighted mean S(Xi) only in the range wherein, of one line pixel in the Y direction wherein the pixel luminance is greater than the predetermined fixed threshold value J2. With the present embodiment, the threshold J1 of the integration circuit 178 in the above-described first embodiment is replaced with the predetermined fixed threshold value J2.

The same image reconfiguring circuit 180 as that with the above-described first embodiment may be used, with the branch circuit 184 selecting either the first integration circuit 178 or the second integration circuit 184 as the input thereof.

Next, the results of implementing the present embodiment will be described.

Figure 11:
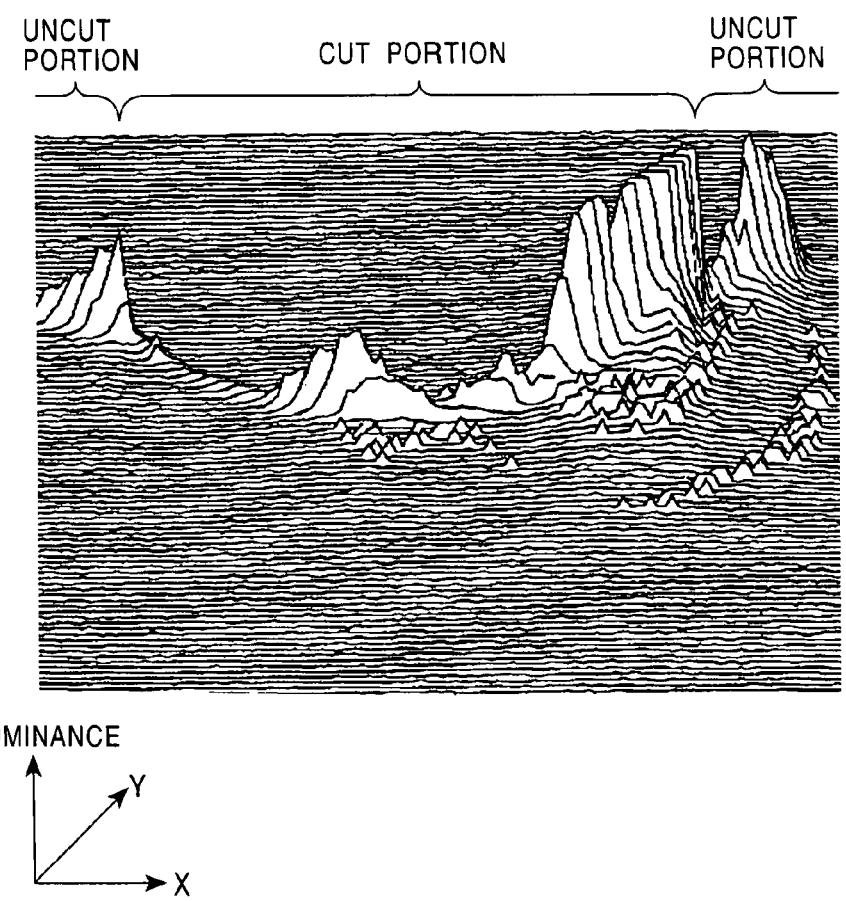
FIG. 11 is a diagram illustrating optical cutting image measurement results of the bead cutting portion of the electric resistance welded pipe according to the same.
Figure 12:
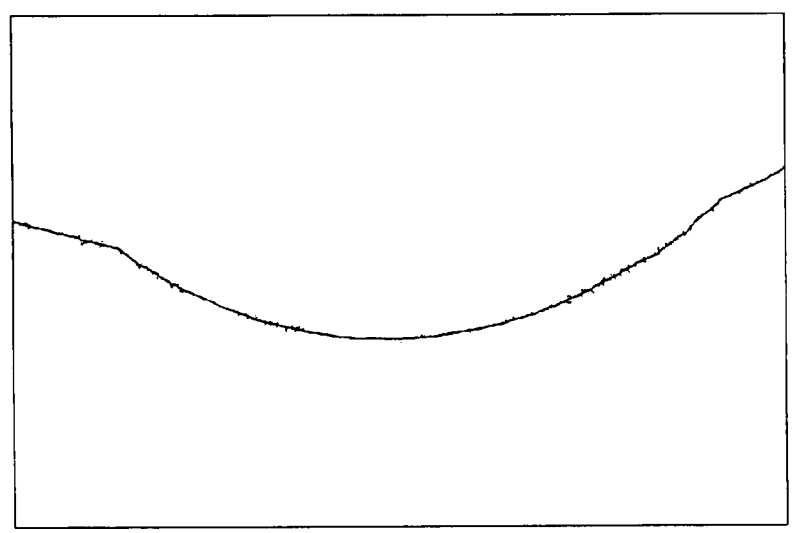
FIG. 12 is a diagram illustrating the bead cutting shape of the electric resistance welded pipe output by an image reconfiguring circuit of the second embodiment with regard to the measured image shown in FIG. 11.
Figure 13:
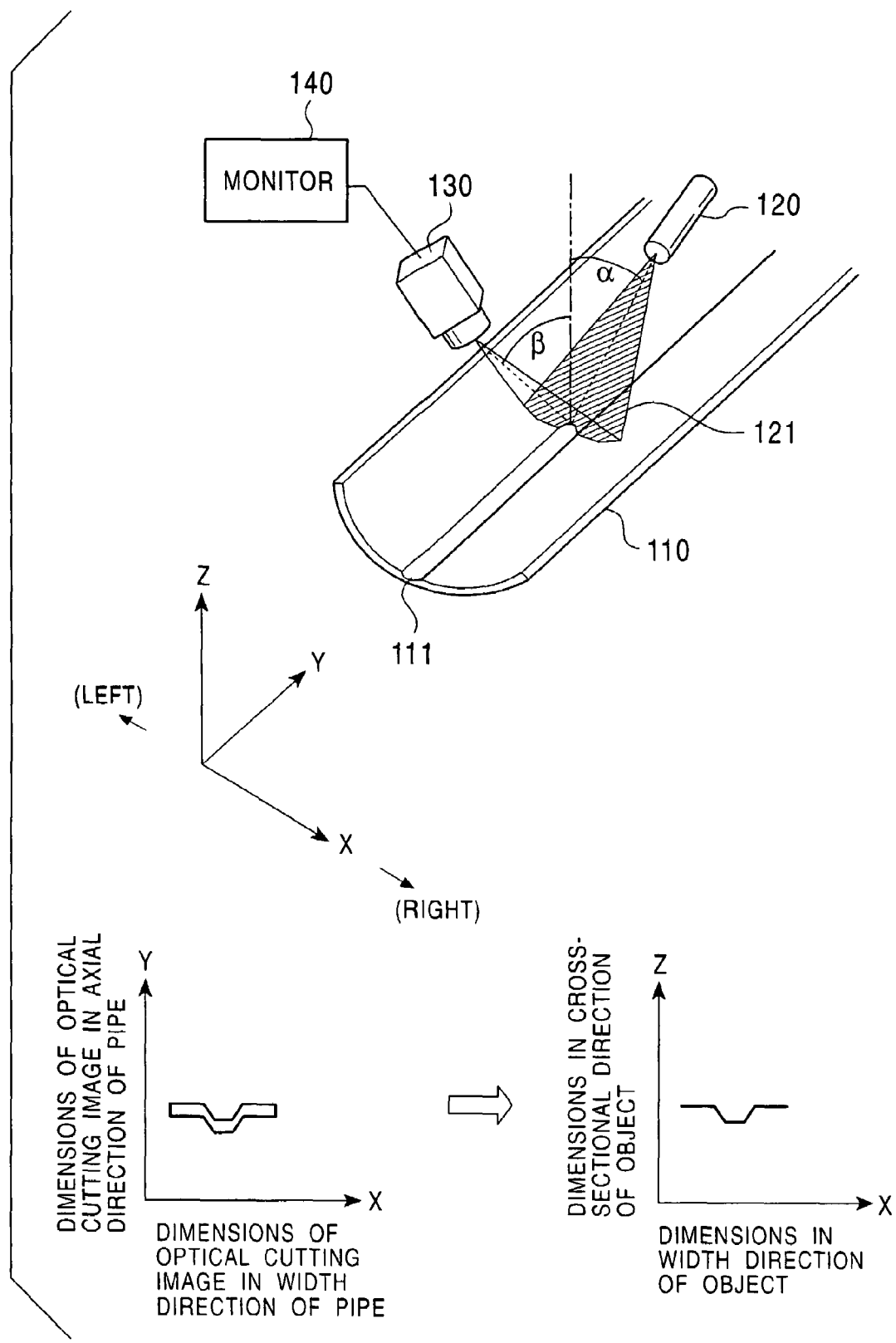
FIG. 13 is a schematic diagram illustrating the principle of optical cutting method.
Figure 14:
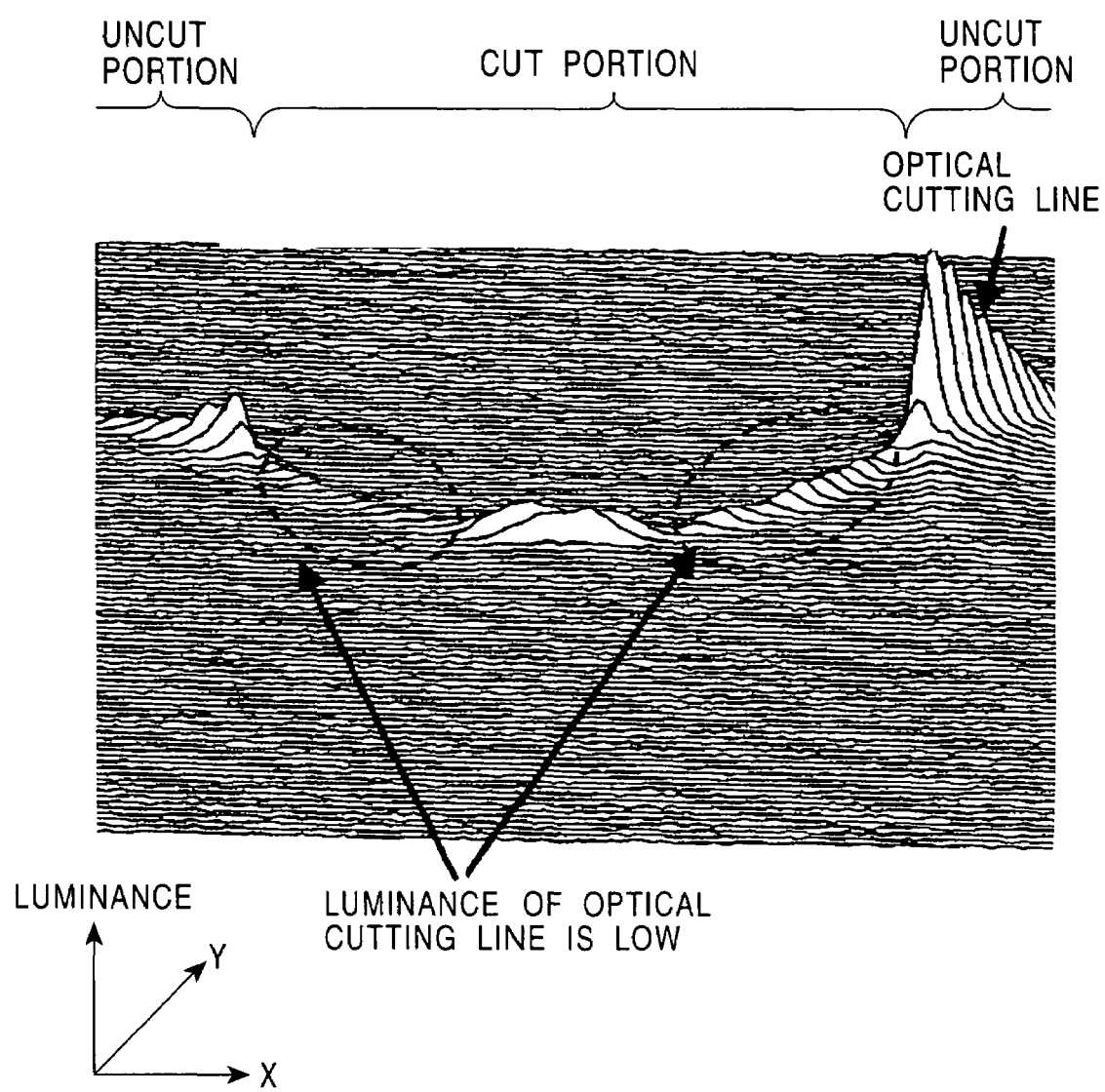
FIG. 14 is a diagram illustrating an example wherein a portion of the luminance of the optical cutting image has markedly deteriorated, in the event of measuring the bead cutting portion of the electric resistance welded pipe with the optical cutting method.

An optical cutting image of the bead portion on the inner face of the electric resistance welded pipe observed with the present embodiment while manufacturing another electric resistance welded pipe 110, was as shown in FIG. 11, with the uncut portion to the right side exhibiting halation so the optical cut line is markedly heavier than other portions, and noise extending upwards and downwards, while the slit light irradiation image at the cut portion is difficult to visually recognize, as with the first embodiment. On the other hand, the image output from the image reconfiguring circuit 180 is as shown in FIG. 12, and the bead cutting shape could be measured suitably without effects of halation or noise.

Third Embodiment

Figure 15:
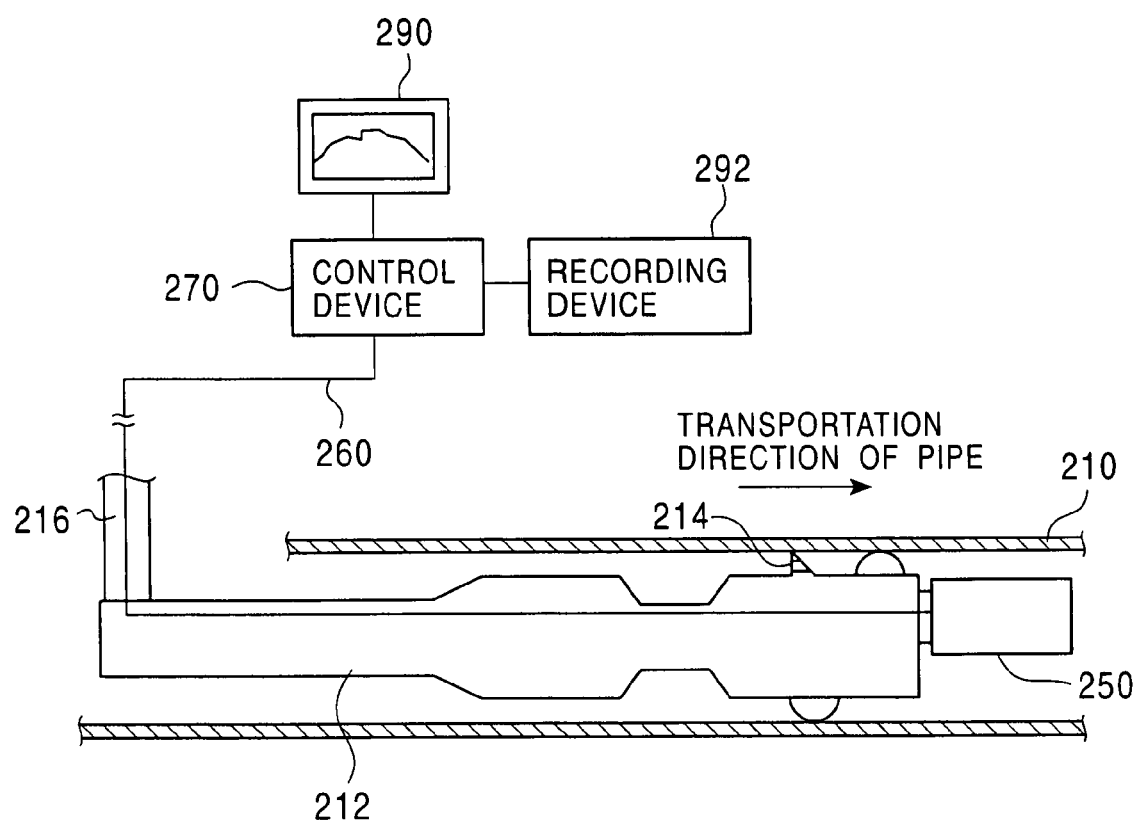
FIG. 15 is a schematic diagram illustrating an inner face bead trimmer comprising a bead cutting shape measurement device for an electric resistance welded pipe according to the present Invention.

FIG. 15 illustrates around a bead trimmer 212 on the inner face of the electric resistance welded pipe 210, with reference numeral 214 denoting a cutting tool, 216 denoting a supporting arm, 250 denoting a measurement head of a bead cutting shape measurement device according to the present invention, 270 denoting a control device, 290 denoting a display device, and 292 denoting a recording device.

The measurement, head 250 is placed downstream in the pipe transportation direction of the cutting tool 214, preferably at a position 500 to 2000 mm therefrom, preferably has a mechanism for protecting the measurement equipment from radiant heat and welding sparks from the welding seam, and scattering of solution water, and preferably has a gas purging mechanism handling both cleansing and cooling, in order to prevent overheating of the optical system and soiling thereof by water, oil, fumes, and so forth.

Also, the control device 270, display device 290, and recording device 292 are preferably positioned at a working position away form the manufacturing line, for example, near an operating board not shown in the drawings to be operated by an operator, and connected to the measurement head 250 by a cable 260 through a supporting arm 216 or the like, with a shielded configuration to prevent intrusion of electric noise along the way.

Now, while the description of the following embodiment will be made regarding a configuration for measuring the head cutting shape on the inner side of the pipe, it is needless to say that the measurement method and device for the electric resistance welded pipe head cutting shape according to the present invention may be equally applied to the outer face or the inner face of the pipe.

Figure 16:
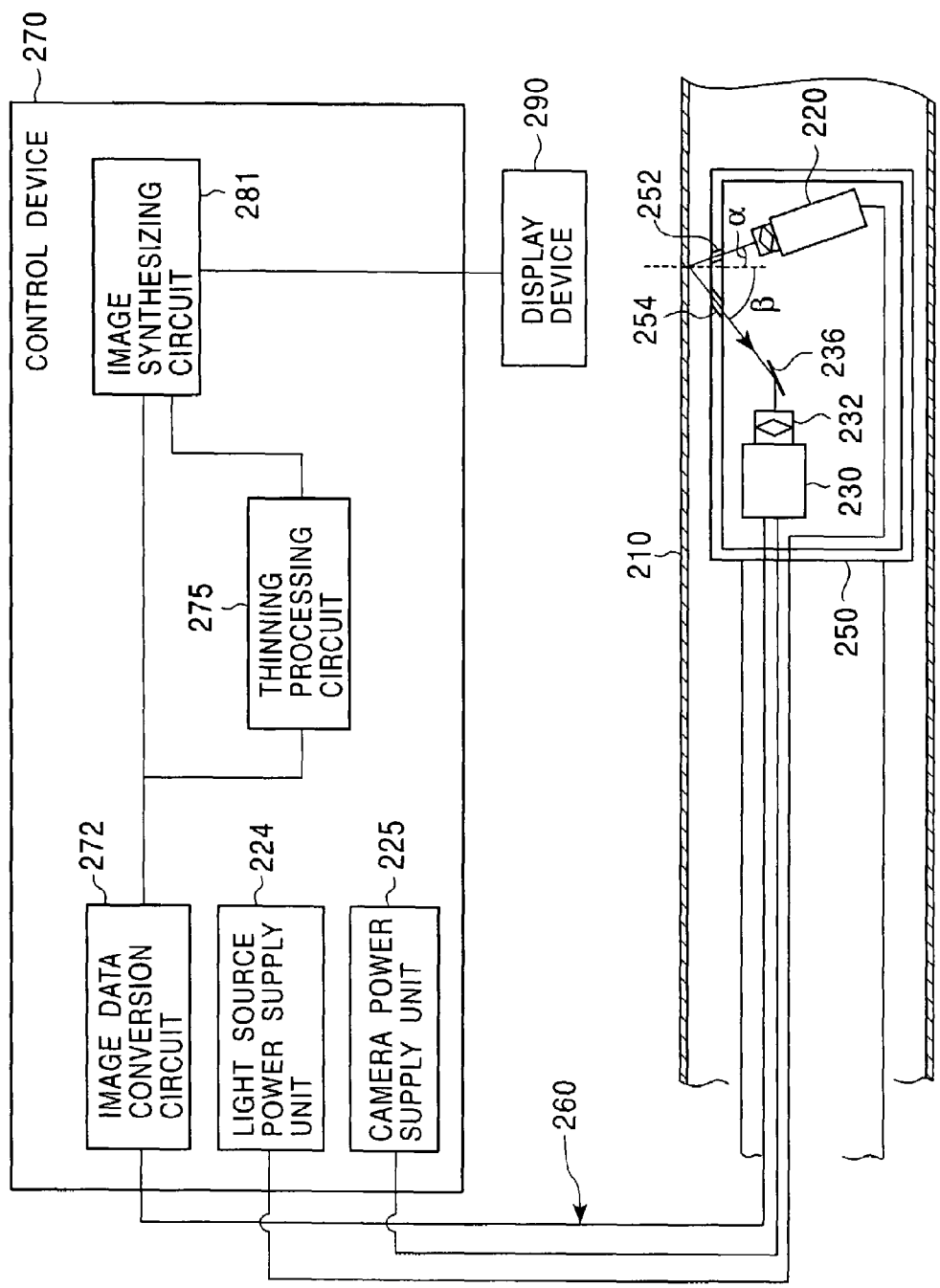
FIG. 16 is a block diagram illustrating the configuration of principal components of the bead cutting shape measurement device according to the present invention.

Next, the configuration of the measurement head 250 will be described with reference to FIG. 16. In FIG. 16, reference numeral 220 denotes a slit light source, 230 denotes a camera, 232 denotes a lens, 224 denotes light source power source, 225 denotes camera power source, and 272 denotes an image data conversion circuit.

Here, the light source power source 224, camera power source 225, image data conversion circuit 272, and the later-described computation circuit group are preferably stored in one case as a control device 270. The computation circuit group is a thinning processing circuit 275 and an image synthesizing circuit 281.

The slit light source 220 is within the measurement head 250 and irradiates a slit light 221 which has an angle α as to the cross-section of the electric resistance welded pipe 210, has a predetermined irradiation width in the pipe circumferential direction (width direction), and forms the irradiation width of a rectangular irradiated image as narrow as possible in the pipe axial direction, preferably 0.05 mm or less, and in this aspect, the present embodiment has the same arrangement as with conventional art.

Now, arrangements using a semiconductor laser device of the light-emitting unit are widely used for the slit light, and arrangements using a combination of knife-edge screens and cylindrical lenses or the like to make the irradiated image rectangular are commercially available.

Also, assuming that the status perpendicular to the irradiation portion is 0°, the closer this angle α is to 90°, the more the head cutting shape observed with the later-described camera 230 is expanded in the pipe axial direction, but at the same time increases the effects of distance fluctuations between the measurement head 250 and the inner face of the pipe, so the present embodiment uses or =70° as a suitable value taking the balance of both into consideration, based on prior experiments.

The camera 230 observes the irradiation image of the slit light irradiated onto the bead cutting portion from an angle β as to the cross-section of the electric resistance welded pipe 210, and ITVs or cameras using semiconductor devices such as CCD or CMOS which are widely used in industrial fields can be used. Also, a commercially-available camera lens may be used for the lens 232 for image formation by the camera, but a band-pass filter having a passage wavelength band matching the wavelength of the light source in order to eliminate unnecessary light such as background light or the like from the optical cutting image, and a heat-ray cut filter or the like for preventing damage to the image-taking surface of the camera and the lens from radiant heat, should be provided as necessary.

The measurement head 250 is preferably a sealed structure for protecting the optical equipment such as the camera 230, light source 220, lens 232, etc., within from heat and water and the like, and in this case, a preferably configuration has windows 252 and 254 for only the slit light and camera field of view portions, respectively.

The position angle of the camera 230 is preferably such that (α+β) is generally 90°, with the number of pixels of the camera and the field of view being determined based on the width of the bead portion and the necessary resolution. With the present invention, the slit light Irradiation angle from the light source 220 is α=70°, the image-taking angle is β=30°, the range of the field of view is 25 mm wide and 20 mm high, and the number of pixels is 1300 horizontally by 1000 vertically, as a suitable value. Thus, the height-wise resolution is $20/1000*\cos(70°)/\sin(70°+30°)=0.0069$ mm. Also, the width-wise resolution is $25/1300=0.0192$ mm, so the bead cutting state can be monitored with a resolution of 20 μm in the width direction (circumferential direction) and 7 μm in the height direction (pipe axial direction).

Also, it is needless to say that the light source 220 and camera 230 should be positioned such that the optical axes thereof intersect precisely over the bead cutting portion, and further, the plane formed by the axial axes of the light source 220 and camera 230 even more preferably contains the direction of progression of the electric resistance welded pipe 210, i.e., the center axis of the pipe. The reason is that this arrangement of the light source and the camera allows the optical cutting image on the inner face of the pipe to be horizontally symmetrically taken with regard to a virtual center line extending in the Y-axial direction on the optical cutting image.

Further, the light source 220 and the camera 230 may be fixed to the measurement head 250 in an inclined state as shown in FIG. 16, or may be disposed so that their optical axes are both parallel to the central axis within the electric resistance welded pipe to reduce the size of the device, with the angle of the optical axis being changed by the reflection mirror 236.

Next, the configuration of the components of the control device 270 will be described. The image data conversion circuit 272 converts each pixel of image signals output form the camera 230 into luminance data and outputs, and an image board (frame-grabber) widely commercially available in recent years, which is compatible with the camera 230, can be used.

The thinning processing circuit 275 is for performing thinning processing of the slit, light image within the acquired picture. Either conventionally known thinning processing means, or the thinning processing method proposed here by the Inventors, may be used.

The image synthesizing circuit 281 is for overlaying the slit light image picture subjected to thinning processing as described above, and the original optical cutting image (original image picture) output from the image data conversion circuit. Specifically, the image synthesizing circuit 281 performs computation such as addition of values of pixels on the same coordinates in the image, obtaining the logical OR, overwriting a thinning line alone on the original image picture, and so forth.

Next, the operations of the present embodiment will be described.

Figure 17:
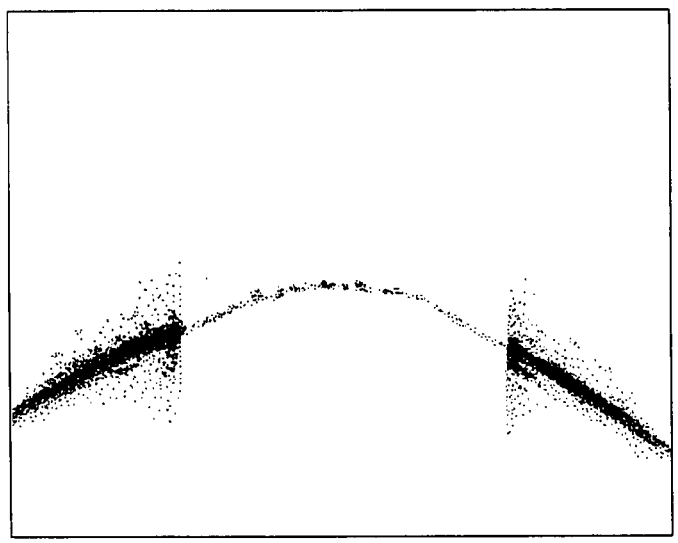
FIG. 17 is a diagram illustrating an optical cutting image measurement example of a bead cutting portion of an electric resistance welded pipe according to the first embodiment of the present invention.
Figure 18:
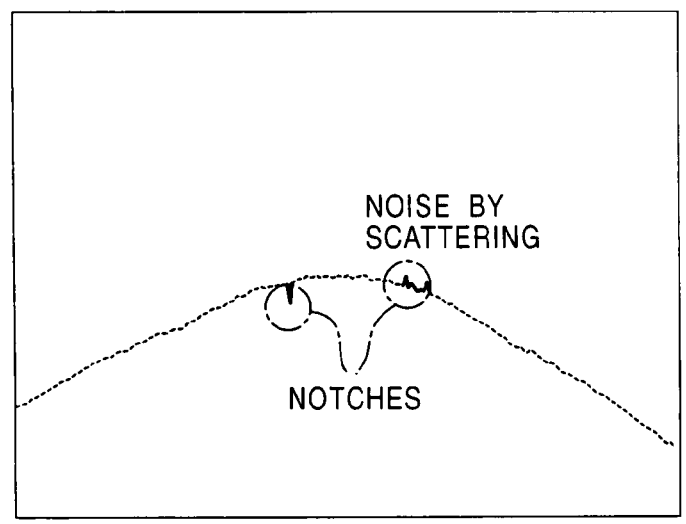
FIG. 18 is a diagram illustrating an example of an image wherein the optical cutting image at the bead cutting portion of the electric resistance welded pipe has been subjected to thinning processing.
Figure 19:
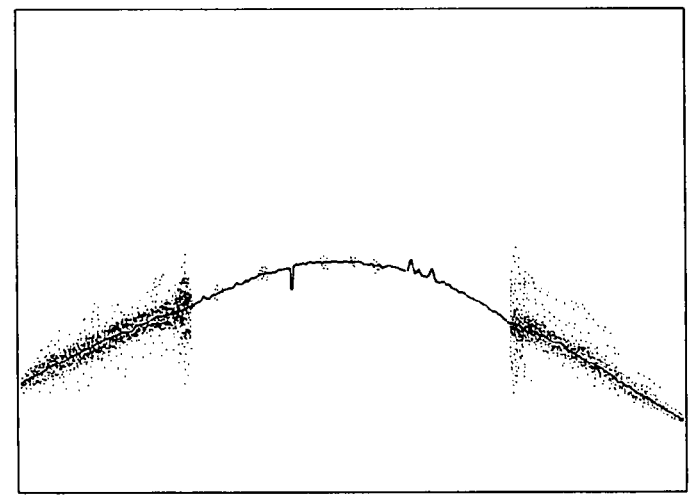
FIG. 19 is a diagram illustrating an example of an image output by an image synthesizing circuit.

FIG. 17 is an optical cutting image of a cut bead observed with the device according to the present embodiment at the time of manufacturing the electric resistance welded pipe 210, and FIG. 18 is the thinning processing results of the optical cutting image shown in FIG. 17. Here, recessed notches occur in the thinning results as indicated by the arrows in FIG. 18, due to scattered light noise at the circled portions in FIG. 18. This can be told from the output of the present embodiment being as shown in FIG. 19. According to the present invention, the original image picture and the thinning results can both be confirmed as shown in FIG. 19, so mistaking such notches due to scattered light noise for cutting steps can be avoided.

Fourth Embodiment

Figure 20:
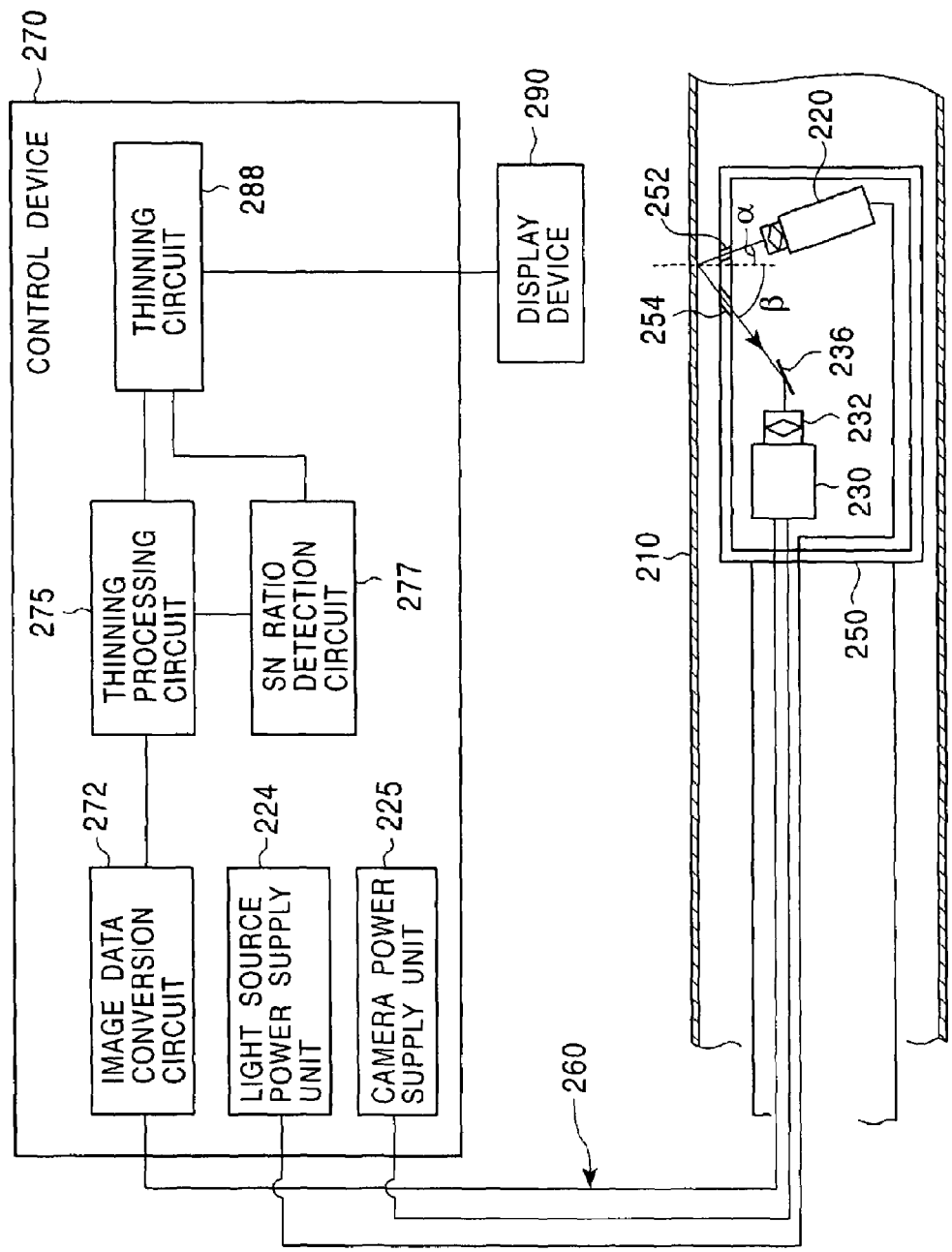
FIG. 20 is a block diagram illustrating the configuration of principal components of the bead cutting shape measurement device according to the second embodiment of the present invention.

FIG. 20 is a block diagram illustrating the configuration of the computation circuit group within the control device 270 according to another embodiment of the present invention. The unshown bead trimmer 212 and the measurement head 250 to be mounted thereupon are of the same configuration as those in the first embodiment, so description thereof, will be omitted.

Also, in FIG. 20, the same image data conversion circuit 272 and thinning processing circuit 275 as the first embodiment may be used.

The SN ratio detecting circuit 277 is for calculating the ratio between the luminance of the optical cutting line image and the luminance of a portion outside of the optical cutting line image, at the same X coordinate in the image at the time of performing thinning processing, for each X coordinate, and can be realized by combining a known maximum value searching circuit and dividing circuit.

Also, the thinning circuit 288 is fox coloring each pixel on the thing line portion in the thinning image according to the SN ratio at each X coordinate, output by the SN ratio computation circuit, and may be colored with grayscale or an arbitrary color order. A preferred example of the present embodiment is arranged with colors corresponding to the SN ratio being assigned in 16 steps, as shown in Table 1. In Table 1, intermediate colors of commonly-known color names are frequently used, so the colors are also listed in the RGB luminance format, as well.

TABLE 1

| SN ratio | | | |
| --- | --- | --- | --- |
| Lower limit | Upper limit | Color | RGB luminance |
| Lower | 1.0 | Blue | (0, 0, 255) |
| 1.0 | 1.3 | Blue-green | (0, 128, 255) |
| 1.3 | 1.7 | Green | (0, 255, 0) |

TABLE 1-continued

| SN ratio | | | |
|---|---|---|---|
| Lower limit | Upper limit | Color | RGB luminance |
| 1.7 | 2.0 | | (36, 255, 0) |
| 2.0 | 3.0 | | (73, 255, 0) |
| 3.0 | 5.0 | | (109, 255, 0) |
| 5.0 | 8.0 | Yellow-green | (146, 255, 0) |
| 8.0 | 10.0 | | (182, 255, 0) |
| 10.0 | 14.0 | | (219, 255, 0) |
| 14.0 | 16.0 | Yellow | (255, 255, 0) |
| 16.0 | 20.0 | | (255, 159, 0) |
| 20.0 | 25.0 | | (255, 127, 0) |
| 25.0 | 30.0 | | (255, 95, 0) |
| 30.0 | 40.0 | | (255, 63, 0) |
| 40.0 | Higher | Red | (255, 0, 0) |

Next, the results of implementing the present embodiment will be described.

Figure 21:
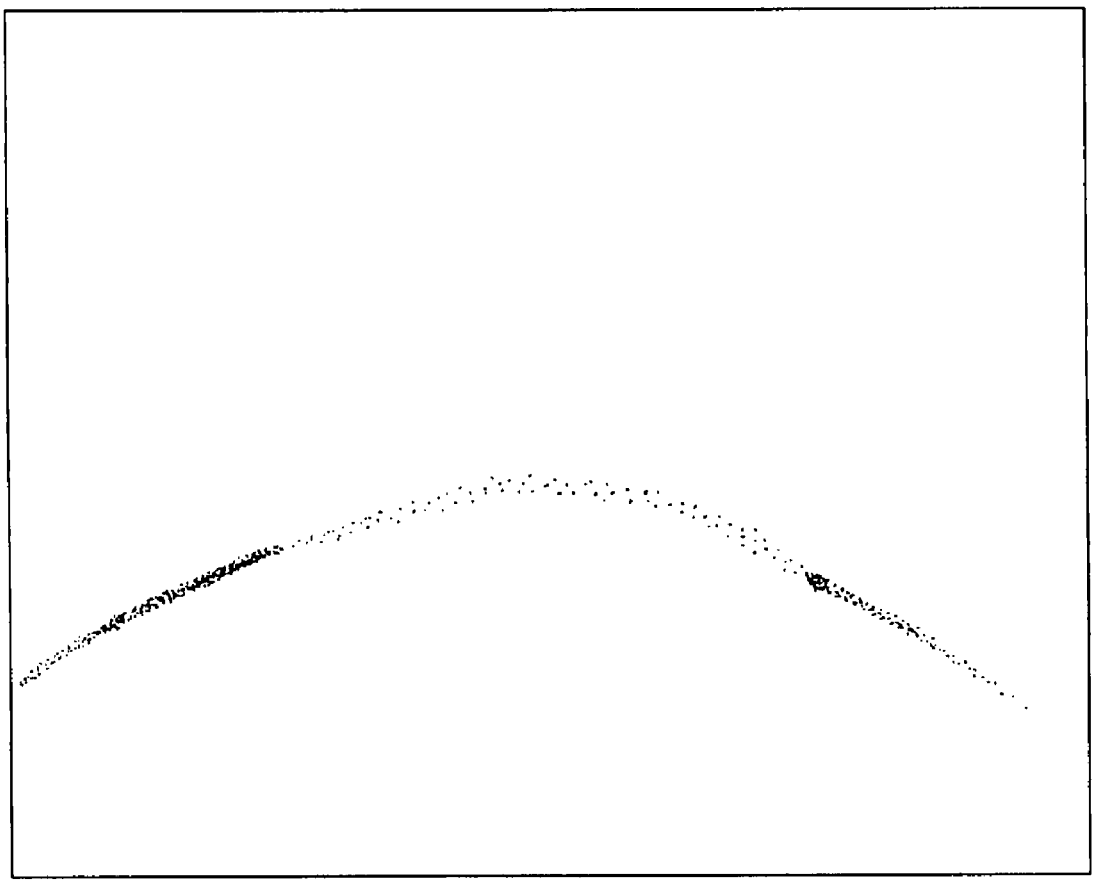
FIG. 21 is a diagram illustrating an optical cutting image measurement example of the bead cutting portion of the electric resistance welded pipe.
Figure 22:
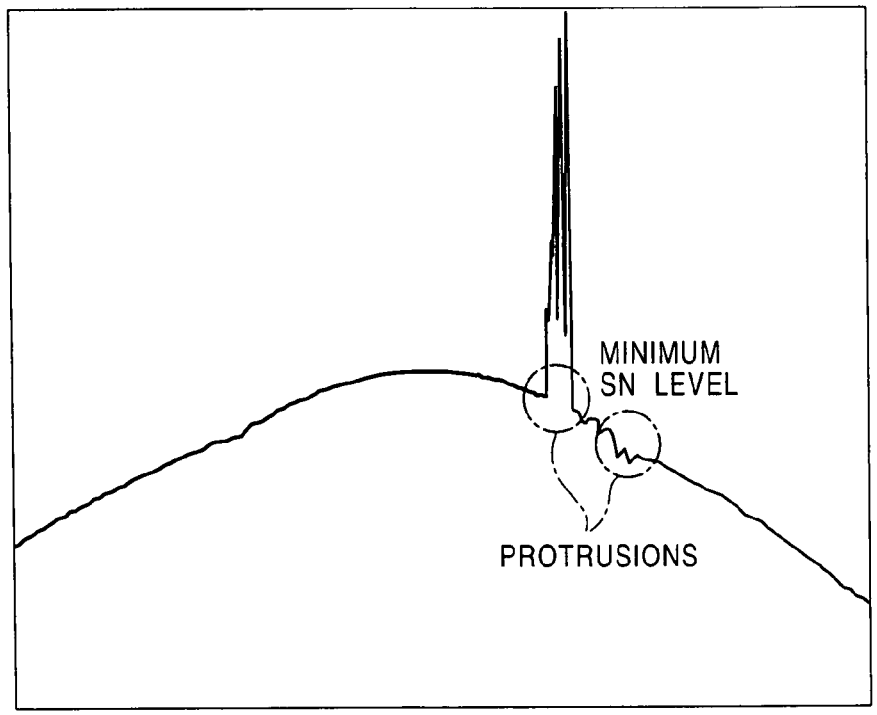
FIG. 22 is a diagram illustrating an example of an image wherein the optical cutting image at the bead cutting portion of the electric resistance welded pipe has been subjected to thinning processing.
Figure 23:
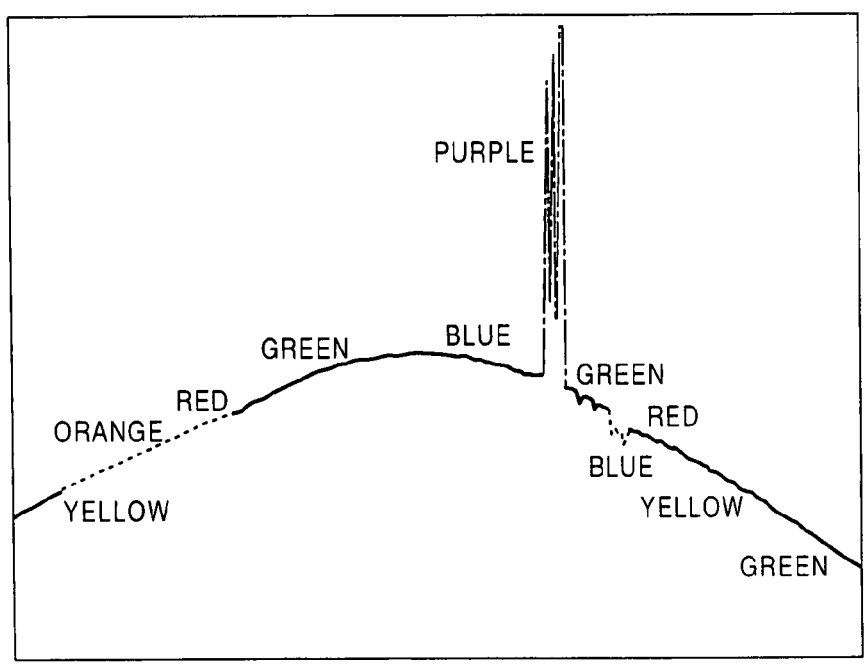
FIG. 23 is a diagram illustrating an example of an image output from the thinning circuit.

FIG. 21 is an optical cutting image of a cut bead observed with the device according to the present embodiment while manufacturing the electric resistance welded pipe 210, and FIG. 22 and FIG. 23 are the results of thinning processing of the optical cutting image. Now, the portions in FIG. 22 indicated by the arrows have marked protrusions in the thinning results, which are portions exhibiting abnormal values in the thinning processing due to the luminance of the slit light at this portion being very small, but these cannot be recognized with conventional lines alone being displayed. Conversely, FIG. 23 is a thinning image output from the thinning circuit according to the present embodiment, which shows that the SN at the portions corresponding to the circled portions in FIG. 22 is at a minimal level (blue or blue-green) by the color of the thinning image. Accordingly, erroneously recognizing the cutting shape of this portion was prevented.

Fifth Embodiment

Figure 24:
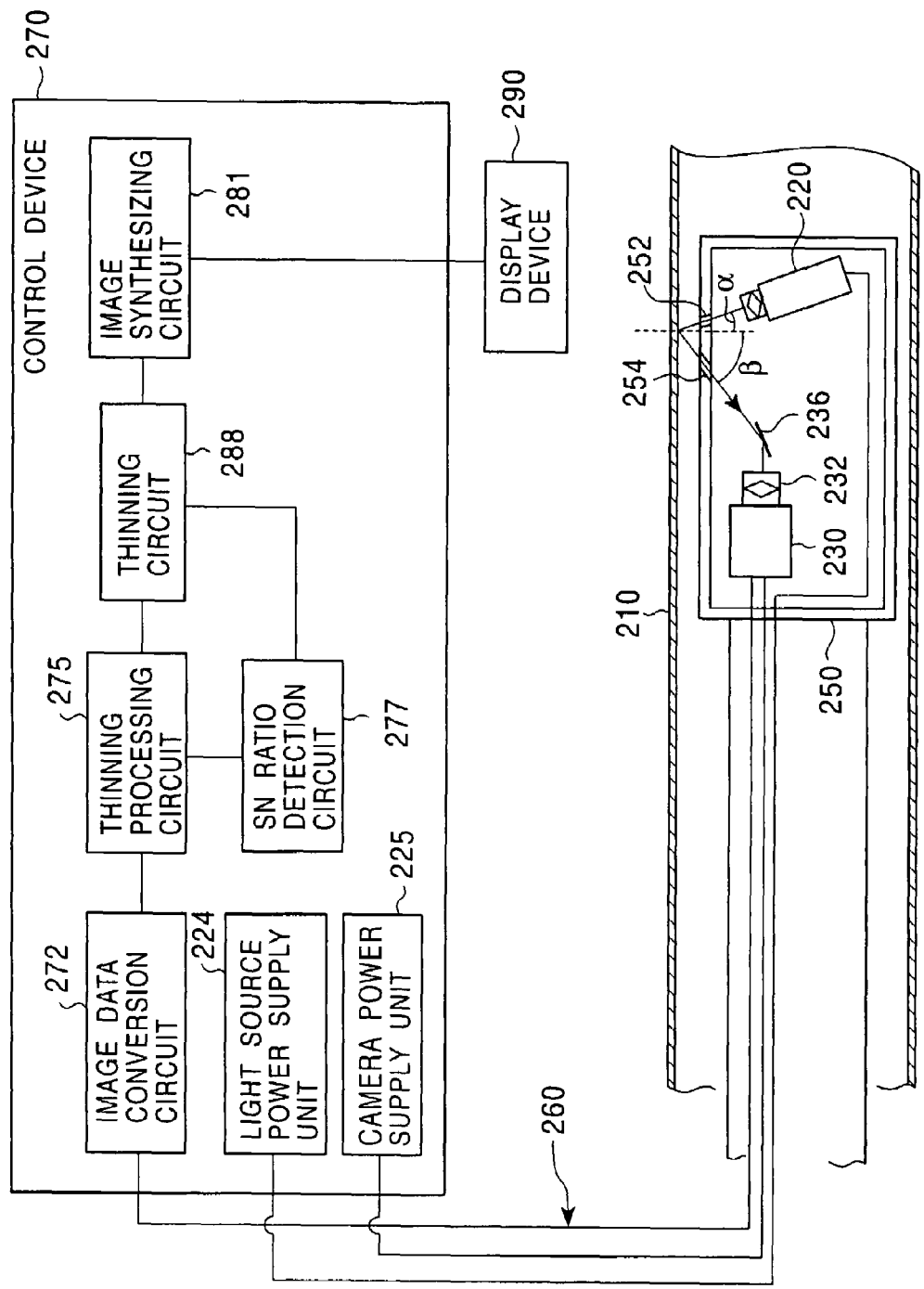
FIG. 24 is a block diagram illustrating the configuration of principal components of the bead cutting shape measurement device according to a third embodiment of the present invention.

FIG. 24 is a block diagram illustrating the configuration of the computation circuit group within the control device 270 of yet another embodiment according to the present invention. The unshown bead trimmer 212 and the measurement head 250 to be mounted thereupon are of the same configuration as those in the first embodiment, so description thereof will be omitted.

Also, in FIG. 24, the same image data conversion circuit 272 and thinning processing circuit 275 as the first embodiment may be used, and the same SN ratio detecting circuit 277 and thinning circuit 288 as the second embodiment may be used.

Next, the results of implementing the present embodiment will be described.

Figure 25:
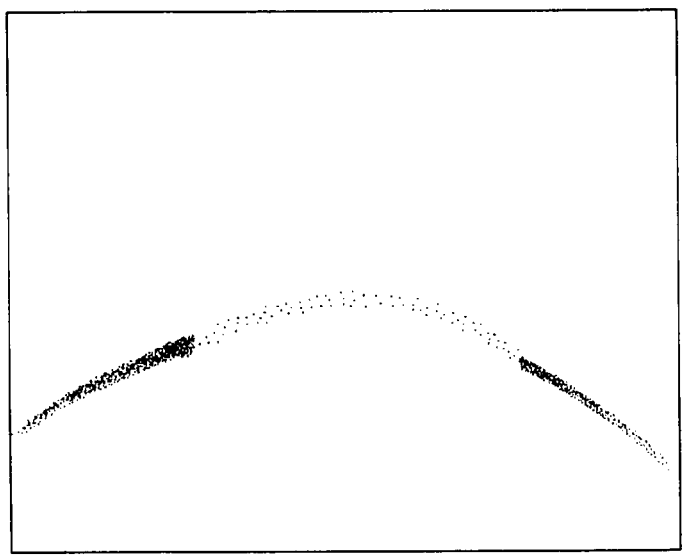
FIG. 25 is a diagram illustrating an optical cutting image measurement example of the bead cutting portion of the electric resistance welded pipe.
Figure 26:
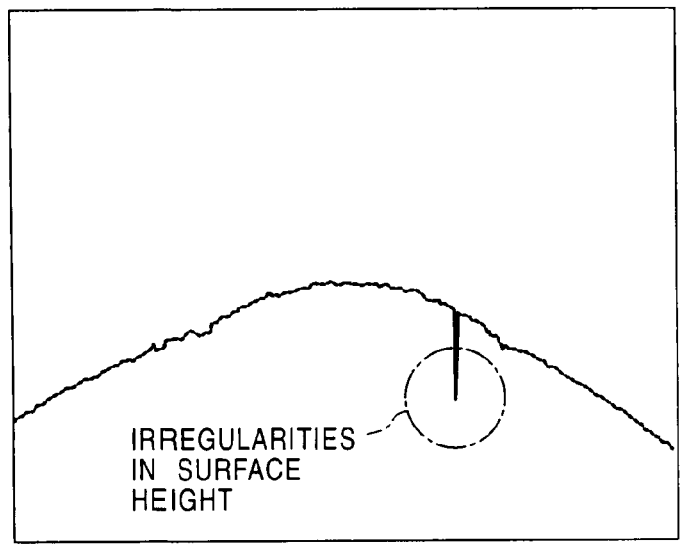
FIG. 26 is a diagram illustrating an example of an image wherein the optical cutting image at the bead cutting portion of the electric resistance welded pipe has been subjected to thinning processing.
Figure 27:
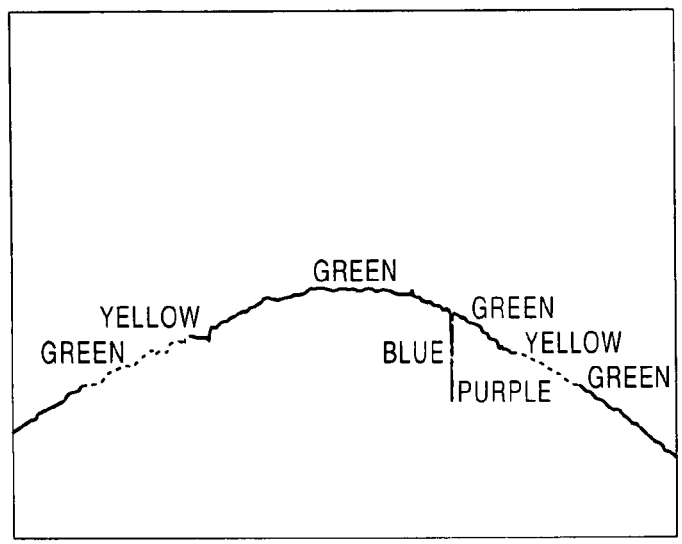
FIG. 27 is a diagram illustrating an example of an image output by the image synthesizing circuit according the same.
Figure 28:
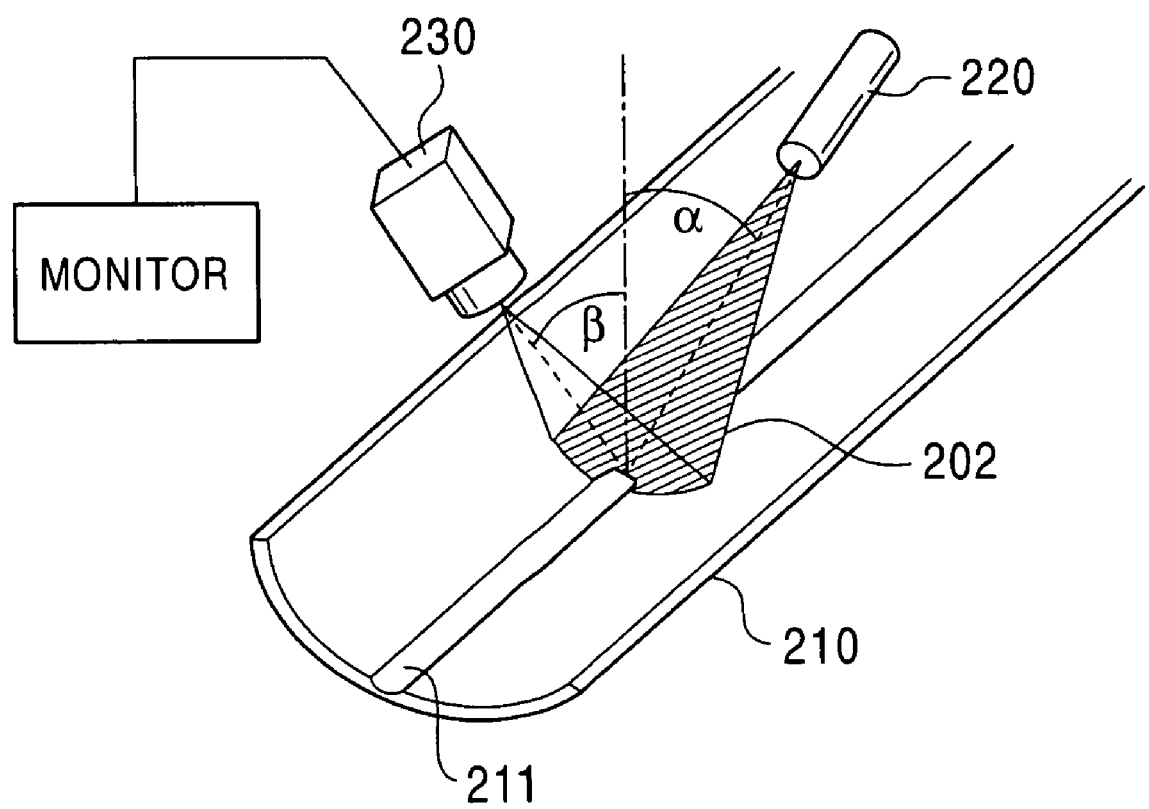
FIG. 28 is a schematic diagram illustrating the principle of optical cutting method.
Figure 29:
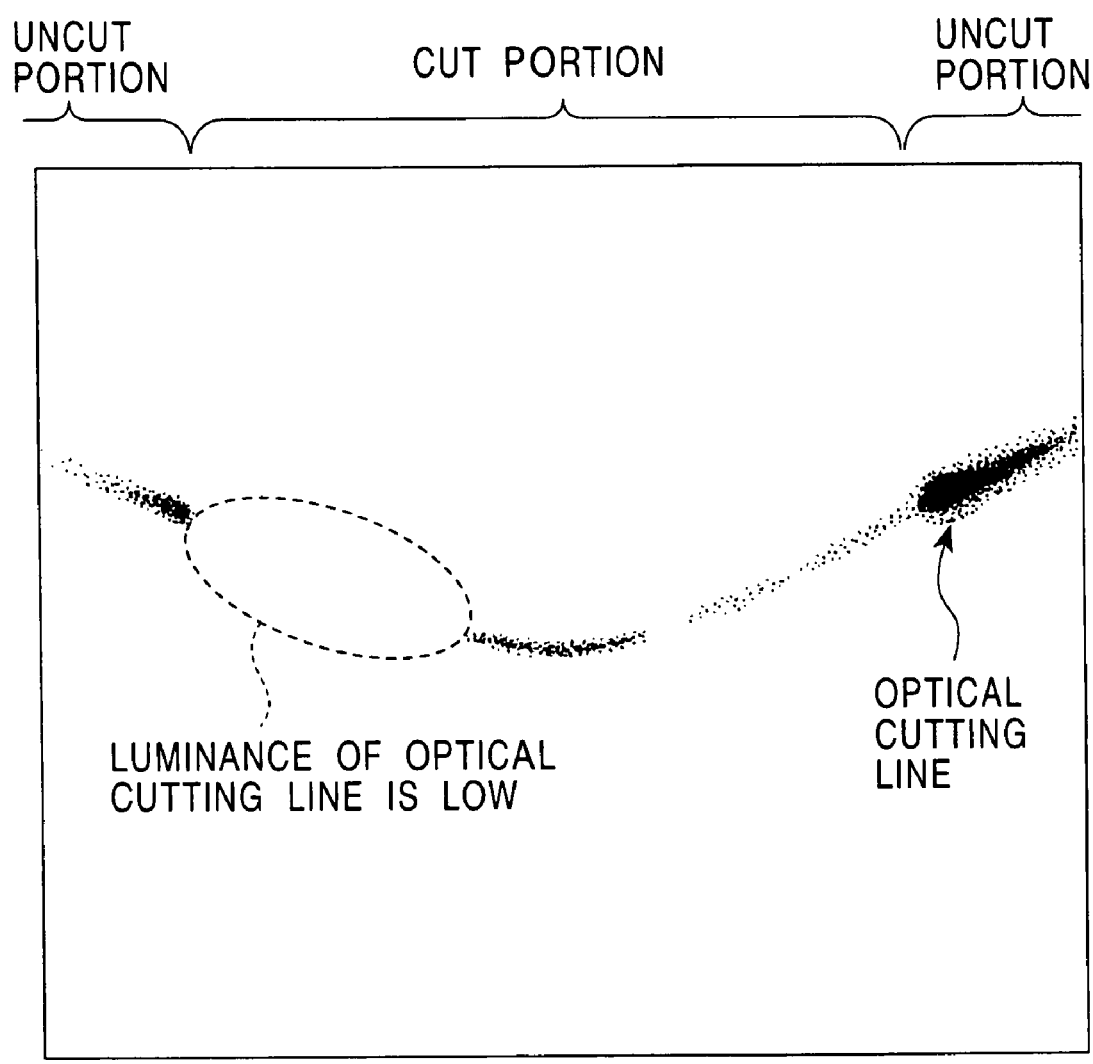
FIG. 29 is a diagram illustrating an example wherein a portion of the luminance of the optical cutting image has markedly deteriorated in the event of measuring the bead cutting portion of the electric resistance welded pipe with the optical cutting method.
Figure 30:
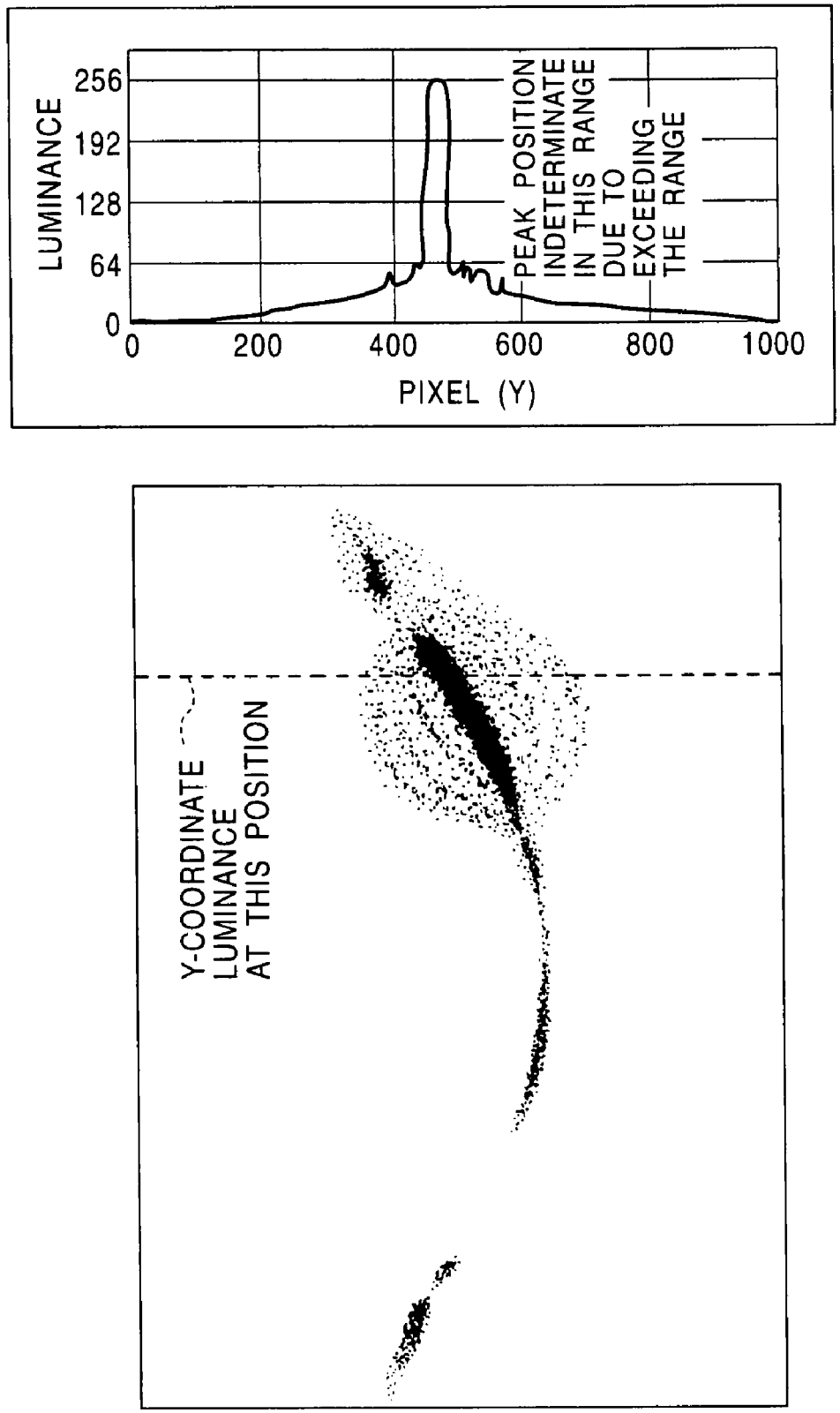
FIG. 30 is a diagram illustrating an example wherein a halation is observed at the uncut portion in the event of raising the luminance of the cut portion.

FIG. 25 is an optical cutting image of a cut bead observed with the device according to the present embodiment while manufacturing the electric resistance welded pipe 210, and FIG. 26 is the results of thinning processing of the optical cutting image shown in the optical cutting image in FIG. 25. Now, the portion in FIG. 26 indicated by the arrow has irregularities in the thinning results, which is a portion exhibiting abnormal, values in the thinning processing due to the luminance of the slit light at this portion being very small, besides effects of scattering noise, but these cannot be recognized with conventional lines alone being displayed. Conversely, FIG. 27 is a thinning image output from the thinning circuit according to the present embodiment, which shows that the SN at the portion corresponding to the circled portion in FIG. 26 is at a minimal level (blue or blue-green) by the color of the thinning image, and that has departed from the original optical cutting line image. Accordingly, mistaking this portion for a cutting step was prevented.

While the above embodiments have been described using an RGB system as a suitable example of coloring the optical cutting line, being is the most common notation method in the field of computer graphics, the present invention is by no means restricted to this, and it is needless to say that other color notation methods such as CYMK may be used to obtain the same advantages.

Also, with the above-described embodiments, it is needless to say that all or part of the thinning circuit 275, the SN ration detection circuit 277, and the remaining image processing computation group, within the control device 270, may be realized by software, programs in ROM, etc., within a digital computer.

Sixth Embodiment

Figure 31:
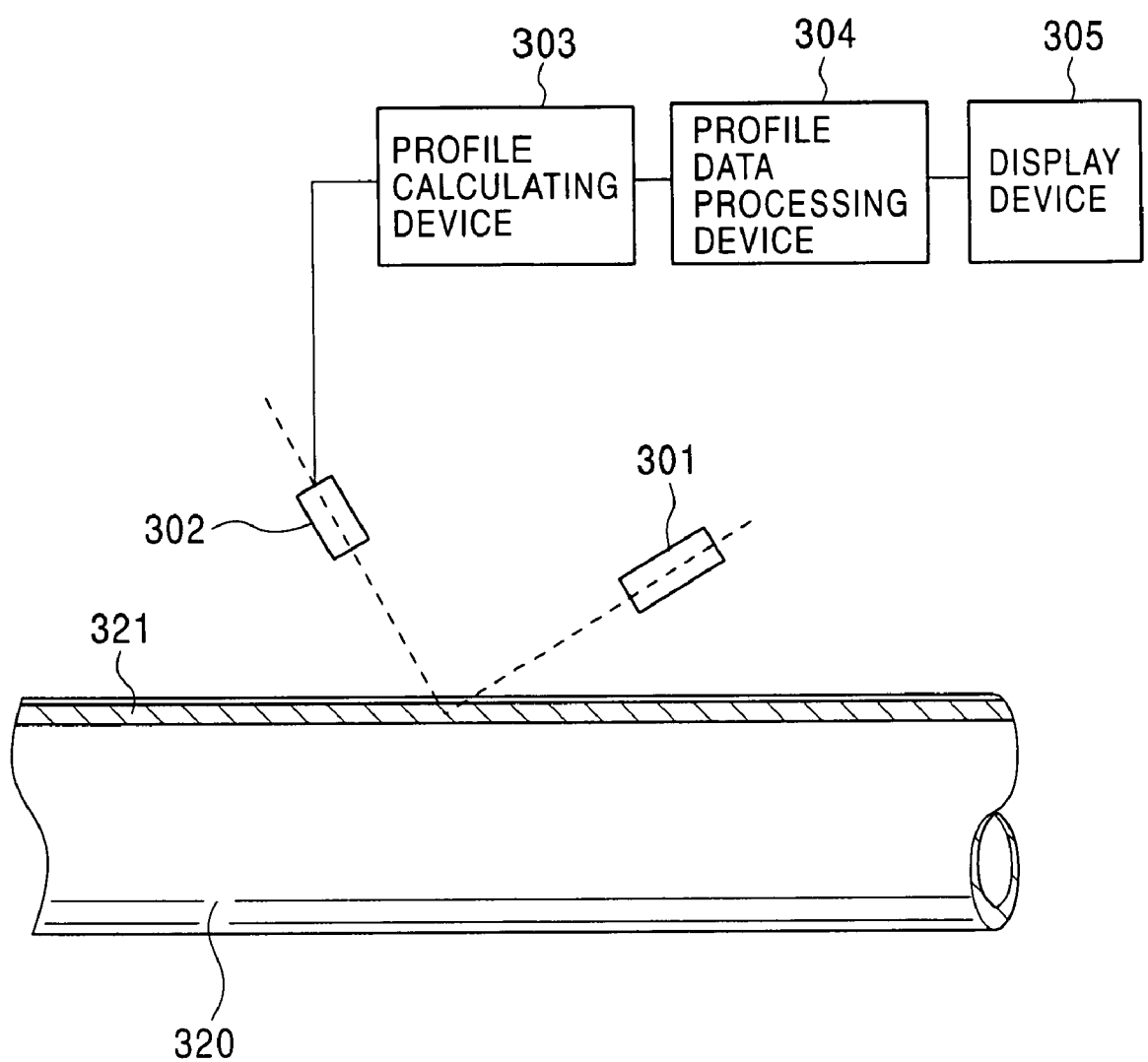
FIG. 31 is a schematic diagram illustrating the configuration of principal components of the welding bead detecting device for the electric resistance welded pipe according to the present invention.

FIG. 31 is a schematic diagram illustrating ah example of an equipment configuration of a bead detecting device for a electric resistance welded pipe according to the present invention. In FIG. 31, reference numeral 320 denotes the electric resistance welded pipe, 301 denoting light projecting means, 302 denoting image-taking means, 303 denoting profile calculating device, 304 denoting a profile data processing device, and 305 denoting a display device.

Figure 32:
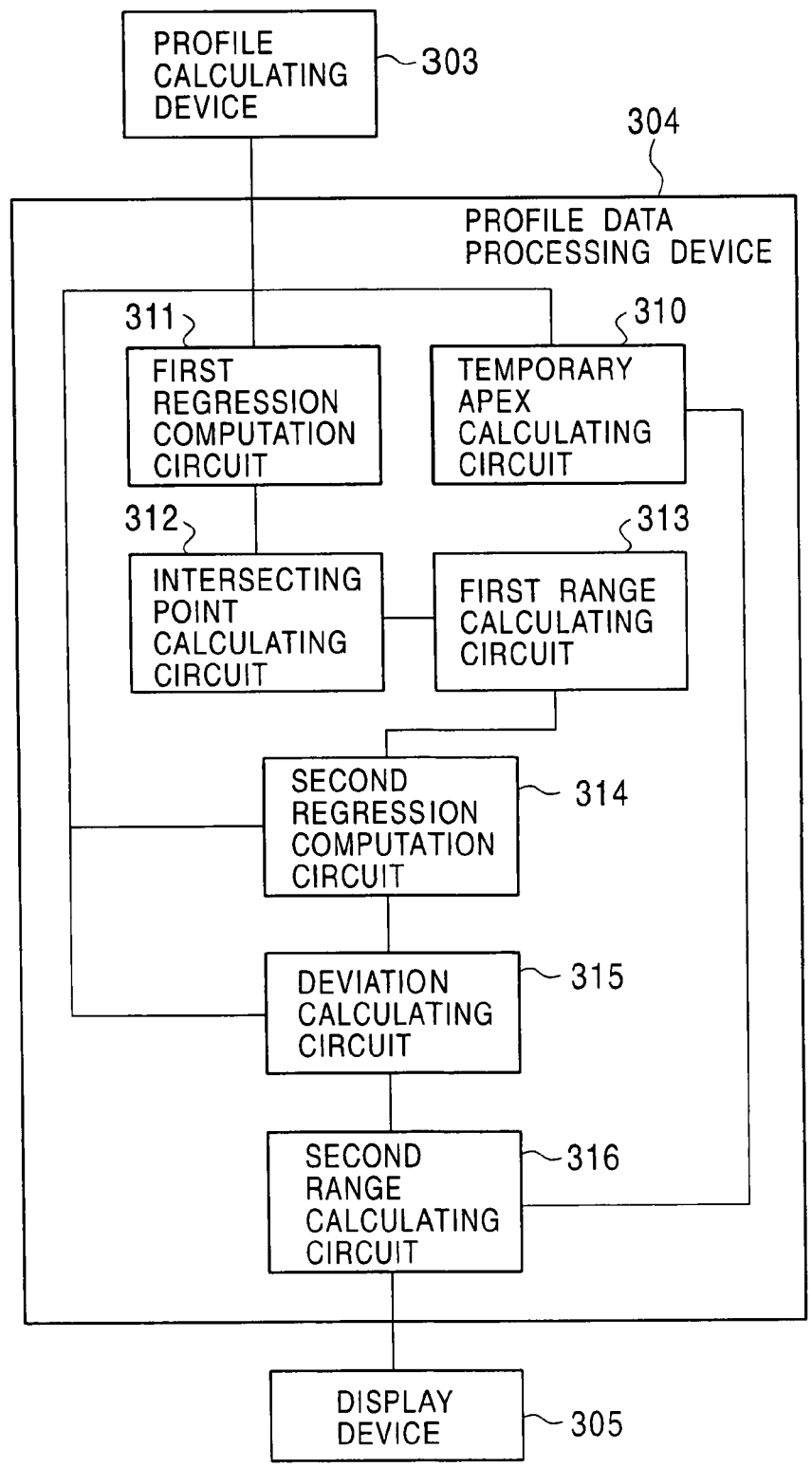
FIG. 32 is a block diagram illustrating the configuration of a computation circuit group making of a profile data processing device.

FIG. 32 is a configuration diagram illustrating the internal configuration of the profile data processing device 304. In FIG. 32, reference numeral 310 denotes a temporary apex calculating circuit, 311 denotes a first regression computation circuit, 312 denotes an intersecting point calculating circuit, 313 denotes a first range calculating circuit, 314 denotes a second regression computation circuit, 315 denotes a deviation calculating circuit, and 316 denotes a second range calculating circuit.

As for the light projecting means 301 in FIG. 31, a slit light source wherein light emitted from a light emitting device such as a laser or lamp is converged at a line with a cylindrical lens or the like, or a scanning point light source wherein a light which converges at a point on an Irradiation position is scanned in the width direction using a mirror or the like, may be used, but a small-size slit light source wherein a light emitting diode (LED) and a lens system are integrated is preferably used, the width of the short side of the slit is preferably sufficiently smaller than the height of the welding bead, preferably 50 µm or smaller. Ultimately, the shape of the portion to be measured is calculated as a single line by the later-described optical cross-sectional image processing, so this is not indispensable but should be as small as practicable.

As for the image-taking means 302, LTV cameras or a PSD (Position Sensitive Device, an optical position detecting device) may be used, but taking the ease of data conversion to the following image processing device, a CCD camera is suitably used. Also, though omitted in FIG. 31, common arrangements may be selected and used for the lens mechanism for forming an image from irradiated light, the aperture diaphragm for adjusting the amount of light received to an appropriate range, the shutter mechanism, and so forth. Now, in the event of using the method of scanning a point light as the light source, it is needless to say that there is the need to continuously irradiate light while scanning the entire range in the width direction at least once. As long as these conditions are satisfied, and the shapes of the pipe and the bead do not change while scanning, the case of using slit light and the case of plane scanning of a point light source are equivalent in the subsequent processing of the acquired image, so only the case, of using slit light will be described in the following, which will suffice as description for both cases.

The incident angle α of the light projecting means 301 serving as the light source, and the mounting angle of the image-taking means 302, i.e., the image-taking angle β, is preferably such that (α+β) is generally 90°, with the number of pixels and the field of view of the camera, i.e., the image-taking means 302 being determined based on the width of the bead portion and the necessary resolution. As suitable values for the present invention, the slit light irradiation angle from the light source is α=60°, the image-taking angle is β=30°, the range of the field of view is 25 mm wide and 20 mm high, and the number of pixels is 640 horizontally by 480 vertically. Thus, the width-wise resolution is $25/640=0.0391$ mm, and the height-wise resolution is $20/480*\cos(60°)/\sin(60°+30°) =0.0209$ mm, so the bead shape can be monitored with a resolution of 40 μm in the width direction (pipe circumferential direction) and 20 μm in the height direction (pipe axial direction).

Figure 33:
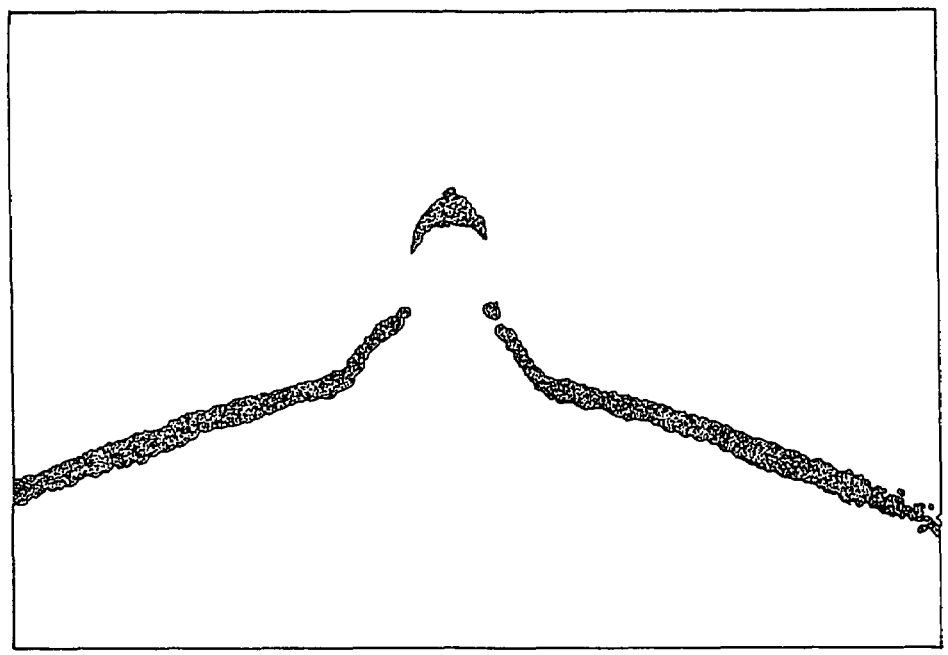
FIG. 33 is a diagram illustrating an example of an optical cutting image near the bead of a electric resistance welded pipe.

The profile calculating means 303 is for converting a slit light image projected on the pipe surface as shown in FIG. 33 into one line with appropriate image processing means, and further calculating a true profile in the wall thickness cross-sectional direction of the pipe, i.e., profile data of the electric resistance welded pipe, based on the slit light image, i.e., a pseudo-cross-sectional profile, from the placement of the light source and the image-taking means, i.e., from geometric calculations of the incident angle α and the image-taking angle β. Generally-known thinning processing may be used for the image processing means here, but the thinning processing means proposed by the Inventors here is preferably used. Also, the profile data of the pipe is simple, so the above-described geometric calculation part may be omitted without any particular problem for the bead shape detection with is an object of the present invention.

The following is a description of the components within the profile data processing device 304. With the direction crossing the bead portion (width direction) as the X axis in a pseudo-cross-sectional profile obtained by irradiation of slit light as described above, or a profile of the electric resistance welded pipe, following thinning processing in either case, the profile can be represented as a data group of heights corresponding to X coordinates.

In this case, the temporary apex calculating circuit 310 calculates the apex position Xc0 of the welding bead, so a configuration for calculating the weighted mean (position of the first order moment) of the profile data, for example, is sufficient.

This can be performed by multiplying the luminance by the vertical axis coordinate of pixels indicating the luminance and then adding each obtained value in the vertical axis direction with regard to a given width-direction (X-axial direction) coordinate, dividing this with the number of pixels involved therein so as to obtain an average, further obtaining the average values for other width-direction (X-axial direction) coordinates in the same manner and stringing the average values thereof, and further obtaining the X coordinate exhibiting the maximum value on the vertical axis from these.

Or, more simply, this can be performed by stringing pixels exhibiting the maximum luminance with regard to a given width-direction (X-axial direction) coordinate, in the width direction (X-axial direction), and obtaining the X coordinate exhibiting the maximum value on the vertical axis from these.

Figure 34:
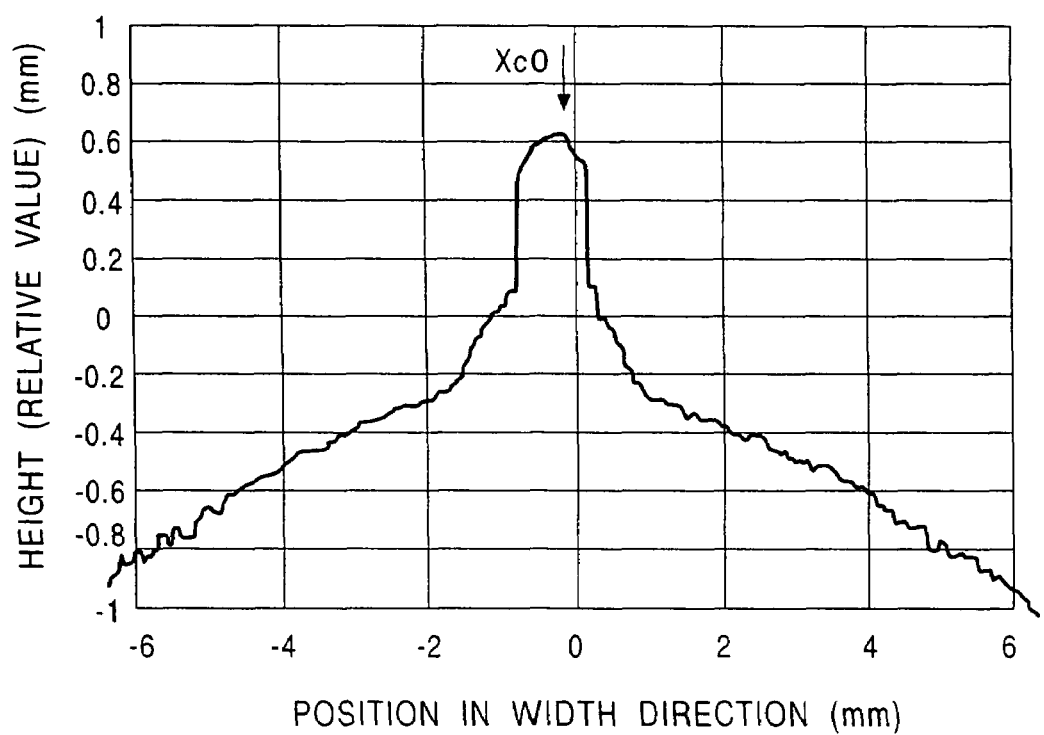
FIG. 34 is a diagram illustrating profile data wherein the optical cutting image near the bead of a electric resistance welded pipe has been subjected to thinning processing.

Also, the first regression computation circuit 311 is for regression of the profile data such as shown in FIG. 34 with a quadratic function, so a configuration for executing known regression computation, preferably least-square computation, is sufficient. A first approximation curve wherein the first regression computation circuit 311 has approximated the profile data with a quadratic function is shown in FIG. 35.

Here, FIG. 34 uses relative values for the height of the bead shown on the vertical axis. This means values wherein the geometric part are omitted, with regard to the fact that the above-described geometric calculation part may be omitted without any particular problem for the bead shape detection which is an object of the present invention since the profile data of the electric resistance welded pipe is simple, as described earlier. This understanding holds in the following description.

Figure 35:
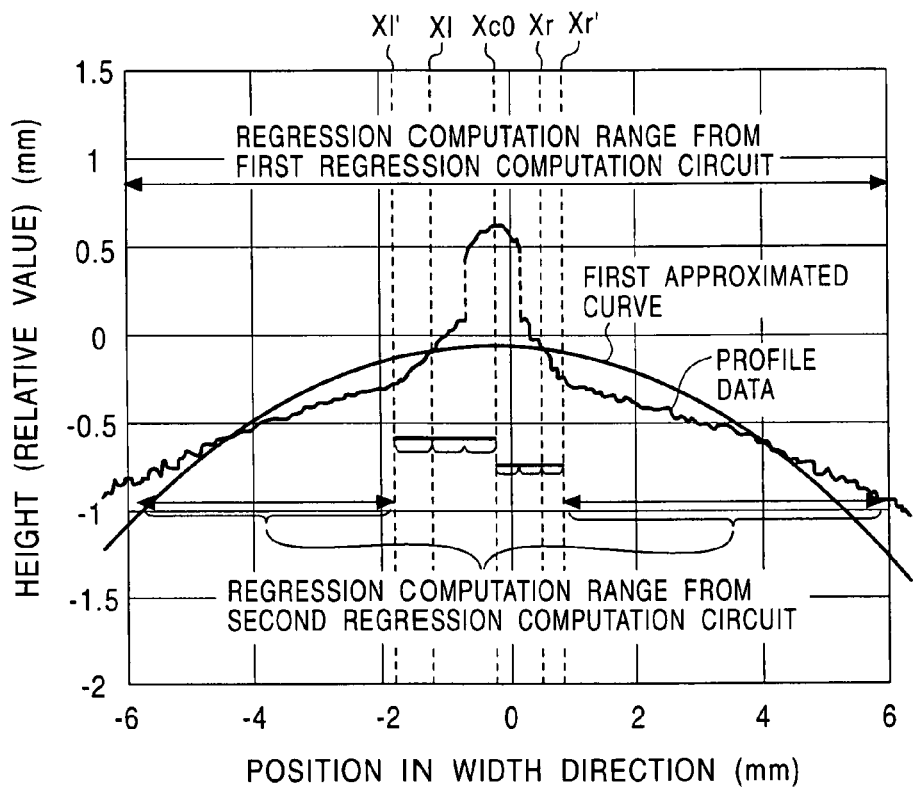
FIG. 35 is a diagram illustrating the state of a first approximation curve of a quadratic function calculated with regression computation performed on the entire profile data, which the first regression computation circuit outputs.

The intersecting point calculating circuit 312 selects, of the points where the profile data and the first approximation curve intersect, the two closest points on the left side and right side of the apex Xc0, as X1 and Xr, respectively, as shown in FIG. 35.

The first range calculating circuit 313 calculates the range of the coordinates used for the following base pipe regression, based on the X1 and Xr calculated by the intersecting point calculating circuit 312, and the apex Xc0. For example, a suitable example is to calculate R:x<X1', x>Xr' based on the 3:2 externally dividing point of the apex and intersecting points.

$$X1'=(3X1-Xc0)/2$$

$$Xr'=(3Xr-Xc0)/2$$

This external dividing ratio should be decided as appropriate, taking into consideration the smoothness of the slope of an average head, based on experience, for example.

A configuration wherein the second regression computation circuit 314 performs least-square polynomial regression computation in the range R for x that has been calculated as described above, as with the first regression computation circuit, is sufficient. However, it should be noted that the polynomial used for calculations at the second regression computation circuit 314 is a polynomial of an even degree quadratic or higher, and preferably is a quartic or higher polynomial. This yields the second approximation curve. This second approximation curve is extrapolated into the region $X1' \leq x \leq Xr'$ outside of the range R for the above-described x, as well.

The deviation calculating circuit 315 is for calculating the deviation between the second approximation curve output by the second regression computation circuit and the profile data of the electric resistance welded pipe, over the entirety of X coordinates where profile data of the electric resistance welded pipe exists ("entirety" meaning within the image field of view as an optical cutting image), and can be configured of a polynomial computation circuit and a subtraction circuit.

The second range calculating circuit 316 then calculates the range where the output of the deviation calculating circuit 315 exceeds the predetermined threshold value and outputs the portion of this range containing the apex Xc0 as a temporary existence range for the bead, and can be configured of a threshold circuit and a comparator circuit.

The operations of the present embodiment will now be described with reference to data.

The optical cutting image obtained by the light projecting means 301 irradiating slit light onto the surface of the pipe and taking an image thereof with the image-taking device 302 is as shown in FIG. 33, and the profile data of the electric resistance welded pipe including the bead portion calculated by the profile calculating means 303 from this optical cutting image that has been subjected to thinning processing is as shown in FIG. 34. The temporary apex calculating circuit 310 calculates the apex by a technique such as maximum value computation, weighted mean (center of gravity computation), etc., with regard to this profile data. The Xc0 marked in FIG. 34 is the apex position of the bead thus calculated.

The first regression computation circuit 311 performs least-square regression computation by the quadratic expression of the entire profile, consequently outputting a quadratic function as shown in FIG. 35. The X1, Xr, X1', and Xr' marked in FIG. 35 in the same way are positions of X coordinates calculated by the intersecting point calculating circuit 312 and range calculating circuit 313, as described above.

The second regression computation circuit 314 calculates the second approximation curve for the profile data regarding the range of the X coordinates set by the range calculating circuit 313. In this embodiment, the quartic degree was selected as a suitable example for regression. The second approximation curve obtained as a result is as shown in FIG. 36 by the heavy line.

Figure 36:
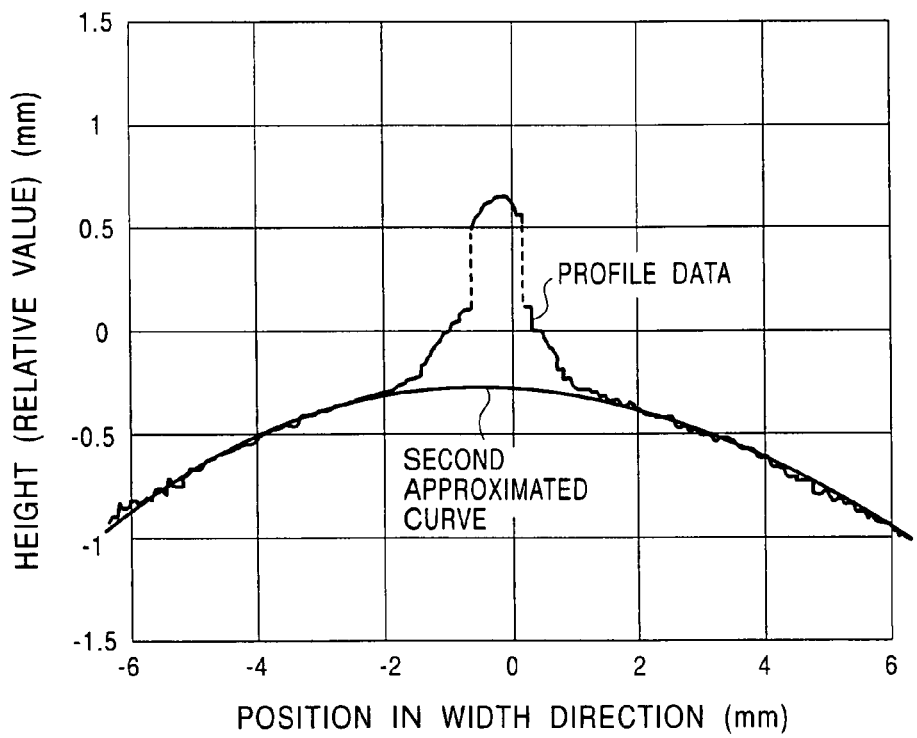
FIG. 36 is a diagram illustrating the state of a second approximation curve of a quartic function obtained as the result of least-square regression computation performed on the range of the first range calculating circuit, output by a second regression computation circuit.
Figure 37:
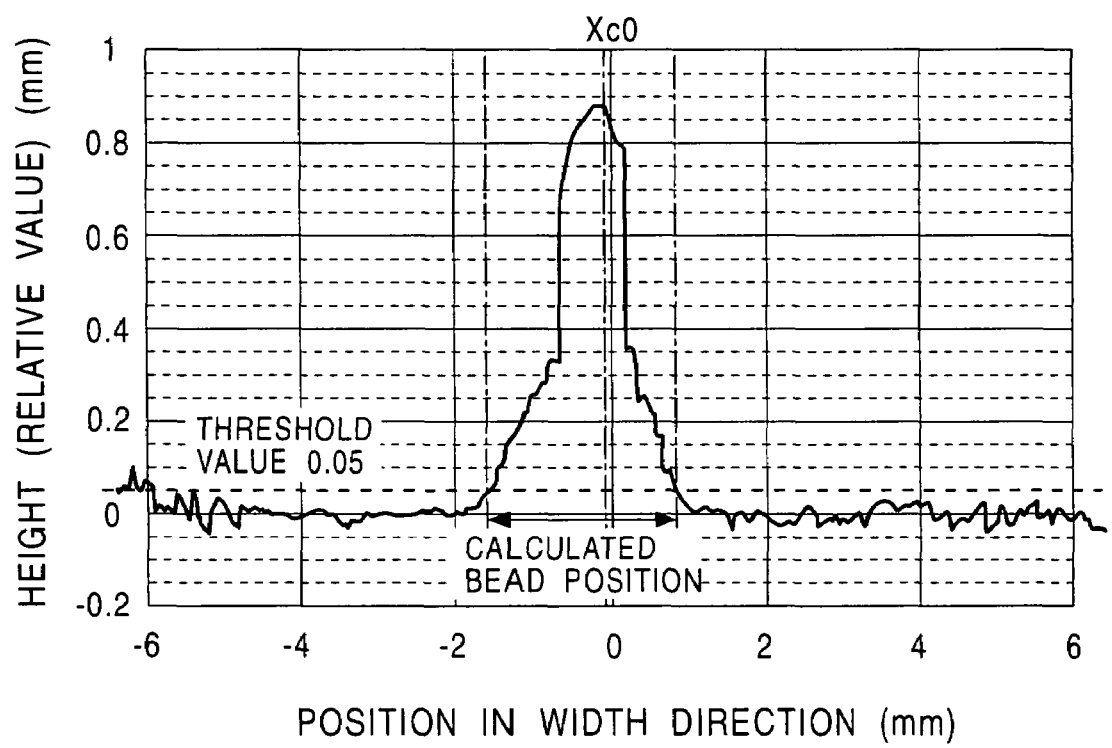
FIG. 37 is a plotted diagram of deviation $e(x)$ between the guartic function and the profile data, calculated by a deviation calculation circuit.

The deviation calculating circuit 315 calculates the deviation e(x) between the heavy line in FIG. 36 and the profile data of the electric resistance welded pipe, and the results thereof are obtained as shown in FIG. 37.

The second range calculating circuit 316 searches for ranges wherein this deviation e(x) exceeds a threshold value set beforehand, and of these, calculates a range of X coordinates including the apex coordinates Xc0. A threshold value of 0.05 was used as a suitable example in the present embodiment. The results thereof indicate the range marked by the arrows in FIG. 37.

In order to confirm the validity of the present invention, a comparison was made between a photograph of the bead taken with an arrangement with the same light projecting means and image-taking means as the present embodiment wherein light emission from the light source was stopped and the exposure time extended, and the bead shape image output according to the present invention. The results are as shown in FIG. 38, wherein it can be understood that the photograph matches the calculated bead shape (shown at the bottom of FIG. 38) very well.

With the above-described embodiment, it is needless to say that all or part of the internal configuration circuits of the profile calculating device 303 and profile data processing device 304 may be realized by software or programs in ROM, within a digital computer. Of course, the object of application of the present invention is not restricted to steel pipe, and may be other metal pipes, such as copper, aluminum, and so forth.

Figure 40:
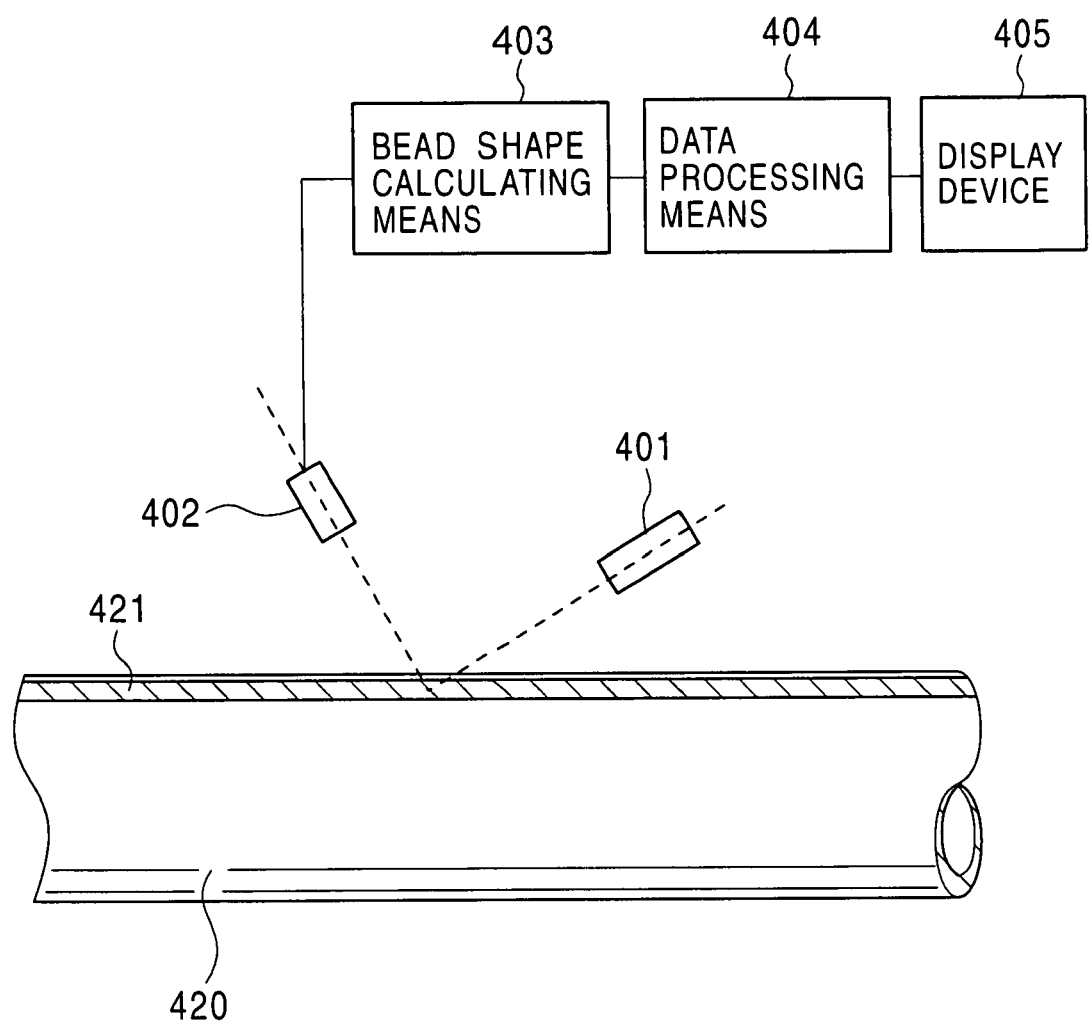
FIG. 40 is a schematic diagram illustrating the configuration of principal components of a bead shape detecting device of the electric resistance welded pipe according to the present invention.

FIG. 40 is a schematic diagram illustrating a configuration example of a electric resistance welded pipe bead shape detecting device according to the present invention. In FIG. 40, reference numeral 420 denotes the electric resistance welded pipe, with 401 denoting light projecting means, 402 denoting image-taking means, 403 denoting bead shape calculating means, 404 denoting a data processing device, and 405 denoting a display device.

As for the light projecting means 401, a slit light source wherein light emitted from a light emitting device such as a laser or lamp is converged on a plane with a cylindrical Tens or the like, or a scanning point light source wherein a light which converges at a point on an irradiation position is scanned in the width direction using a mirror or the like, may be used, but a small-size slit light source wherein a semiconductor device (LED) and a lens system are integrated is preferably used, the width of the short side of the slit is preferably sufficiently smaller than the height of the welding bead, preferably 50 μm or smaller. Ultimately, the shape of the portion to be measured is calculated as a single line by the later-described, optical image processing, so this is not indispensable.

As for the image-taking means 402, ITV cameras or a PSD (Position Sensitive Device, an optical position detecting device) may be used, but taking the ease of data conversion to the following image processing device, a CCD camera is suitably used. Also, though omitted in the drawings, common arrangements may be selected and used for the lens mechanism for forming an image from irradiated light, the aperture diaphragm for adjusting the amount of light received to an appropriate range, the shutter mechanism, and so forth. Now, in the event of using the method of scanning a point light as the light source, it is needless to say that there is the need to continuously expose while irradiating the entire range in the width direction at least once. As long as these conditions are satisfied, and the shapes of the pipe and the bead do not change while scanning, the case of using slit light and the case of plane scanning of a point light source are equivalent in the subsequent processing of the acquired image, so only the case of using slit light will be described in the following, which will suffice as description for both cases.

The incident angle $\alpha$ of the light projecting means 401, and the mounting angle $\beta$ of the image-taking means 402, is preferably such that $(\alpha+\beta)$ is generally 90°, with the number of pixels and the field of view of the camera, being determined based on the width of the bead portion and the necessary resolution. As suitable values with the present invention, the slit Tight irradiation angle from the light source is $\alpha=60°$, the image-taking angle is $\beta=30°$, the range of the field of view is 25 mm wide and 20 mm high, and the number of pixels is 640 horizontally by 480 vertically. Thus, the width-wise resolution is $25/640=0.0391$ mm, and the height-wise resolution is $20/480*\cos(60°)/\sin(60°+30°)=0.0209$ mm, so the bead shape can be monitored with a resolution of 40 μm in the width direction (pipe circumferential direction) and 20 μm in the height direction (pipe axial direction).

The bead shape calculating means 403 are for taking the slit light image as one line with suitable image processing means, and calculating a bead shape (profile) by geometric calculations determined by the positioning of the light projecting means 401 and the image-taking means 402. Now, a profile refers to the outline shape on the inner face or output face of the electric resistance welded pipe, and the shape data of the pipe surface including the bead portion is from a section thereof. Generally-known thinning processing may be used for the image processing means here, but the thinning processing means proposed by the Inventors here is preferably used.

Figure 41:
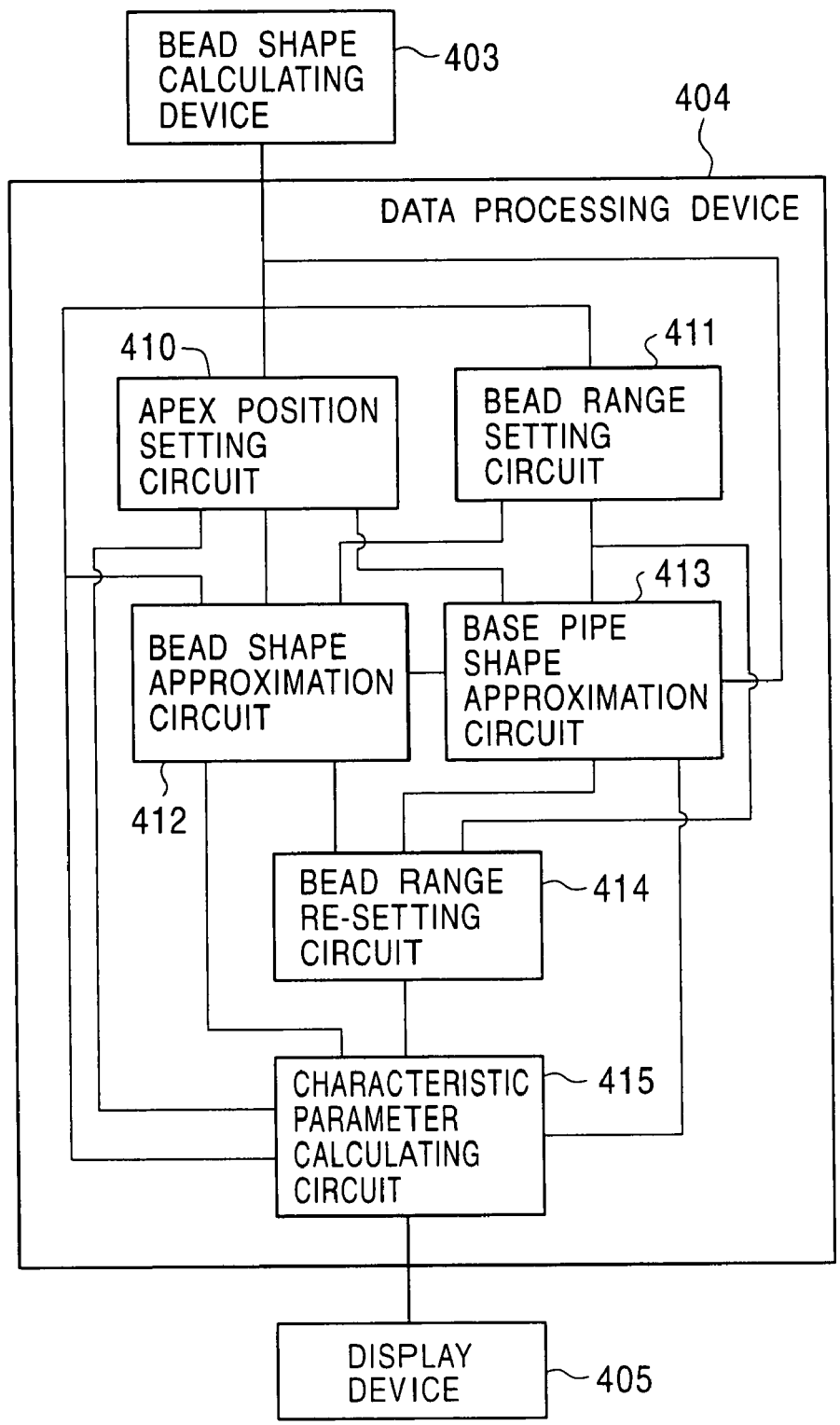
FIG. 41 is a block diagram illustrating the configuration of a circuit group making up the bead shape calculating means.

The internal configuration of the data processing device 404 is shown in FIG. 41, comprising a apex position setting circuit 410, a bead range setting circuit 411, a bead shape approximation circuit 412, a base pipe shape approximation circuit 413, a bead range re-setting circuit 414, and a features calculating circuit 415.

The following is a description of the components of the data processing device 404.

The apex position setting circuit 410 sets the apex position of the bead from shape data of the pipe surface including the bead portion calculated as described above. An arrangement may be made wherein an operator judges and manually inputs the apex position of the bead from the shape data of the pipe surface containing the bead portion, but a more preferable arrangement is to obtain a position indicating the maximum height value in the shape data of the pipe surface containing the bead portion. Further, this can by calculated with addition processing by weighted mean computation or the like.

The bead range setting circuit 411 sets a bead range from shape data of the pipe surface including the bead portion, calculated as described above. An arrangement may be made wherein an operator judges the bead range from the shape data of the pipe surface containing the bead portion and manually inputs the boundaries at the left and right edges of the bead portion, and sets the region equivalent to the portion between left and right boundaries as the bead range, or an arrangement wherein the slope position is detected based on difference in adjacent shape data, such as disclosed in Patent Document 3, but a more preferable arrangement is to divide a preset bead width into two halves centered on the bead apex position output from the apex position setting circuit 410, or to set following the method disclosed in the electric resistance welded pipe bead shape detecting method which the Inventors propose here.

The bead shape approximation circuit 412 divides the bead range which is set as described above into the left side of the apex $x_1 < x < x_c$ and the right side of the apex $x_c < x < x_r$, approximates the shape of the head portion in each range with a predetermined function, and determines the function with regard to the shape of the left and right portions of the head portion. A preferred method thereof will be described in the section on the operations of the present embodiment, later.

The base pipe shape approximation circuit 413 is for approximating the shape data of the head range thus set with pipe surface shape data, wherein the shape data of the bead range is removed from the shape data of the pipe surface including the bead portion, and a function of a predetermined form such as a power function or the like, and specific parameters such as the coefficients of the functions are calculated. A preferred method thereof will be described in the section on the operations of the present embodiment, later.

The bead range re-setting circuit 414 is for re-recognizing the positions where the values of the approximation functions of the thus-determined left and right bead shape and the approximation function of the base pipe shape intersect as the boundary positions between the bead portion and the base pipe position, and can be configured from a function value computation circuit and a comparator.

The features calculating circuit 415 is for calculating the bead width, height, left and right slope angles, and unevenness between the boundary between the left and right bead portions and the base pipe portion, based on the thus-calculated bead range, apex position, approximation functions for the left and right bead shapes, approximation function for the base pipe shape, and shape data of the pipe surface including the bead portion.

The display device 405 displays the features of the bead shape detected by the features calculating circuit 415. While each of the values may be periodically updated and displayed as numbers or bar charts, a preferable arrangement is to display the shape data of the pipe surface including the bead portion and the features of each as a time chart.

Also, an arrangement may be made wherein the output for the features calculating circuit 415 is output to an unshown recorder or business computer or the like by an unshown communication port or external output circuit, rat appropriate time intervals, so as to accumulate data.

Next, the operations of the present invention will be described.

Figure 42:
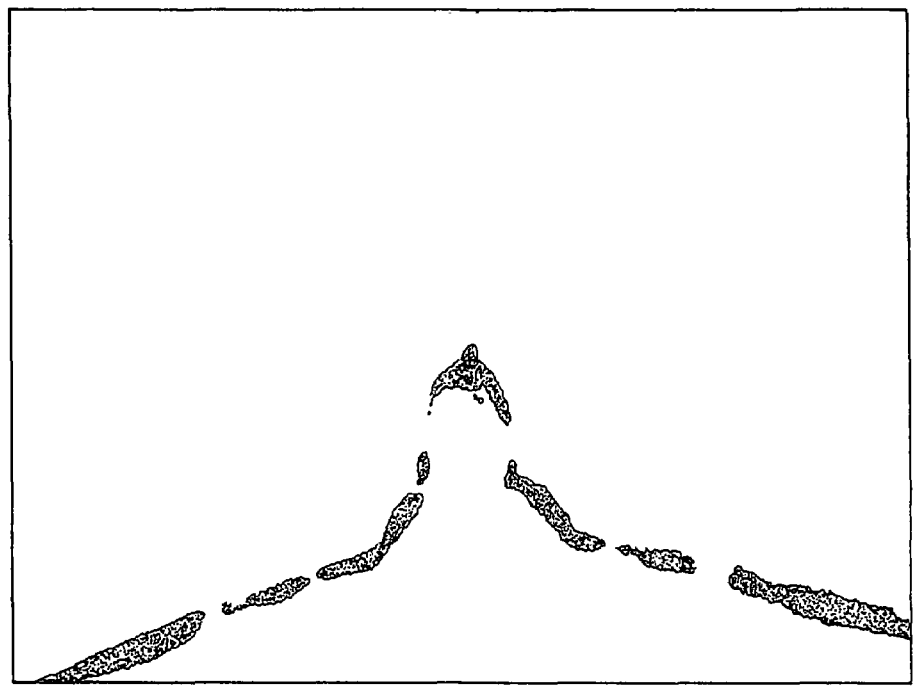
FIG. 42 is a diagram illustrating an example of an optical cutting image on the surface of the electric resistance welded pipe including the bead portion.
Figure 43:
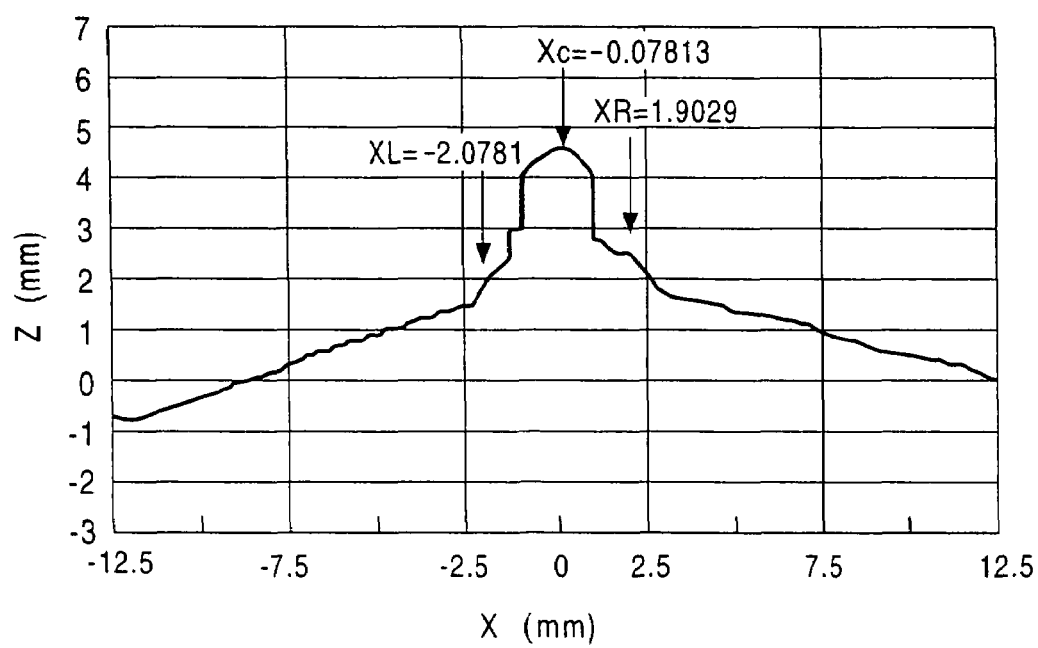
FIG. 43 is a diagram illustrating shape data for the surface of the electric resistance welded pipe including the bead portion, with an optical cutting image subjected to thinning processing, according to the present invention.

FIG. 42 is an optical cutting image of the slit light source 401 serving as the light projecting means covering the range of the pipe surface including the bead portion, taken with the image-taking means 402, and the results of subjecting this to thinning processing with the bead shape calculating means 403 and converting into coordinates on the display device 405 is the shape data of the pipe surface including the bead portion such as shown in FIG. 43. The arrows marked in FIG. 43 indicate the bead range calculated by the apex position setting circuit 410 and the bead range setting circuit 411, and the x coordinate at the apex position. In the present embodiment, calculation of the apex position uses a value calculated as being $x_c = -0.0781$ from the weighted mean (Mathematical Expression 1)

$$x_c = \frac{\sum_{i=i_L}^{i_R} x_i \cdot z_i}{\sum_{i=i_L}^{i_R} z_i}$$

of the shape data of the pipe surface including the head portion $(x_i, z_i)$ $(i = i_L, \ldots, i_R)$, having a predetermined bead range as the domain thereof, as to the data row of the shape data of the pipe surface including the bead portion $(x_i, z_i)$ $(i = 0, \ldots, N-1)$. The bead range was set at $x_L = x_c - W_0/2 = -2.0781$ mm $x_R = x_c + W_0/2 = 1.9219$ mm using the general bead width $W_0 = 4$ mm that had been set beforehand. Here, $i_L$ and $i_R$ are shape data addresses for the left edge and right edge of the bead range. Also, the $i_c$ used below is an address for a shape data row equivalent to the $x_c$ obtained as described above.

The bead shape approximation circuit 412 calculates a function $f_L(x)$ which minimizes the following $E_L$ and $E_R$ with regard to the left half of the bead thus set (from the left side boundary $x = x_{iL}$ to the apex $x = x_{ic}$), and the right half thereof (from the apex $x = x_{ic}$ to the right side boundary $x = x_{iR}$).

(Mathematical Expression 2)

$$E_L = \sum_{i=i_L}^{i_c} (z_i - f_L(x))^2 \rightarrow \min, \; E_R = \sum_{i=i_c}^{i_R} (z_i - f_R(x))^2 \rightarrow \min$$

Now, the processing which will be described below is the same for the left half and the right half, so from here on, the symbols and so forth will be described for only the left half side of the bead portion, representatively. Also, circular arcs, polynomials, etc., may be used for approximation functions for the shape data at the left side and the right side of the bead portion, but with the present embodiment, an aggregate expression of line segments is used as a preferred example, as follows.

(Mathematical Expression 3)

$$f_L(x) = \begin{cases} a_{L1}x + b_{L1} & x_{i_L} \le x < x_{i_{P1}} \\ \vdots & \vdots \\ a_{Lj}x + b_{Lj} & x_{i_{P_{j-1}}} \le x < x_{i_{P_j}} \\ \vdots & \vdots \\ a_{L1}x + b_{L1} & x_{i_{P_{n-1}}} \le x < x_{i_c} \end{cases}$$

wherein n is the number of line segments, and $i_{P1}, \ldots, i_{Pn}$ are addresses of concatenation points which satisfy $i_L < i_{P1}$ $<\ldots <i_{Pj}<\ldots <i_{Pn\_1}<i_c$. The number of concatenation points, i.e., the number of line segments may be set arbitrarily, but taking computation time into consideration, n=2 was set for the present embodiment. Accordingly, there is one concatenation point with the present embodiment, so in the following description, p1 may be written with the p and indices omitted.

Now, in this case, the least value of $E_L$ is to be solved regarding the five parameters of $a_{L1}$, $b_{L1}$, $a_{L2}$, $b_{L2}$, and $x_{p1}$, in order to calculate $f_L(x)$, which can be calculated by dividing into the following steps.

(1) First, $x_p$ is fixed, and $a_{L1}$, $b_{L1}$, $a_{L2}$, and $b_{L2}$ are calculated for this case. In this case, this is linear least-square regression as to the data set (x, z), and can be algebraically obtained as follows.

(Mathematical Expression 4)

$$a_{L1} = \frac{\sum_{i=i_L}^{i_p} 1 \sum_{i=i_L}^{i_p} x_i z_i - \sum_{i=i_L}^{i_p} x_i \sum_{i=i_L}^{i_p} z_i}{\sum_{i=i_L}^{i_p} x_i^2 \sum_{i=i_L}^{i_p} 1 - \left(\sum_{i=i_L}^{i_p} x_i\right)^2},$$

$$b_{L1} = \frac{-\sum_{i=i_L}^{i_p} x_i \sum_{i=i_L}^{i_p} x_i z_i + \sum_{i=i_L}^{i_p} x_i^2 \sum_{i=i_L}^{i_p} z_i}{\sum_{i=i_L}^{i_p} x_i^2 \sum_{i=i_L}^{i_p} 1 - \left(\sum_{i=i_L}^{i_p} x_i\right)^2}$$

$$a_{L2} = \frac{\sum_{i=i_p}^{i_c} 1 \sum_{i=i_p}^{i_c} x_i z_i - \sum_{i=i_p}^{i_c} x_i \sum_{i=i_p}^{i_c} z_1}{\sum_{i=i_p}^{i-c} x_i^2 \sum_{i=i_p}^{i_c} 1 - \left(\sum_{i=i_p}^{i_c} x_i\right)^2},$$

$$b_{L2} = \frac{-\sum_{i=i_p}^{i_c} x_i \sum_{i=i_p}^{i_c} x_i z_i + \sum_{i=i_p}^{i_c} x_i^2 \sum_{i=i_p}^{i_c} z_i}{\sum_{i=i_p}^{i_c} x_i^2 \sum_{i=i_p}^{i_c} 1 - \left(\sum_{i=i_p}^{i_c} x_i\right)^2}$$

(2) The approximation error $E(x_p)$ in the case of $x=x_p$ is calculated using the $a_{L1}$, $b_{L1}$, $a_{L2}$, and $b_{L2}$ calculated above.

(Mathematical Expression 5)

$$E(x_p) = \sum_{i=i_L}^{i_R} (z_i - f_L(x))^2$$

$$= \sum_{i=i_L}^{i_p} (z_i - a_{L1} x_i - b_{L1})^2 + \sum_{i=i_p}^{i_R} (z_i - a_{L2} x_i - b_{L2})^2$$

(3) The computations in (1) and (2) above are performed for all (Mathematical Expression 6)

$$i_p \in [i_L, i_R]$$

and the $x_{ip}$ where $E(x_{ip})$ is the smallest is the concatenation point to be obtained.

(4) the $f_L(x)$ corresponding to the $x_{ip}$ calculated above is taken as the approximation function of the shape of the pipe surface including the bead portion.

(5) The same computation of (1) through (4) above is performed with $i_c$ instead of $i_L$ and $i_R$ instead of $i_c$ in the same way, for the approximation function of the bead shape to the right side of the apex point.

Figure 44:
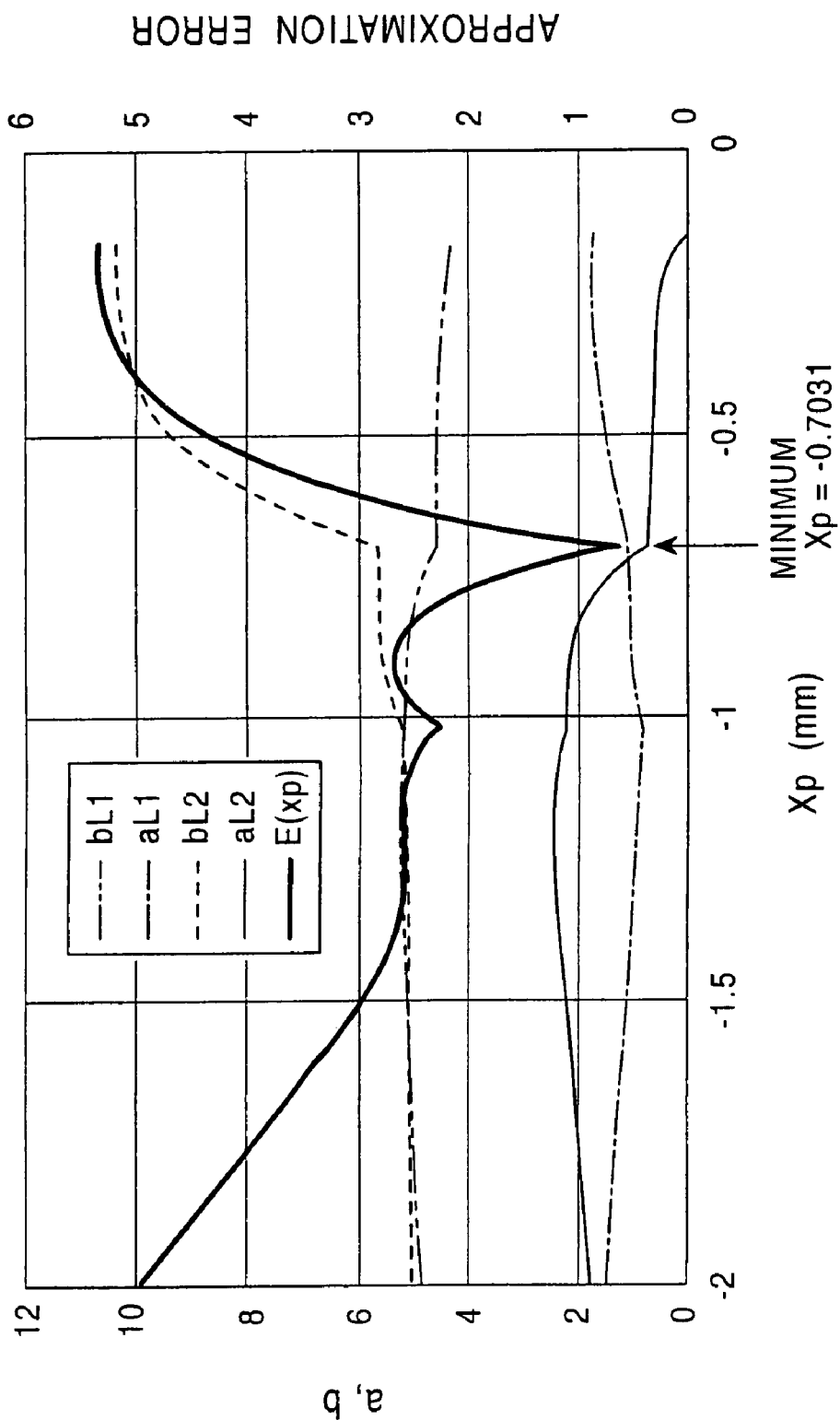
FIG. 44 is a diagram plotting the relation between each $x_p$ and the approximation error $E(x_p)$, with regard to, of the shape data of the pipe surface including the bead portion shown in FIG. 43, the shape data to the left side of the apex position.

FIG. 44 is an example of a diagram plotting the relation between each $x_p$ and the approximation error $E(x_p)$, with regard to, of the shape data of the pipe surface including the bead portion shown in FIG. 43, the shape data to the left side of the apex position, wherein the minimal value is at $x_p=-0.7031$, as shown in the drawing, and accordingly, the approximation function of the bead shape at the left side can be determined as being (Mathematical Expression 7)

$$f_L(x) = \begin{cases} 1.0586x - 3.76155 & -2.0781 \leq x < -0.7031 \\ 0.12345x + 6.789 & -0.7031 \leq x < 0.07813 \end{cases}$$

Of the shape data of the pipe surface including the bead portion, the base pipe shape approximation circuit 413 calculates the approximation function $f_P(x)$ with regard to the range excluding the bead portion. Though a circle or ellipse may be used for this approximation function $f_P(x)$, a power function, and an even degree polynomial, quadratic or higher, is preferably used as the approximation curve.

Figure 45:
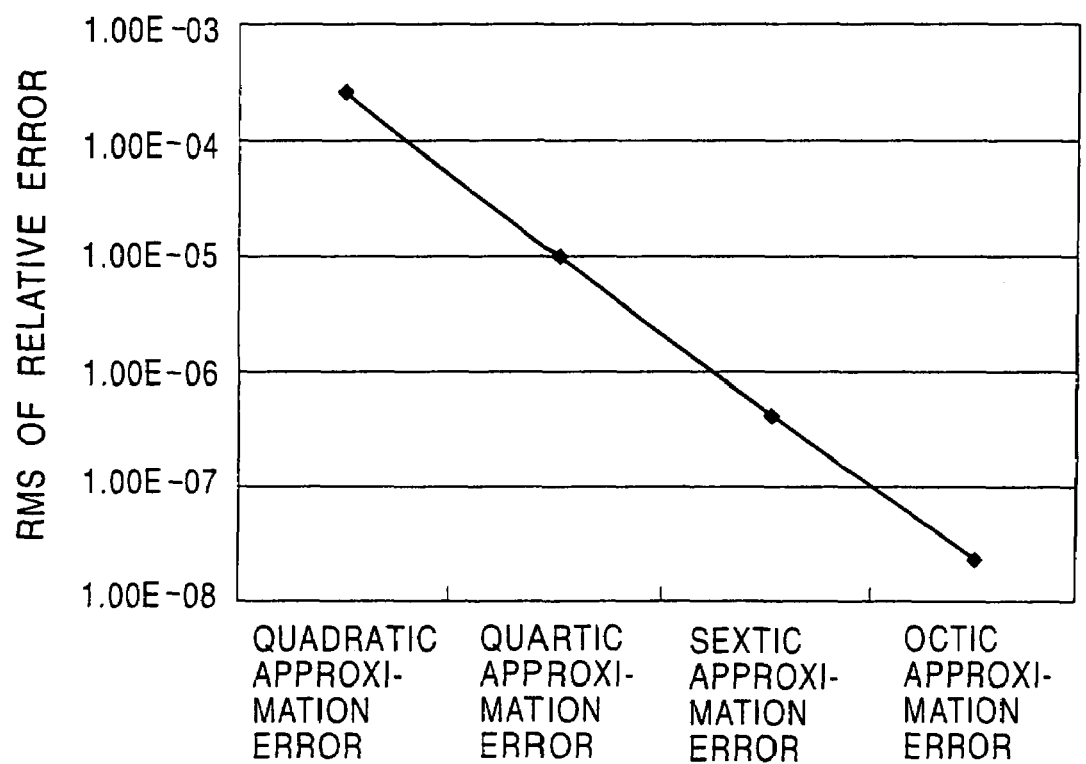
FIG. 45 is a diagram illustrating the relation between the degree of a polynomial and the RMS (root-mean-square) of approximation error, in a case of regression of the upper half portion of a circle with quadratic, quartic, sextic, and octic polynomials.

To support this, FIG. 45 is a chart illustrating the relation between the degree of a polynomial and the RMS (root-mean-square) of approximation error, in a case of regression of the upper half curve of a circle with quadratic, quartic, sextic, and octic polynomials, indicating that a polynomial of an even degree quadratic or higher, and preferably a quartic or higher polynomial, can perform regression of the shape of the ellipse with sufficient precision. Accordingly, with the present embodiment, approximation is performed with a quartic function. Specifically, with regard to the coordinates range (Mathematical Expression 8)

$$x \in D = \{[x_0, x_L] \cup [x_R, x_N]\}$$

of the shape data of the pipe surface including the bead portion shown in FIG. 43, the coefficient for the quartic function (Mathematical Expression 9)

$$J = \sum_{x \in D} \{z - f_p(x)\}^2 \to \min$$

wherein the sum of squares of error defined as (Mathematical Expression 10)

$$z = f_p(x) = a_0 + a_1 x + a_2 x^2 + a_3 x^3 + a_4 x^4$$

is minimal, is calculated. This can be solved algebraically, and is calculated by (Mathematical Expression 11)

$$\begin{bmatrix} a_0 \\ a_1 \\ a_2 \\ a_3 \\ a_4 \end{bmatrix} = inv\left(\sum_{x\in D}\begin{bmatrix} 1 & x & x^2 & x^3 & x^4 \\ x & x^2 & x^3 & x^4 & x^5 \\ x^2 & x^3 & x^4 & x^5 & x^6 \\ x^3 & x^4 & x^5 & x^6 & x^7 \\ x^4 & x^5 & x^6 & x^7 & x^8 \end{bmatrix}\right)\begin{bmatrix} \sum_{x\in D}\begin{bmatrix} z \\ zx \\ zx^2 \\ zx^3 \\ zx^4 \end{bmatrix} \end{bmatrix}$$

wherein inv(A) represents the inverse matrix of the matrix A. With the present embodiment, calculating the above Expression yielded $f_p(x)=1.60921+0.055776x-0.02129x^2-0.00015x^3+0.000057x^4$ The bead range re-setting circuit 414 calculates the intersecting points of the left and right bead shape approximation functions $f_L(x)$ and $f_R(x)$ calculated as described above with the base pipe shape approximation function $f_p(x)$, and outputs the region corresponding to between the calculated left and right intersecting points as a new bead range ($x_L'$, $x_R'$).

Figure 46:
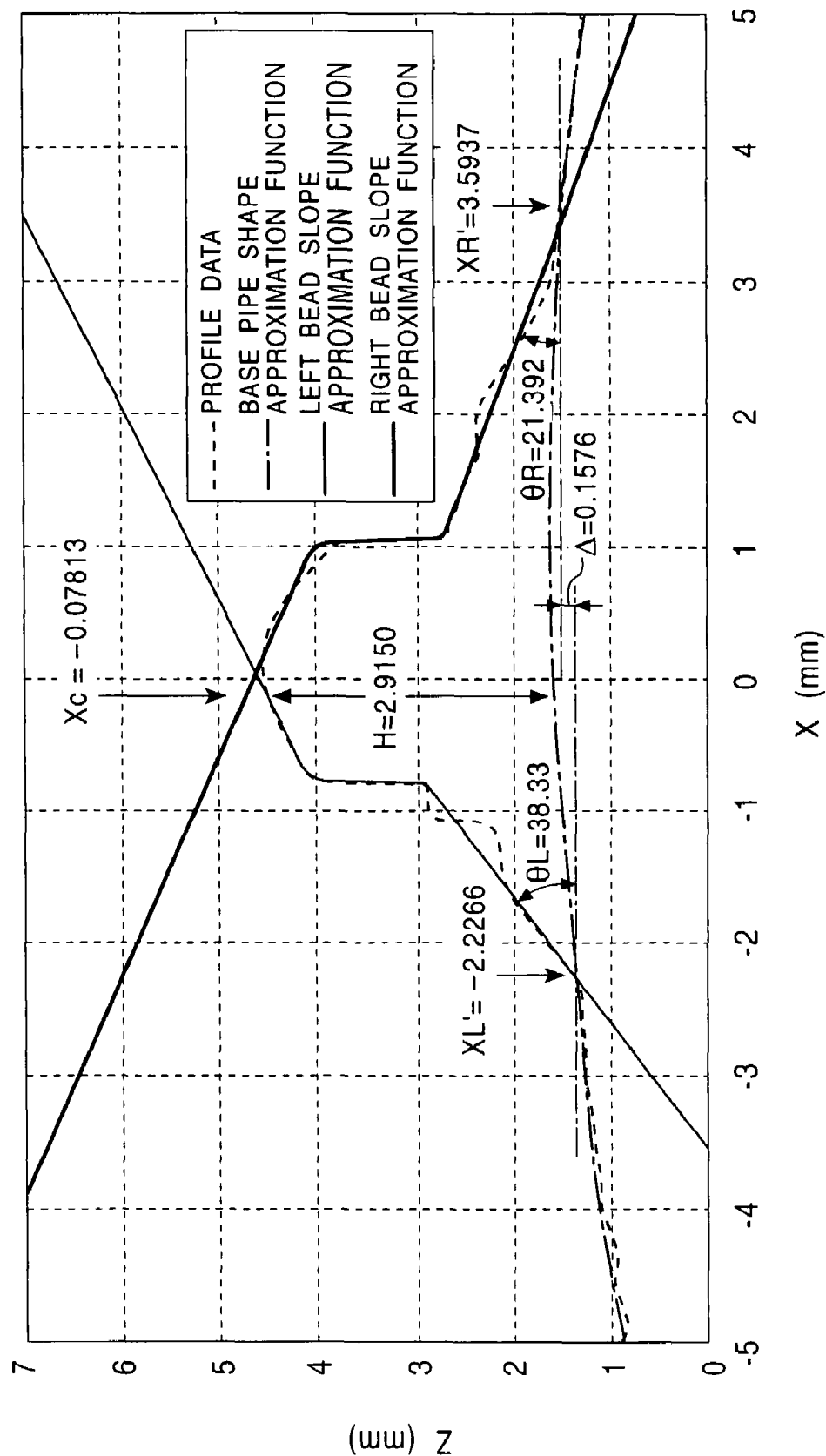
FIG. 46 is a diagram with regard to an embodiment of the bead shape detection method according to the present invention, wherein left and right bead shape approximation functions $f_L(x)$ and $f_R(x)$ calculated by the bead shape approximation circuit, and the base pipe shape approximation function $f_P(x)$ calculated by the base pipe shape approximation circuit, are plotted along with shape data of the pipe surface including the bead portion.

The $f_L(x)$, $f_R(x)$, and $f_p(x)$ calculated in the present embodiment are as shown in FIG. 46, and the bead range re-setting circuit output $x_L'=-2.2266$, and $x_R'=3.5938$. The dashed line plotted in FIG. 46 is the shape data of the pipe surface including the bead portion, the same as that shown in FIG. 43.

The features calculating circuit 415 calculates the bead height H, width W, slope angles $\theta_L$ and $\theta_R$ of the left and right bead portions, and the unevenness Δ between the left and right bead portion boundaries, from the thus-calculated bead range, apex position, approximation functions for the left and right bead shapes, approximation function for the base pipe, and the shape data of the pipe surface including the bead portion.

As preferred determination methods for the features, the present embodiment performs calculations following the following definitions.

Bead width W: the spacing in the pipe circumference direction between the left and right bead boundaries output from the bead range re-setting circuit.

Bead height H: the difference in values between the shape data of the pipe surface including the bead portion at the bead apex position and the approximation function of the base pipe shape.

Bead slope angles $\theta_L$ and $\theta_R$: the arctangent of each inclination defined by differential functions at the boundary between the left and right approximation functions of the bead shapes and the approximation function of the base pipe.

Unevenness Δ between the left and right boundaries between the bead portion and the base pipe: the difference in values between the approximation functions of the left and right bead shapes at the left and right bead boundary positions output by the bead range re-setting circuit 414 and the approximation function of the base pipe shape.

The method for calculating the bead slope angle will be described in further detail. Describing the procedures for calculating the left-side bead slope angle, the inclination vectors $V_P$ and $V_L$ at $x=x_{iL}$ of the approximation function $f_p(x)$ of the base pipe shape and the approximation function $f_L(x)$ of the left side bead shape are (Mathematical Expression 12)

$v_p=(1,f_p'(x_L))=(1,a_1+2a_2x_L+3a_3x_L^2+4a_4x_L^3)=(1,)$ $v_L=(1,f_L'(x_L))=(1,a_{L1})=(1,)$ so the angle $\theta_L$ formed by these two is calculated by (Mathematical Expression 13)

$$\cos\theta_L = \frac{v_L \cdot v_p}{|v_L||v_p|}$$

$$= \frac{1+f_p'(x_L)f_L'(x_L)}{\sqrt{1+(f_p'(x_L))^2}\sqrt{1+(f_L'(x_L))^2}}$$

$$= \frac{1+(a_1+2a_2x_L+3a_3x_L^2+4a_4x_L^3)a_L}{\sqrt{1+(a_1+2a_2x_L+3a_3x_L^2+4a_4x_L^3)^2}\sqrt{1+a_L^2}}$$

Calculations are performed in the same way for $\theta_R$, as well.

According to such definitions, the following was calculated with the present embodiment.

Bead width (mm): $W=x_R-x_L=5.8204$

Bead height (mm): $H=Z(x_c)-f_p(x_c)=2.9150$

Slope angle of bead at left side (deg)$\theta_L=38.335$

Slope angle of bead at right side (deg)$\theta_R=21.392$

Unevenness between left and right bead boundaries (mm):

$\Delta=|f_p(x_L)-f_p(x_R)|=0.1576$

The invention claimed is:

1. An electric resistance welded pipe bead shape detecting method, for detecting the bead shape of an electric resistance welded pipe, wherein an image, obtained by a slit light being irradiated or a point light being scanned on a pipe surface including a bead portion due to welding of an electric resistance welded pipe, and an image of the slit light irradiated on the pipe surface including the bead portion or an image of the track of the point light scanned thereupon being taken with image-taking means from an angle different to the irradiation direction of slit light, is subjected to predetermined image processing; said method comprising:

a step for obtaining shape data of a portion of the pipe surface equivalent to the bead portion from shape data of the pipe surface including the bead portion calculated in said image processing, from preset boundaries at the left and right edges of the bead portion, and an apex position of the bead portion calculated separately;

a step for dividing said shape data of the portion of the pipe surface equivalent to said bead portion into two regions, left and right;

a step for performing approximation with a function with regard to each of the left and right shape data, so as to obtain approximation functions for the left and right bead shapes;

a step for performing further approximation with a function, with regard to base pipe shape data excluding the pipe surface shape data of the portion equivalent to said bead portion from the shape data of the pipe surface including the bead portion, so as to obtain base pipe shape approximation functions; and a step for calculating at least one of the width, height, slope angle, and step at the left and right boundaries between the bead portion and base pipe, based on each of said left and right bead shape approximation functions, and said base pipe shape approximation function.

2. An electric resistance welded bead shape detecting method according to claim 1, wherein calculations are performed to minimize the error between said left and right bead shape approximation functions and the shape data of the pipe surface including said bead portion, with approximation functions for said left and right bead shapes as functions wherein two or more straight lines with different inclinations are linked, and with the position of the linking points, the inclination of the straight lines, and intercept, as parameters.

3. An electric resistance welded pipe bead shape detecting method according to claim 2, wherein said intersecting points between
said left and right bead shape approximation functions and
said base pipe shape approximation function are calculated as the boundaries of both edges of the bead portion;
and wherein at least one of the bead width, height, slope angle, and step at the left and right boundaries between the bead portion and base pipe, is calculated, based thereupon.

4. An electric resistance welded pipe welding bead height detecting method according to claim 2, wherein the difference in said bead shape approximation function values and said base pipe shape approximation function values at the electric resistance welded pipe cross-sectional direction position on the apex of said bead portion is calculated as the bead height.

5. An electric resistance welded pipe welding bead slope angle detecting method according to claim 2, wherein said intersecting points between said left and right bead shape approximation functions and said base pipe shape approximation function are calculated as the boundaries of both edges of the bead portion, respective differential coefficients are calculated for the intersecting points between said left and right bead shape approximation functions and said base pipe shape approximation function at the electric resistance welded pipe cross-sectional direction position, and the left and right bead slope angles are each calculated, based thereupon.

6. An electric resistance welded pipe bead shape detecting method according to claim 1, wherein said intersecting points between
said left and right bead shape approximation functions and
said base pipe shape approximation function are calculated as the boundaries of both edges of the bead portion;
and wherein at least one of the bead width, height, slope angle, and step at the left and right boundaries between the bead portion and base pipe, is calculated, based thereupon.

7. An electric resistance welded pipe welding bead height detecting method according to claim 6, wherein the difference in said bead shape approximation function values and said base pipe shape approximation function values at the electric resistance welded pipe cross-sectional direction position on the apex of said bead portion is calculated as the bead height.

8. An electric resistance welded pipe welding bead slope angle detecting method according to claim 6, wherein said intersecting points between said left and right bead shape approximation functions and said base pipe shape approximation function are calculated as the boundaries of both edges of the bead portion, respective differential coefficients are calculated for the intersecting points between said left and right bead shape approximation functions and said base pipe shape approximation function at the electric resistance welded pipe cross-sectional direction position, and the left and right bead slope angles are each calculated, based thereupon.

9. An electric resistance welded pipe welding bead height detecting method according to claim 1, wherein the difference in said bead shape approximation function values and said base pipe shape approximation function values at the electric resistance welded pipe cross-sectional direction position on the apex of said bead portion is calculated as the bead height.

10. An electric resistance welded pipe welding bead slope angle detecting method according to claim 1, wherein said intersecting points between said left and right bead shape approximation functions and said base pipe shape approximation function are calculated as the boundaries of both edges of the bead portion, respective differential coefficients are calculated for the intersecting points between said left and right bead shape approximation functions and said base pipe shape approximation function at the electric resistance welded pipe cross-sectional direction position, and the left and right bead slope angles are each calculated, based thereupon.

11. An electric resistance welded pipe bead shape detecting device, comprising:
light projecting means for irradiating a slit light or scanning a point light on a pipe surface including a welding portion of an electric resistance welded pipe;
image-taking means for taking an image of said projected light irradiated on said pipe surface including said welding portion, from an angle different to that of said light projecting means;
bead shape calculating means for calculating the bead shape of said electric resistance welded pipe by subjecting the image obtained from said image-taking means to predetermined image processing;
an apex position setting circuit and a bead range setting circuit, for calculating the bead apex position and each of the boundary positions between the bead portion and the base pipe excluding the bead portion, based on the bead shape data calculated by said bead shape calculating means;
a bead shape approximation circuit for calculating approximation functions for the left and right bead shapes, based on
the apex position output from said apex position setting circuit and bead range setting circuit and
the left and right boundary positions on either side of the bead apex position;
a base pipe shape approximation circuit for calculating a base pipe shape approximation function, based on base pipe shape data further outwards from the left and right boundary positions which said bead range setting circuit outputs;
a bead range re-setting circuit for re-setting the intersections between
the left and right bead shape approximation functions output by said bead shape approximation circuit, and
the base pipe shape approximation function output from said base pipe shape approximation circuit as left and right boundary positions; and
a features calculating circuit for calculating at least one of the bead width, height, slope angle, and step at the left and right boundaries between the bead portion and base pipe, based on the output of each of said bead range setting circuit, bead shape approximation circuit, and base pipe shape approximation circuit.

* * * * *